`US010159105B1`

United States Patent
Linsky et al.

(10) Patent No.: US 10,159,105 B1
(45) Date of Patent: Dec. 18, 2018

(54) PERFORMING PROPRIETARY LINK MANAGER FEATURE DISCOVERY AND EXCHANGE WITH A PEER PROPRIETARY DEVICE

(71) Applicant: QUALCOMM Incorporated, San Diego, CA (US)

(72) Inventors: Joel Linsky, San Diego, CA (US); Thomas Cargill, San Diego, CA (US); Anssi Haverinen, San Diego, CA (US); Brian Redding, Urbana, IL (US); Robin Heydon, Cambridge (GB); Laurence Richardson, Near Ely (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/712,029

(22) Filed: Sep. 21, 2017

(51) Int. Cl.
| | |
|---|---|
| *H04W 92/18* | (2009.01) |
| *H04W 76/14* | (2018.01) |
| *H04L 29/06* | (2006.01) |
| *H04W 72/04* | (2009.01) |
| *H04W 76/15* | (2018.01) |
| *H04W 4/80* | (2018.01) |
| *H04W 84/18* | (2009.01) |

(52) U.S. Cl.
CPC ......... *H04W 76/14* (2018.02); *H04L 63/0428* (2013.01); *H04W 4/80* (2018.02); *H04W 72/0406* (2013.01); *H04W 76/15* (2018.02); *H04W 92/18* (2013.01); *H04W 84/18* (2013.01)

(58) Field of Classification Search
CPC .............................. H04W 76/14; H04W 76/15
See application file for complete search history.

(56) References Cited

U.S. PATENT DOCUMENTS

| | | | |
|---|---|---|---|
| 7,643,463 B1 * | 1/2010 | Linsky | H04L 67/322 370/344 |
| 8,875,193 B2 | 10/2014 | Manapragada et al. | |
| 9,143,890 B2 | 9/2015 | Jose et al. | |
| 2017/0171697 A1 * | 6/2017 | Song | H04W 76/10 |

FOREIGN PATENT DOCUMENTS

WO   2016175575 A1   11/2016

* cited by examiner

*Primary Examiner* — Tuan H Nguyen
(74) *Attorney, Agent, or Firm* — Arent Fox, LLP and Qualcomm, Incorporated

(57) ABSTRACT

In an aspect of the disclosure, a method, a computer-readable medium, and an apparatus are provided. The apparatus may transmit a LMP version request PDU to a second device. The apparatus may receive a LMP version response PDU including at least one of a link layer identification, a version number, or a sub-version number associated with the second device. The apparatus may determine if one or more of the link layer identification, the version number, or the sub-version number included in the LMP version response PDU are associated with a recognized QLM. The apparatus may a first LMP encapsulated header PDU that includes a first QLMP feature request opcode to the second device when it is determined that one or more of the link layer identification, the version number, or the sub-version number included in the LMP version response PDU are associated with the recognized QLM.

14 Claims, 32 Drawing Sheets

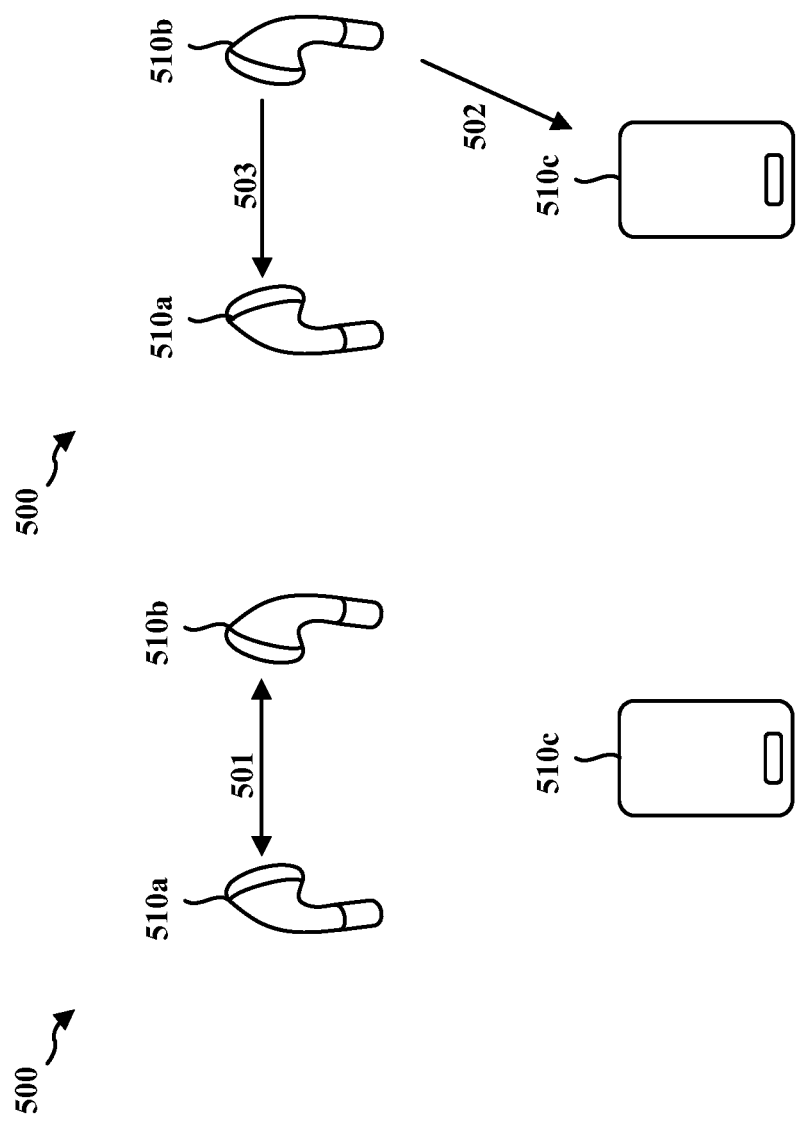

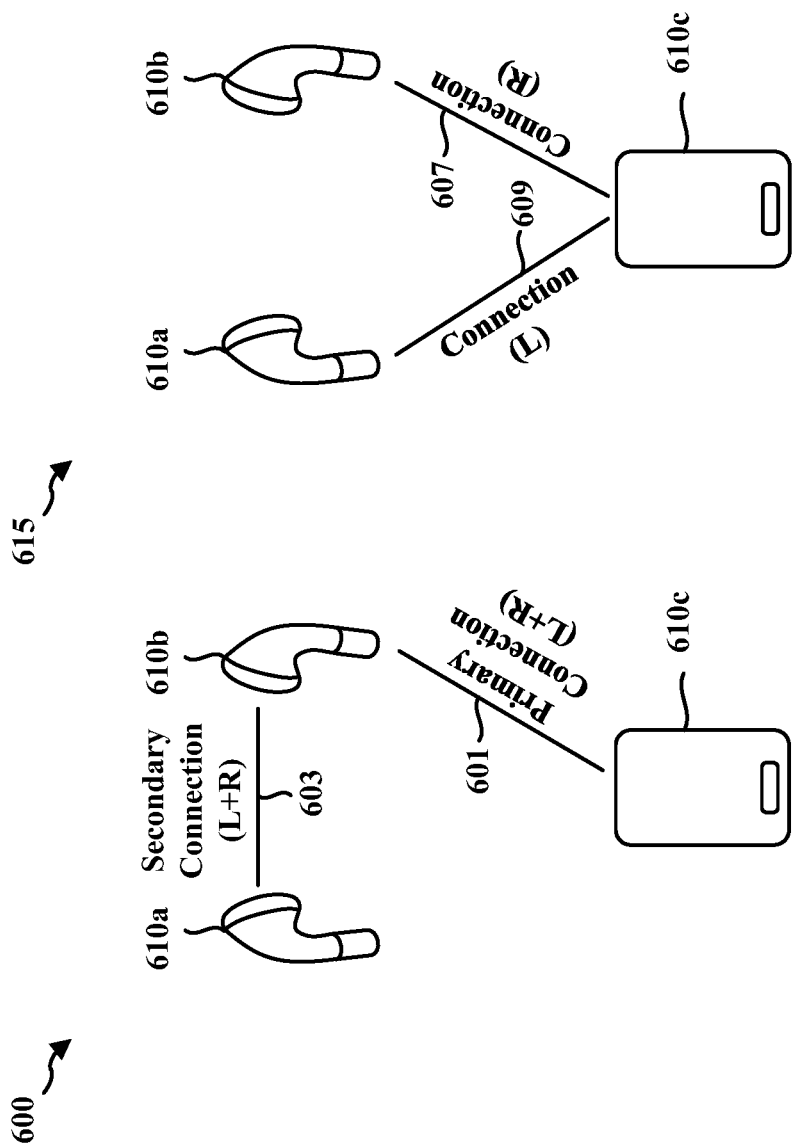

PERFORMING PROPRIETARY LINK MANAGER FEATURE DISCOVERY AND EXCHANGE WITH A PEER PROPRIETARY DEVICE

BACKGROUND

Field

The present disclosure relates generally to communication systems, and more particularly, to performing proprietary link manager (QLM) protocol (QLMP) feature discovery and exchange with a peer proprietary device.

Background

A wireless personal area network (WPAN) is a personal, short-range area wireless network for interconnecting devices centered around a specific distance from a user. WPANs have gained popularity because of the flexibility and convenience in connectivity that WPANs provide. WPANs, such as those based on short-range communication protocols (e.g., a Bluetooth® (BT) protocol, BT low-energy (BLE) protocol, a Zigbee® protocol, etc.), provide wireless connectivity to peripheral devices by providing short-range wireless links that allow connectivity within a specific distance (e.g., 5 meters, 10 meter, 20 meters, 100 meters, etc.).

BT is a short-range wireless communication protocol that supports a WPAN between a central device (e.g., a master device) and at least one peripheral device (e.g., a slave device). Power consumption associated with BT communications may render BT impractical in certain applications, such as applications in which an infrequent transfer of data occurs.

To address the power consumption issue associated with BT, BLE was developed and adopted in various applications in which an infrequent transfer of data occurs. BLE exploits the infrequent transfer of data by using a low duty cycle operation, and switching at least one of the central device and/or peripheral device(s) to a sleep mode in between data transmissions. Example applications that use BLE include battery-operated sensors and actuators in various medical, industrial, consumer, and fitness applications, and that connect to BLE enabled smart phones, tablets, and/or laptops. While traditional BLE offers certain advantages, there exists a need for further improvements in BLE technology.

For example, in certain scenarios it may be beneficial to determine if a second device shares any of the proprietary features (e.g., QLMP features) associated with a first device. By determining shared proprietary features, the first device and the second device may enable proprietary features for modified BLE communications that reduce power consumption, as compared to traditional BLE.

Thus, there exists a need for a mechanism to perform QLMP discovery and feature exchange with a peer proprietary device in order to reduce power consumption as compared to traditional BLE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

BLE was developed and adopted in various applications in which an infrequent transfer of data occurs. BLE exploits the infrequent transfer of data by using a low duty cycle operation, and switching at least one of the central device and/or peripheral device(s) to a sleep mode in between data transmissions. A BLE communications link between two devices may established using, e.g., hardware, firmware, host operating system, host software stacks, and/or host application support. Example applications that use BLE include battery-operated sensors and actuators in various medical, industrial, consumer, and fitness applications, and that connect to devices such as BLE enabled smart phones, tablets, and laptops. While traditional BLE offers certain advantages, there exists a need for further improvements in BLE technology.

For example, in certain scenarios it may be beneficial to determine if a second device shares any of the proprietary features associated with a first device. By determining shared proprietary features, the first device and the second device may enable proprietary features for modified BLE communications that reduce power consumption, as compared to traditional BLE.

In certain traditional BLE applications, an audio stream may be received by a first wireless earbud in a earbud pair, and the first wireless earbud may relay the audio stream to the second wireless earbud in the earbud pair. Audio data in the audio stream that is associated with the first wireless earbud may be output by the first wireless earbud. Similarly, audio data in the audio stream that is associated with the second wireless earbud may be output by the second wireless earbud. In some scenarios, the audio stream received by the first earbud may not include audio data for the first earbud. However, because the first earbud acts as a relay for the second earbud, the first earbud may remain in an awake state even when the audio stream does not include audio data for the first wireless earbud. Hence, power consumption associated with the earbud pair may be increased as compared to a scenario in which the first wireless earbud remains in a sleep mode when the audio stream does not include audio data for the first wireless device.

Thus, there exists a need for a mechanism to perform QLMP discovery and feature exchange with a peer proprietary device in order to reduce power consumption as compared to traditional BLE.

The present disclosure provides a mechanism to perform QLMP discovery and feature exchange with a peer proprietary device that includes exchanging QLMP feature PDUs using a non-proprietary link manager protocol (LMP) encapsulated protocol data unit (PDU) mechanism. QLMP features that may be supported by the BLE devices described below may include virtual addressing, inter-virtual device messaging, true wireless stereo (TWS) audio path configuration, split ACL, extended synchronous connection oriented (eSCO) discontinuous transmission (DTX), and/or higher layer channel messaging, just to name a few.

In an aspect of the disclosure, a method, a computer-readable medium, and an apparatus are provided. In certain implementations, the apparatus may be an initiating device, and the apparatus may transmit a LMP version request PDU to a second device. The apparatus may receive a LMP version response PDU including at least one of a link layer identification, a version number, or a sub-version number associated with the second device. The apparatus may determine if one or more of the link layer identification, the version number, or the sub-version number included in the LMP version response PDU are associated with a recognized QLM. The apparatus may transmit a first LMP encapsulated header PDU that includes a first QLMP feature request opcode to the second device when it is determined that one or more of the link layer identification, the version number, or the sub-version number included in the LMP version response PDU are associated with the recognized QLM.

In certain other implementations, the apparatus may be a responding device, and the apparatus may receive a LMP version request PDU from a second device. The apparatus may transmit a LMP version response PDU to the second device. In one aspect, the LMP version response PDU may include at least one of a link layer identification, a version number, or a sub-version number associated with the first device. The apparatus may receive a first LMP encapsulated header PDU that includes a first QLMP feature request opcode from the second device when one or more of the link layer identification, the version number, or the sub-version number included in the LMP version response PDU are associated with a QLM recognized by the second device.

In certain other configurations, the apparatus may be a host device (e.g., a handheld device that transmits an audio stream to a wireless earbud pair), and the apparatus may receive information from a second device that includes a virtual address associated with the second device and a third device. The apparatus may disconnect from the second device. The apparatus may transmit a first LMP encapsulated header PDU including a QLMP virtual paging opcode to the third device that is paired with the second device. The apparatus may receive a first LMP accepted PDU when the first LMP encapsulated header PDU is received by the third device. The apparatus may receive a second LMP encapsulated header PDU including a QLMP accepted opcode from the third device. The apparatus may transmit a second LMP accepted PDU to the third device when the second LMP encapsulated header PDU is received. The apparatus may receive a LMP host connection request PDU from the third device. The apparatus may establish a connection with the third device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A-5E illustrates a data flow that may be used to perform various procedures related to QLM discovery, QLMP feature discovery, and/or QLMP feature exchange in accordance with certain aspects of the disclosure.

FIG. 6A illustrate a full-relay technique for sending an audio stream from a third device to a first device and second device in accordance with certain aspects of the disclosure.

FIG. 6B illustrates a split ACL technique for sending an audio stream from a third device to a first device and second device in accordance with certain aspects of the disclosure.

DETAILED DESCRIPTION

Figure 1:
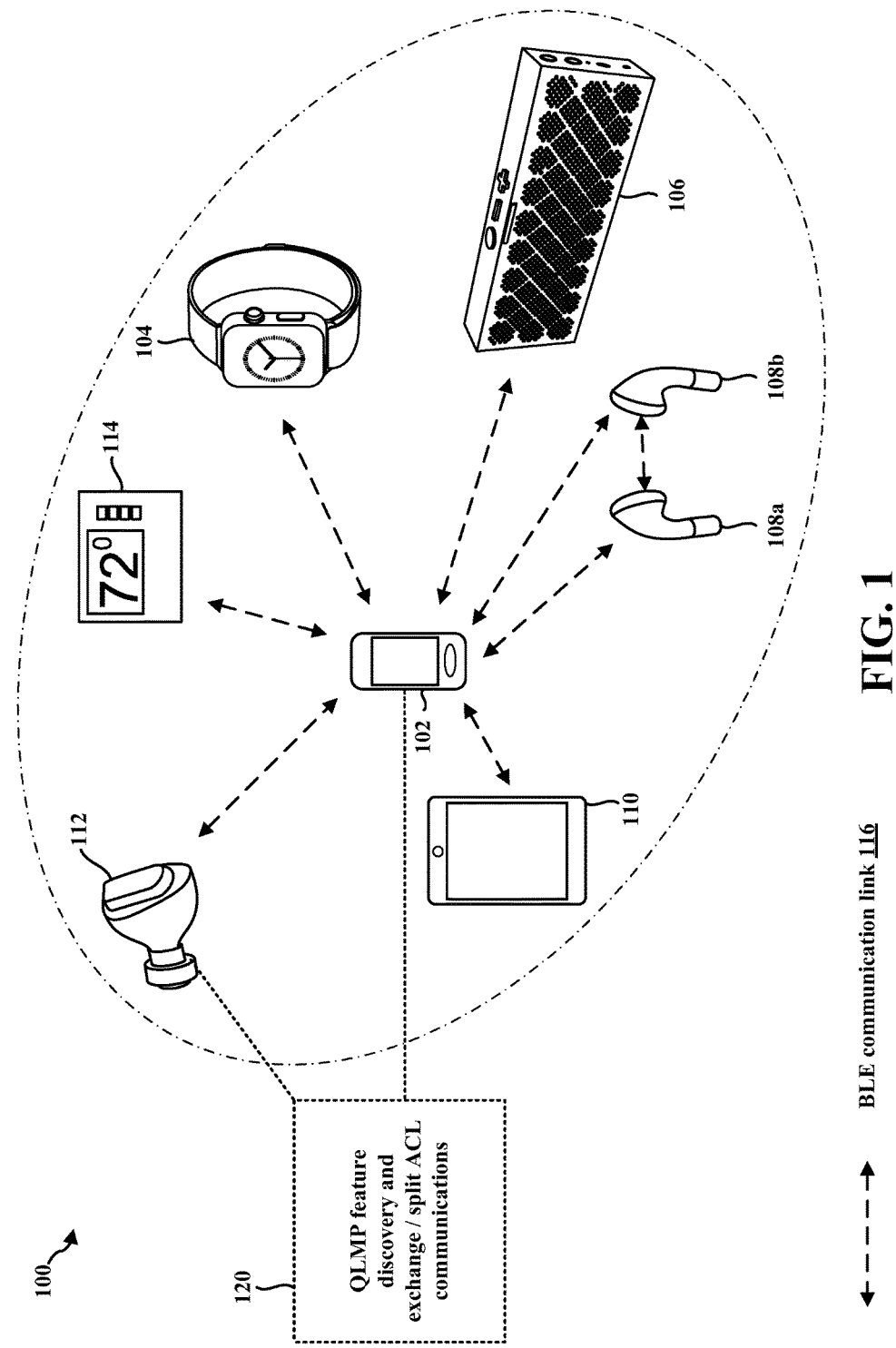
FIG. 1 is a diagram illustrating an example of a WPAN in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with certain aspects of the disclosure. Within the WPAN 100, a central device 102 may connect to and establish a BLE communication link 116 with one or more peripheral devices 104, 106, 108a, 108b, 110, 112, 114 using the BLE protocol or a modified BLE protocol. The BLE protocol is a specification that enables radio frequency communication operating within the globally accepted 2.4 GHz Industrial, Scientific & Medical (ISM) band.

The central device 102 may comprise suitable logic, circuitry, interfaces, processors, and/or code that may be used to communicate with one or more peripheral devices 104, 106, 108a, 108b, 110, 112, 114 using the BLE protocol or the modified BLE protocol as described below with reference to FIGS. 2-15 A first peripheral device 108a may comprise suitable logic, circuitry, interfaces, processors, and/or code that may be used to communicate with a second peripheral device 108b using the BLE protocol or the modified BLE protocol as described below with reference to FIGS. 2-15

The central device 102 may operate as an initiator to request establishment of a Link Layer (LL) connection with an intended peripheral device 104, 106, 108a, 108b, 110, 112, 114. Either the central device 102 (master device) or a peripheral device 104, 106, 108a, 108b, 11, 112, 114 (slave device) may be an initiator of a QLMP feature discovery and exchange procedure. Similarly, either the central device 102 (master device) or the peripheral device 104, 106, 108a, 108b, 110, 112, 114 (slave device) may be a responder during a QLMP feature discovery and exchange procedure.

A LL in the BLE protocol stack provides, as compared to BT, ultra-low power idle mode operation, simple device discovery and reliable point-to-multipoint data transfer with advanced power-save and encryption functionalities. After a requested LL connection is established, the central device 102 may become a master device and the intended peripheral device 104, 106, 108a, 108b, 110, 112, 114 may become a slave device. As a master device, the central device 102 may be capable of supporting multiple LL connections at a time with various peripheral devices 104, 106, 108a, 108b, 110, 112, 114 (slave devices). The central device 102 (master device) may be operable to manage various aspects of data packet communication in a LL connection with an associated peripheral device 104, 106, 108a, 108b, 110, 112, 114 (slave device). For example, the central device 102 may be operable to determine an operation schedule in the LL connection with a peripheral device 104, 106, 108a, 108b, 110, 112, 114 (slave device). The central device 102 may be operable to initiate a LL data PDU exchange sequence in the LL connection. LL connections may be configured to run periodic connection events in dedicated data channels. The exchange of LL data PDU transmissions between the central device 102 and one or more of the peripheral devices 104, 106, 108a, 108b, 110, 112, 114 may take place within connection events.

In certain configurations, the central device 102 may be configured to transmit the first LL data PDU in each connection event to an intended peripheral device 104, 106, 108a, 108b, 110, 112, 114. In certain configurations, the central device 102 may utilize a polling scheme to poll the intended peripheral device 104, 106, 108a, 108b 110, 112, 114 for a LL data PDU transmission in a connection event. The intended peripheral device 104, 106, 108a, 108b, 110, 112, 114 may transmit a LL data PDU upon receipt of packet LL data PDU from the central device 102. In certain other configurations, a peripheral device 104, 106, 108a, 108b, 110, 112, 114 may transmit a LL data PDU to the central device 102 without first receiving a LL data PDU from the central device 102.

Once a LL connection has been established between the central device 102 (master device) and a peripheral device 104, 106, 108a, 108b, 110, 112, 114 (slave device), the central device 102 may establish a proprietary link layer (QLL) communication link when the peripheral device 104, 106, 108a, 108b, 110, 112, 114 is a peer proprietary device. In certain aspects peer proprietary devices may be wireless devices that are both associated with the same company (e.g., Qualcomm®, Apple®, Samsung®, etc.).

Examples of the central device 102 include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a game console, a tablet, a smart device, a wearable device, a wireless earbud pair, a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108a, 108b, 110, 112, 114 include a cellular phone, a smart phone, a SIP phone, a STA, a laptop, a PC, a desktop computer, a PDA, a satellite radio, a global positioning system, a multimedia device, a video device, a digital audio player (e.g., MP3 player), a camera, a game console, a tablet, a smart device, a wearable device, wireless earbud pair, a vehicle, an electric meter, a gas pump, a toaster, a thermostat, a hearing aid, a blood glucose on-body unit, an IoT device, or any other similarly functioning device. Although the central device 102 is illustrated in communication with seven peripheral devices 104, 106, 108a, 108b, 110, 112, 114 in the WPAN 100, the central device 102 may communicate with more or fewer than seven peripheral devices within the WPAN 100 without departing from the scope of the present disclosure.

Referring again to FIG. 1, in certain aspects, one or more of the central device 102 and/or a peripheral device 104, 106, 108a, 108b, 110, 112, 114 may be configured to perform QLMP feature discovery and exchange, and/or split asynchronous connectionless (ALC) communications, e.g., as described below with reference to FIGS. 2-15.

Figure 2:
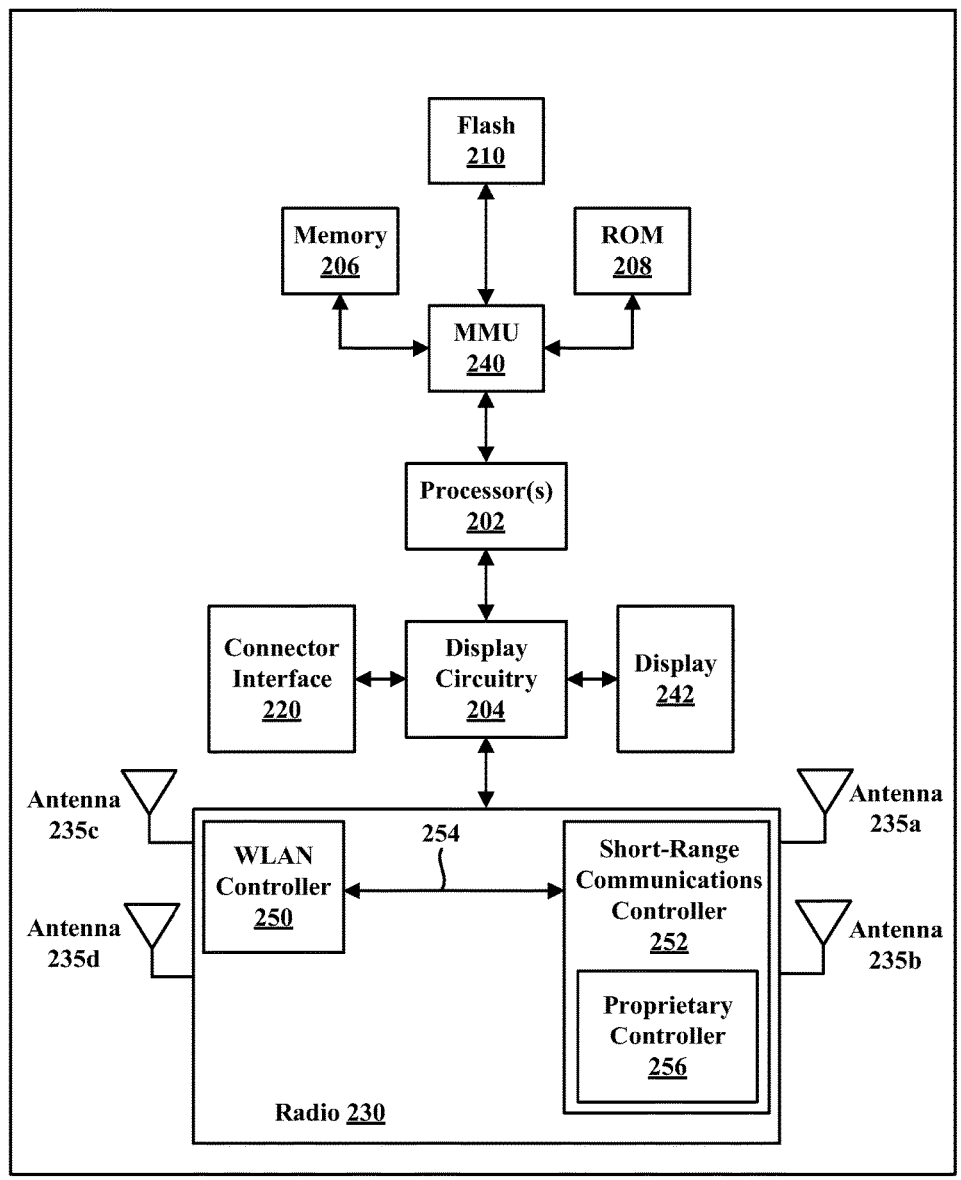
FIG. 2 is block diagram of a BLE device in accordance with certain aspects of the disclosure.

FIG. 2 is block diagram of a wireless device 200 in accordance with certain aspects of the disclosure. The wireless device 200 may correspond to, e.g., the central device 102, and/or one of the peripheral devices 104, 106, 108a, 108b, 110, 112, 114 in FIG. 1. In certain configurations, the wireless device 200 may be, e.g., a BLE device that is configured to implemented the modified BLE protocol stack described below with reference to FIG. 3.

As shown in FIG. 2, the wireless device 200 may include a processing element, such as processor(s) 202, which may execute program instructions for the wireless device 200. The wireless device 200 may also comprise display circuitry 204 which may perform graphics processing and provide display signals to the display 242. The processor(s) 202 may also be coupled to memory management unit (MMU) 240, which may be configured to receive addresses from the processor(s) 202 and translate the addresses to locations in memory (e.g., memory 206, ROM 208, Flash memory 210) and/or to other circuits or devices, such as the display circuitry 204, radio 230, connector interface 220, and/or display 242. The MMU 240 may be configured to perform memory protection and page table translation or set up. In some embodiments, the MMU 240 may be included as a portion of the processor(s) 202.

As shown, the processor(s) 202 may be coupled to various other circuits of the wireless device 200. For example, the wireless device 200 may include various types of memory, a connector interface 220 (e.g., for coupling to the computer system), the display 242, and wireless communication circuitry configured to implement the modified BLE protocol stack described below with reference to FIG. 3. The wireless device 200 may include a plurality of antennas 235a, 235b, 235c, 235d, for performing wireless communication with, e.g., BLE devices, peer proprietary device, etc.

In certain aspects, the wireless device 200 may include hardware and software components (a processing element) configured to perform QLMP feature discovery and exchange, e.g., using the techniques described below with reference to FIGS. 3-15 In certain other aspects, the wireless device 200 may include hardware and software components (a processing element) configured to perform split ACL communications, e.g., using the techniques described below with reference to FIGS. 3-15 The wireless device 200 may also comprise BLE firmware or other hardware/software for controlling the BLE operations, e.g., described below with reference to FIGS. 3-15 In addition, the wireless device 200 may store and execute a wireless local area network (WLAN) software driver for controlling WLAN operations, and/or a cellular software driver for controlling cellular operations.

The wireless device 200 may be configured to implement part or all of the techniques described below with reference to FIGS. 3-15 e.g., by executing program instructions stored on a memory medium (e.g., a non-transitory computer-readable memory medium) and/or through hardware or firmware operation. In other embodiments, the techniques described below with reference to FIGS. 3-15 may be at least partially implemented by a programmable hardware element, such as an field programmable gate array (FPGA), and/or as an application specific integrated circuit (ASIC).

In certain aspects, radio 230 may include separate controllers configured to control communications for various respective radio access technology (RAT) protocols. For example, as shown in FIG. 2, radio 230 may include a WLAN controller 250 configured to control WLAN communications, and a short-range communications controller 252 configured to control short-range communications (e.g., BLE communications). The short-range communications controller 252 may include or be connected with a proprietary controller 256. In certain aspects, the proprietary controller 256 may be associated with a particular company (e.g., Qualcomm®, Apple®, Samsung®, etc.). In certain aspects, the proprietary controller 256 may be configured to perform QLMP feature discovery and exchange. In certain other aspects, the proprietary controller 256 may be configured to perform split ACL communications. A coexistence interface 254 (e.g., a wired interface) may be used for sending information between the WLAN controller 250 and the short-range communications controller 252/proprietary controller 256.

In some aspects, one or more of the WLAN controller 250, the short-range communications controller 252, and/or the proprietary controller 256 may be implemented as hardware, software, firmware or some combination thereof.

In certain aspects, the WLAN controller 250 may be configured to communicate with a second device using a WLAN link using all of the antennas 235a, 235b, 235c, 235d. In certain configurations, the short-range communications controller 252 and/or the proprietary controller 256 may be configured to implement a modified BLE protocol stack (see FIG. 3), and communicate with at least one second device using one or more of the antennas 235a, 235b, 235c, 235d.

Figure 3:
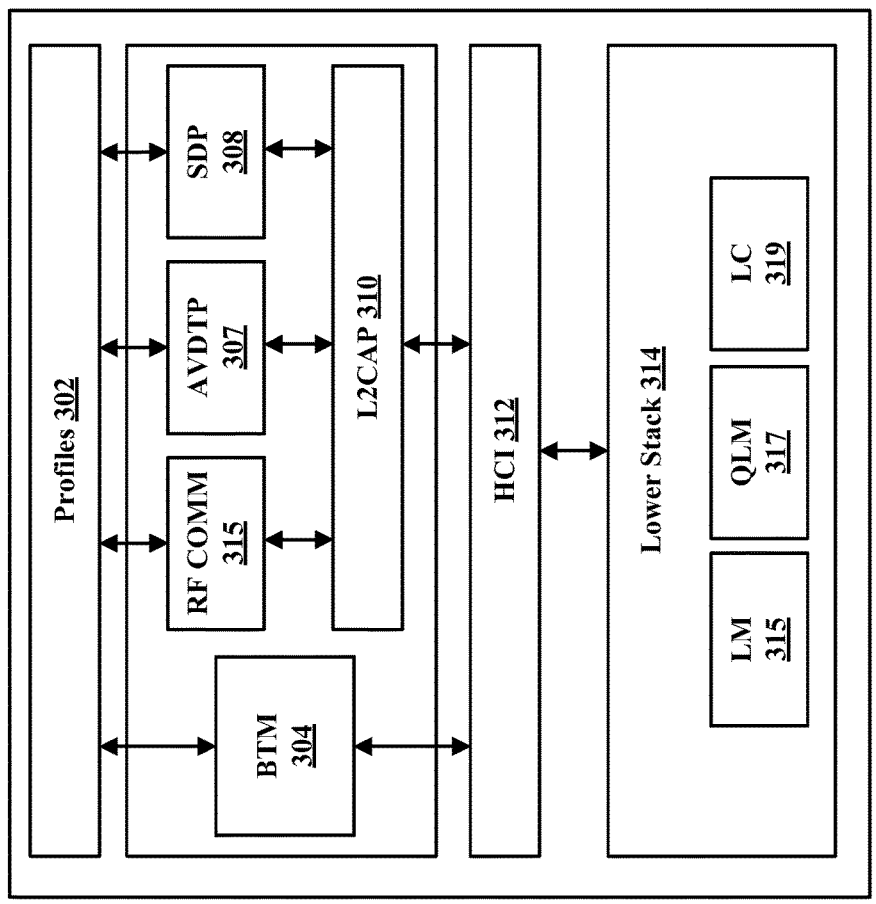
FIG. 3 is a diagram illustrating a modified BLE protocol stack that may include a QLL in accordance with certain aspects of the disclosure.

FIG. 3 illustrates a modified BLE protocol stack 300 that may be implemented in a BLE device in accordance with certain aspects of the present disclosure. The modified BLE protocol stack 300 may include a profiles layer 302, an upper protocol stack 303, a host controller interface (HCI) 312, and a lower stack 314. The profiles layer 302 may comprise profiles of one or more applications that may be utilized in connection with the modified BLE protocol stack 300.

The communication between layers higher than layer one in the modified BLE protocol stack 300 is logical. The hardware connection may be at the physical layer (not illustrated in FIG. 3). Thus, in order for a protocol to communicate, the protocol may pass down a PDU to the next lower layer for transmission. Lower layers may provide services to the layers immediately above them. One of the services each layer provides may be to handle and manage data received from the layer above.

At any particular layer N in the modified BLE protocol stack 300, a PDU may be a complete message that implements the protocol at that layer. However, when a "layer N PDU" is passed down to layer N−1, the layer N PDU becomes the data that the layer N−1 protocol services. Thus, the layer N PDU may be called the layer N−1 service data unit (SDU). The layer N−1 may transport the layer N−1 SDU by placing the layer N−1 SDU into a particular PDU format, preceding the SDU with headers and appending footers associated with layer N−1, as necessary. The process of adding headers and footers to a data payload is called data encapsulation, because the entire contents of the higher-layer message are encapsulated as the data payload of the message at the lower layer.

Referring to FIG. 3, the upper protocol stack 303 includes a BT management entity (BTM) layer 304, radio frequency communication (RFCOMM) protocol 306, audio/video distribution transport protocol (AVDTP) 307, service discovery protocol (SDP) 308, and logical link control and adaptation protocol (L2CAP) 310.

The BTM layer 304 may enable to perform wireless communication by integrating with a short-range wireless controller and/or proprietary controller. The RFCOMM protocol 306 may be utilized to provide emulation of RS-232 serial ports over the L2CAP 310, providing both transport capabilities for upper level services, such as an object exchange (OBEX) protocol, that use serial line as the transport mechanism.

The SDP 308 may be utilized for querying BLE device information, BLE device services, and characteristics of the services. The L2CAP 310 may be utilized to support higher level protocol multiplexing, packet segmentation and reassembly, and quality of service (QoS) procedures. L2CAP 310 may permit higher-level protocols and applications to transmit and receive data packets up to 64 kilobytes in length. The HCI 312 may be adapted to provide a command interface to a baseband controller and link manager, and access hardware status and control registers.

The Audio/Video Distribution Transport Protocol (AVDTP) 307 is the protocol designed especially for BLE streaming audio and video. The AVDTP 307 may perform the signaling that may configure, open, and/or close an audio or video stream between two BLE devices. Audio stream data may be transferred utilizing real-time protocol (RTP) packets. The AVDTP 307 resides in the protocol stack above L2CAP 310, and may utilize separate L2CAP channels for signaling and data.

The lower stack 314 may comprise a link manager (LM) 315, a proprietary LM (QLM) 317, and a link controller (LC) 319. The LM 315 may be adapted to perform a link manager protocol (LMP), such as, link setup, authentication, link configuration, LMP encapsulated PDU mechanism, and other protocols. The LM 315 may also discover other LMs in remote devices. The LM 315 may communicate with LMs in remote devices via the LMP. To perform a service provider role, the LM 315 may utilize the underlying LC 319. The LMP essentially includes a number of PDUs, which may be sent from, e.g., a first LM in a first device to a second LM in a remote second device. Each of the PDUs in the LMP may be differentiated by an address in the packet header and/or by a unique opcode associated each of the different PDUs, for example. The LMP may be used by the LM 315 to control the communication between various BLE devices, such as a smartphone and wireless earbuds.

The QLM 317 may be adapted to perform a QLMP, such as, proprietary feature discovery and exchange, and other protocols. The QLM 317 may also discover other QLMs in remote devices. The QLM 317 may communicate with QLMs in remote devices via the QLMP. To perform a service provider role, the QLM 317 may utilize the underlying LC 319. The QLMP essentially includes a number of PDUs, which may be sent from, e.g., a first QLM in a first device to a second QLM in a remote second device using the LMP encapsulated PDU mechanism implemented by the LM 315. In other words, QLMP PDUs may be tunneled through the LMP encapsulated PDU mechanism to the QLM in a remote device. Each of the PDUs in the QLMP may be differentiated by an address in the packet header and/or a unique opcode associated with each of the different QLMP PDUs, for example. The QLMP may be used by the QLM 317 to control the communication between various BLE devices, such as a smartphone and wireless earbuds. A summary of QLMP PDUs that may be tunneled through the LMP encapsulated PDU mechanism are listed below in Table 1.

TABLE 1

Summary of QLMP PDUs

| QLMP PDU | Length (bytes) | Opcode | Packet type | Possible Direction | Contents | Position in Payload |
|---|---|---|---|---|---|---|
| QLMP_accepted | 0 | 0x5100 | Enc | m ↔ s | — | |
| QLMP_not_accepted | 2 | 0x5101 | Enc | m ↔ s | Q Error Code | 0 |
| QLMP_features_req | 16 | 0x5102 | Enc | m ↔ s | Q_features | 0 |
| QLMP_features_res | 16 | 0x5103 | Enc | m ↔ s | Q_features | 0 |
| QLMP_virtual_address_req | 7 | 0x5104 | Enc | m ↔ s | Address_Type | 0 |
| | | | | | BD_ADDR | 1 |

TABLE 1-continued

Summary of QLMP PDUs

| QLMP PDU | Length (bytes) | Opcode | Packet type | Possible Direction | Contents | Position in Payload |
|---|---|---|---|---|---|---|
| QLMP_virtual_address_res | 7 | 0x5105 | Enc | m ↔ s | Address_Type | 0 |
|  |  |  |  |  | BD_ADDR | 1 |
| QLMP_virtual_device_msg | Variable | 0x5106 | Enc | m ↔ s | BD_ADDR_src, | 0 |
|  |  |  |  |  | BD_ADDR_dest, | 6 |
|  |  |  |  |  | Message | 12 |
| QLMP_split_ACL | 1 | 0x5107 | Enc | m ↔ s | Enable | 0 |
| QLMP_TWS_audio_config | 5 | 0x510A | Enc | m ↔ s | TWS_Type, | 0 |
|  |  |  |  |  | TWS_Side, | 1 |
|  |  |  |  |  | Speaker_AV, | 2 |
|  |  |  |  |  | Speaker_Voice, | 3 |
|  |  |  |  |  | Microphone | 4 |
| QLMP_eSCO_DTX | 2 | 0x510B | Enc | m ↔ s | Enable | 0 |
|  |  |  |  |  | Silence_Interval | 1 |
| QLMP_channel_message | Variable | 0x510C | Enc | m ↔ s | Channel_ID | 0 |
|  |  |  |  |  | Message | 1 |

A summary of parameters that may be associated with one or more of the QLMP PDUs (listed above in Table 1) are seen below in Table 2. When no mandatory range is specified, the mandatory range may include a sum of the valid values that are not reserved for future use.

TABLE 2

Summary of QLMP PDUs Parameters

| Name | Length (bytes) | Type | Unit | Detailed | Mandatory Range |
|---|---|---|---|---|---|
| Address_Type | 1 | u_int8 |  | 0 = Actual V = Virtual |  |
| BD_ADDR | 6 | Multiple bytes |  | BD_ADDR |  |
| TWS_Type | 1 | u_int8 |  | 0 = Mono 1 = Stereo |  |
| TWS_Side | 1 | u_int8 |  | 0 = Joint (L + R) 1 = Left 2 = Right |  |
| Speaker_Streaming | 1 | u_int8 |  | 0 = Disabled 1 = Enabled |  |
| Speaker_Voice | 1 | u_int8 |  | 0 = Disabled 1 = Enabled |  |
| Microphone | 1 | u_int8 |  | 0 = Disabled 1 = Enabled |  |
| Silence_Interval | 1 | u_int8 | eSCO intervals | Multiple of eSCO intervals to send silence update information |  |
| Q_Features | 16 | u_int1[64] |  | The $n^{th}$ (numbering from 0) element represents feature number n. |  |
| Message | Variable | Multiple bytes |  | Little endian |  |
| BD_ADDR_src | 6 | Multiple bytes |  | BD_ADDR of the device sending the message |  |
| BD_ADDR_dest | 6 | Multiple bytes |  | BD_ADDR of the device being sent the message (or all zeros if unknown) |  |
| Enable | 1 | u_int8 |  | 0 = FALSE 1 = TRUE |  |
| Channel_ID | 1 | u_int8 |  | Channel used to transmit PDU |  |

The LC 319 within the lower stack 314 may be adapted to handle BT baseband functions, such as encoding of voice and/or data packets, error correction, slot delimitation, frequency hopping, radio interface, data encryption, and/or link authentication. In addition, the LC 319 may be adapted to execute link management software associated with the LM 315 and/or the QLM 317. The LC 319 may be configured to establish a communication link and perform authentication, configuration, and other protocols, for example.

BLE was developed and adopted in various applications in which an infrequent transfer of data occurs. BLE exploits the infrequent transfer of data by using a low duty cycle operation, and switching at least one of the central device and/or peripheral device(s) to a sleep mode in between data transmissions. A BLE communications link between two devices may established using, e.g., hardware, firmware, host operating system, host software stacks, and/or host application support. Example applications that use BLE include battery-operated sensors and actuators in various medical, industrial, consumer, and fitness applications that connect to devices such as BLE enabled smart phones, tablets, and laptops. While traditional BLE offers certain advantages, there exists a need for further improvements in BLE technology.

For example, in certain scenarios it may be beneficial to determine if a second device shares any of the proprietary features associated with a first device. By determining shared proprietary features, the first device and the second device may enable proprietary features for modified BLE communications that reduce power consumption, as compared to traditional BLE.

In certain traditional BLE applications, an audio stream may be received by a first wireless earbud in a earbud pair, and the first wireless earbud may relay the audio stream to the second wireless earbud in the earbud pair. Audio data in the audio stream that is associated with the first wireless earbud may be output by the first wireless earbud. Similarly, audio data in the audio stream that is associated with the second wireless earbud may be output by the second wireless earbud. In some scenarios, audio stream received by the first earbud may not include audio data for the first earbud. However, because the first earbud acts as a relay for the second earbud, the first earbud may remain in an awake state even when the audio stream does not include audio data for the first wireless earbud. Hence, power consumption associated with the earbud pair may be increased as compared to a scenario in which the first wireless earbud remains in a sleep mode when the audio stream does not include audio data for the first wireless device.

Thus, there exists a need for a mechanism to perform QLMP discovery and feature exchange with a peer proprietary device in order to reduce power consumption as compared to traditional BLE.

The present disclosure provides a mechanism to perform QLMP discovery and feature exchange with a peer proprietary device that includes exchanging QLMP feature PDUs using a LMP encapsulated PDU mechanism. QLMP features that may be supported by the BLE devices described below may include virtual addressing, inter-virtual device messaging, TWS audio path configuration, split ACL, eSCO DTX, and/or higher layer channel messaging, just to name a few.

Figure 4A:
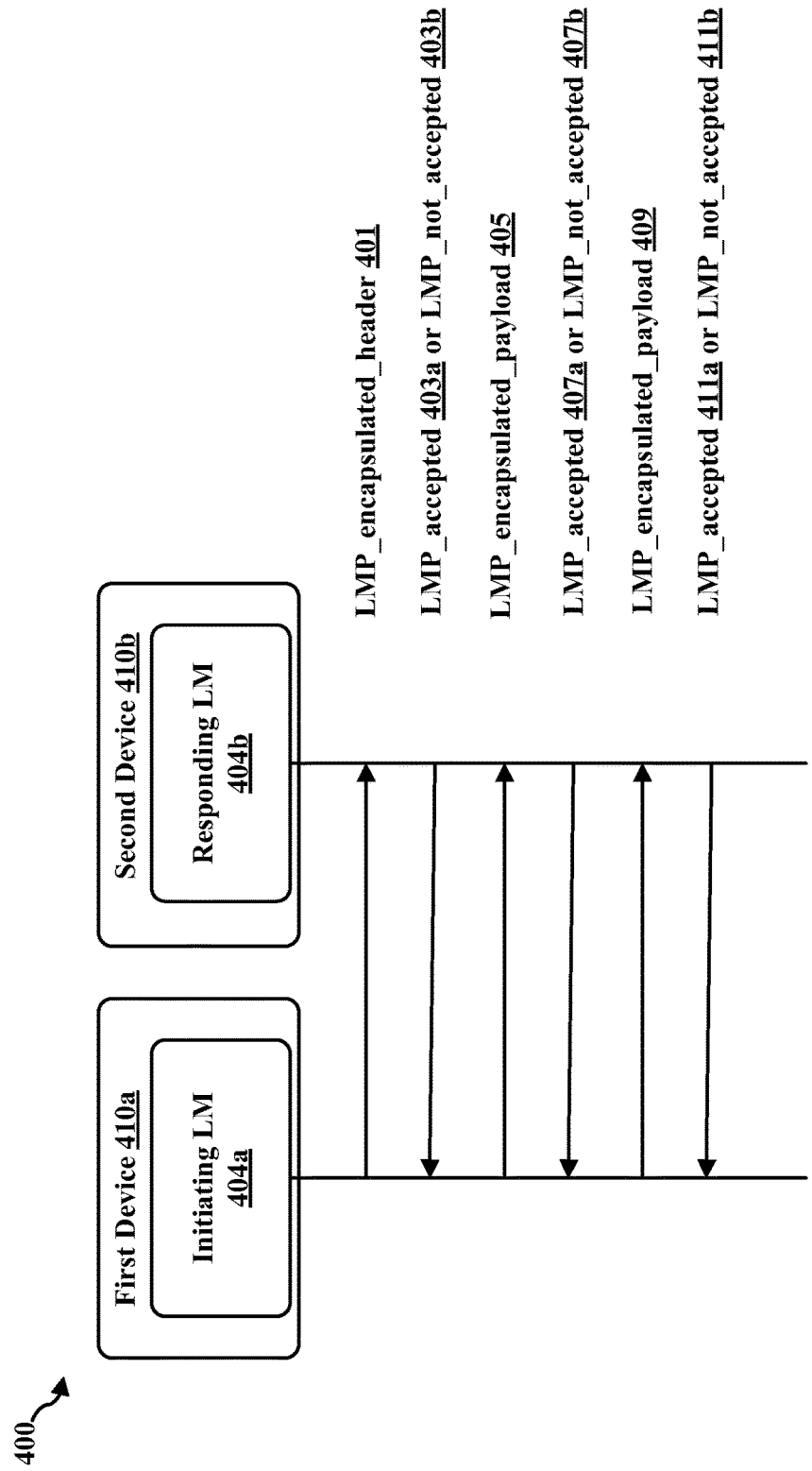
FIG. 4A illustrates a data flow that may be used to perform a LMP encapsulated PDU mechanism in accordance with certain aspects of the disclosure.

FIG. 4A illustrates a data flow 400 that may be used to perform a LMP encapsulated PDU mechanism in accordance with certain aspects of the disclosure. The LMP encapsulated PDU mechanism may be performed by an initiating LM 404a located at a first device 410a and a responding LM 404b located at a second device 410b. In certain aspects, the first device 410a and the second device 410b may be BLE enabled devices. In certain other aspects, the first device 410a and the second device 410b may be peer proprietary devices. The first device 410a may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The second device 410b may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The initiating LM 404a may correspond to, e.g., LM 315. The responding LM 404b may correspond to, e.g., LM 315.

Referring to FIG. 4A, the initiating LM 404a may transmit an LMP encapsulated header PDU 401 to the responding LM 404b. If the responding LM 404b is able to decode and/or recognize the LMP encapsulated header PDU 401, the responding LM 404b may transmit a LMP accepted PDU 403a to the initiating LM 404a indicating that the LMP encapsulated header PDU 401 was decoded and/or recognized by the responding LM 404b.

Otherwise, the responding LM 404b may transmit a LMP not accepted PDU 403b to the initiating LM 404a indicating that the LMP encapsulated header PDU 401 is not decoded and/or recognized by the responding LM 404b. When the LMP encapsulated not accepted PDU 403b is received by the initiating LM 404a, the initiating LM 404a may abort the LMP encapsulated PDU mechanism or retransmit the LMP encapsulated header PDU 401.

When the initiating LM 404a receives an LMP accepted PDU 403a, the initiating LM 404a may transmit an LMP encapsulated payload PDU 405 to the responding LM 404b. If the responding LM 404b is able to decode and/or recognize the LMP encapsulated payload PDU 405, the responding LM 404b may transmit an LMP accepted PDU 407a to the initiating LM 404a indicating that the LMP encapsulated payload PDU 405 is decoded and/or recognized by the responding LM 404b.

Otherwise, the responding LM 404b may transmit an LMP encapsulated not accepted PDU 407b indicating that the LMP encapsulated payload PDU 405 is not decoded and/or recognized by the responding LM 404b. When the LMP encapsulated not accepted PDU 407b is received by the initiating LM 404a, the initiating LM 404a may abort the LMP encapsulated PDU mechanism or retransmit the LMP encapsulated payload PDU 405.

If the initiating LM 404a has an additional LMP encapsulated payload PDU 409 and an LMP accepted PDU 407a is received, the initiating LM 404a may transmit the additional LMP encapsulated payload PDU 409 to the responding LM 404b. If the responding LM 404b is able to decode and/or recognize the LMP encapsulated payload PDU 409, the responding LM 404b may transmit an LMP accepted PDU 411a to the initiating LM 404a indicating that the LMP encapsulated payload PDU 409 is decoded and/or recognized by the responding LM 404b.

Otherwise, the responding LM 404b may transmit an LMP encapsulated not accepted PDU 411b indicating that the LMP encapsulated payload PDU 409 is not decoded and/or recognized by the responding LM 404b. If the LMP encapsulated not accepted PDU 411b is received by the initiating LM 404a, the initiating LM 404a may abort the LMP encapsulated PDU mechanism or retransmit the LMP encapsulated payload PDU 409.

Figure 4B:
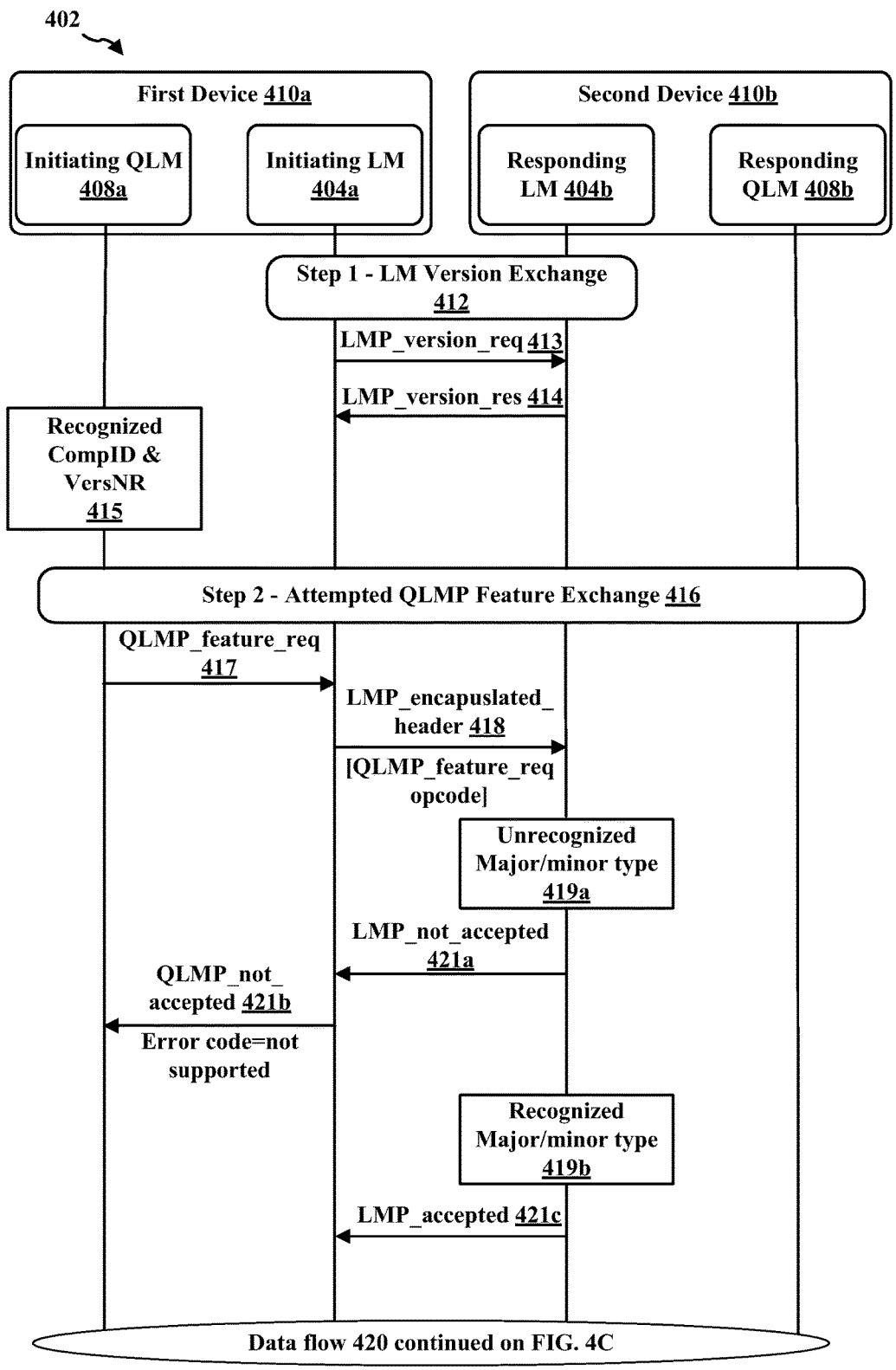
FIGS. 4B and 4C illustrate a data flow that may be used to perform a QLMP discovery and exchange procedure in accordance with certain aspects of the disclosure.
Figure 4C:
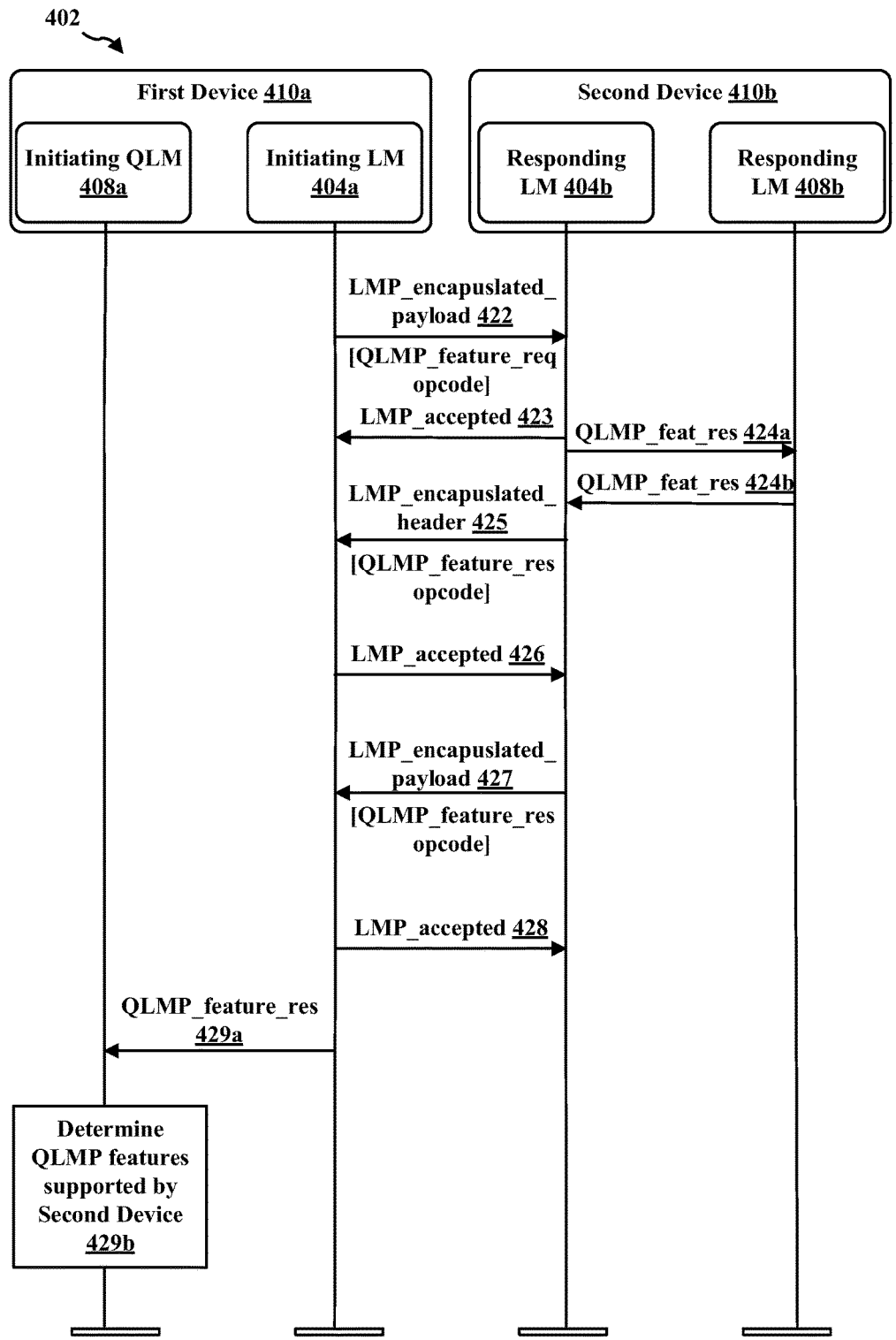

FIGS. 4B and 4C illustrate a data flow 402 that may be used to perform a QLMP discovery and exchange procedure in accordance with certain aspects of the disclosure. The QLMP feature discovery and exchange procedure illustrated in FIGS. 4B and 4C may be performed by a first device 410a and a second device 410b. The first device 410a may be an initiator. The first device 410a may include an initiating LM 404a and an initiating QLM 408a. The second device 410b may be a responder. The second device 410b may include a responding LM 404b and a responding QLM 408. In certain aspects, the first device 410a and the second device 410b may be BLE enabled devices. In certain other aspects, the first device 410a and the second device 410b may be peer proprietary devices. The first device 410a may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The second device 410b may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The initiating LM 404a may correspond to, e.g., LM 315. The responding LM 404b may correspond to, e.g., LM 315. The initiating QLM 408a may correspond to, e.g., QLM 317. The responding QLM 408 may correspond to, e.g., QLM 317. The QLMP PDUs illustrated in FIGS. 4B and 4C may be tunneled through the LMP encapsulated PDU mechanism described above with reference to FIG. 4A.

In certain configurations, the first device 410a may correspond to, e.g., wireless earbud 108a, and the second device 410b may correspond to, e.g., wireless earbud 108b. In certain other configurations, the first device 410a may to, e.g., one of the wireless earbuds 108a, 108b, and the second device 410b may correspond to, e.g., the central device 102.

Referring to FIG. 4B, a transaction may include a set of messages (e.g., PDUs) that may be transmitted between the LMs 404a, 404b and/or the QLMs 408a, 408b to achieve a particular purpose, e.g., such as QLM discovery, QLMP feature discovery, and/or QLMP feature exchange. The transaction may include the exchange of a plurality of PDUs that include the same transaction ID (TID). For example, all PDUs exchanged during QLM discovery may include a first TID, and all PDUs exchanged during QLMP feature discovery may include a second TID that is different than the first TID.

Opcodes may be included in a QLMP PDU and/or LMP encapsulated PDU to uniquely identify different types of PDUs. LMP PDUs may be denoted by LMP_message_name PDU, and the QLMP PDUs may be denoted by QLMP_message_name PDU. For example, the PDU to establish a connection with a remote device may be denoted as LMP_host_connection_req PDU (e.g., see FIG. 4F). The PDU to discover shared QLMP features may be denoted as QLMP_feature_req PDU.

Each QLMP PDU may include an opcode with a predetermined number of bits (e.g., 16 bits) used to identify the type of QLMP PDU being communicated. The opcode major type value used for QLM may be, e.g., 0x51. The QLMP PDU opcode may be overlaid with the LMP encapsulated PDU major and minor type fields to facilitate complete reception of the opcode field within the LMP encapsulated header PDU. An example mapping of an opcode to the major type and minor type fields of an LMP encapsulated header is illustrated below in Table 3.

TABLE 3

Opcode Mapping to Major Type Field and Minor Type Field in a LMP encapsulated header PDU

| Major Type | Minor Type |
|---|---|
| b7 b6 b5 b4 b3 b2 b1 b0 | b7 b6 b5 b4 b3 b2 b1 b0 |
| Opcode [15-8] | Opcode [7-0] |

QLMP may use the same LMP TID field in the LMP_encapsulated_header and LMP_encapsulted_payload PDUs.

Referring to FIG. 4B, the QLM discovery, QLMP feature discovery, and QLMP feature exchange procedures may begin with a LM version exchange 412. For example, the LM version exchange 412 may include a transmission of a LMP_version_req PDU 413 by the initiating LM 404a to the responding LM 404b. The LM version exchange 412 may also include the responding LM 404b transmitting a LMP_version_res PDU 414 to the initiating LM 404b.

In certain implementations, the LMP_version_req PDU 413 may include one or more of a first company identification (CompID) that is associated with the initiating LM 404a, a first version number (VersNr) that specifies the version of the LMP that is supported by the first device 410a, and/or a first SubVersNr that is associated with proprietary RF implementations, proprietary base band implementations, and/or proprietary LM implementations associated with the first device 410a. In certain other implementations, the LMP_version_req PDU 413 may not include one or more of a first CompID that is associated with the initiating LM 404a, a first VersNr that specifies the version of the LMP that is supported by the first device 410a, and/or a first SubVersNr that is associated with proprietary RF implementations, proprietary base band implementations, and/or proprietary LM implementations associated with the first device 410a.

The LMP_version_res PDU 414 may include one or more of a second CompID that is associated with the responding LM 404b, a second VersNr that specifies the version of the LMP that is supported by the second device 410b, and/or a second SubVersNr that is associated with proprietary RF implementations, proprietary base band implementations, and/or proprietary LM implementations associated with the second device 410b.

The initiating QLM 408a may determine (at 415) if one or more of the second CompID, the second VersNr, and/or the second SubVersNr included in the LMP_version_res PDU 414 are associated with a recognized QLM (e.g., if responding QLM 408b is associated with the same company as initiating QLM 408a). For example, the initiating QLM 408a may compare one or more of the second CompID, the second VersNr, and/or the second SubVersNr to a list of proprietary CompIDs, VersNrs, and/or SubVersNrs that are associated with the initiating QLM 408a, and hence, considered valid. Valid VersNr and SubVersNr for each valid CompID are shown below in Table 4.

TABLE 4

Valid VersNr and SubVersNrs for each Valid CompID

| CompID | VersNr | SubVersNr |
|---|---|---|
| 0x001D (Proprietary) | 9 (v5.0) | X |
| 0x000A (QTIL) | 9 (v5.0) | Y |

The first device 410a may attempt (at 416) QLMP feature exchange with the second device 410b when it is determined (at 415) that the second device 410b includes a QLM that is recognized by the first device 410a. QLMP feature exchange may include operations 417-423 in FIGS. 4B and 4C.

In certain configurations, the initiating QLM 408a may send a QLMP_feature_req PDU 417 to the initiating LM 404a. The initiating LM 404a may tunnel the QLMP_feature_req PDU 417 to the responding LM 404b by including a QLMP_feature_req opcode in a LMP_encapsulated_header PDU 418 that is transmitted to the responding LM 404b. In certain configurations, the QLMP_feature_req opcode may be used to test whether any QLMP features are supported by the responding QLM 408b.

Requested and/or supported QLMP features may be represented as a bit mask transferred in the QLMP_feature_req PDU 417 and QLMP_feature_res PDU 429. The bit mask may include, e.g., 16 bytes. An example bit map that may be included in one or more of QLMP_feature_req PDU 417 and QLMP_feature_res PDUs 429 is illustrated below in Table 5.

TABLE 5

Example Bit Map of Requested/Supported QLMP features

| No. | QLMP Feature | Byte | Bit |
|---|---|---|---|
| 0 | Virtual Addressing | 0 | 0 |
| 1 | Inter-Virtual Device Messaging | 0 | 1 |
| 2 | TWS Audio Path Configuration | 0 | 2 |
| 3 | Split ACL | 0 | 3 |
| 4 | TWS eSCO | 0 | 4 |
| 5 | eSCO DTX | 0 | 5 |
| 6 | Higher Layer Channel Messages | 0 | 6 |

When the responding LM 404b determines (at 419a) that the major type and/or the minor type included in the QLMP_feature_req opcode is not recognized (e.g., the requested QLMP_feature is not supported), the responding LM 404b may transmit an LMP_not_accepted PDU 421a to the initiating LM 404a. The initiating LM 404a may send a QLMP not_accepted PDU 421b to the initiating QLM 408a. The QLMP not_accepted PDU 421b may include an error code that indicates that the requested QLMP features are not supported by the second device 410b.

The QLMP_not_accepted PDU 421b and/or a QLMP_accepted PDU 421a may be tunneled through the LM encapsulated PDUs mechanism. If the responding QLM 408b receives an encapsulated PDU with an unrecognized QLM opcode (valid major type and unknown minor), the responding QLM 408 may respond with a QLMP_not_accepted PDU. Unrecognized major not be responded to at the QLM layer. The feature bit and contents of a QLMP_accepted PDU and QLMP_not_accepted PDU are illustrated below in Table 6.

TABLE 6

Feature Bit and Contents of a QLMP_accepted PDU and a QLMP_not_accepted PDU

| Feature Bit | PDU | Contents |
|---|---|---|
| M | QLMP_accepted | None |
| M | QLMP_not_accepted | Q Error code |

Error codes, such as the error code included in the QLMP_not_accepted PDU 421b may include a single byte value. Q Error Codes, as illustrated below in Table 7, may be a two byte value.

TABLE 7

Q Error Codes

| Q Error Code Value | Name |
|---|---|
| 0x0000-0x00FF | Defined by Bluetooth Core Specification, Volume 2, Part D |
| 0x0100-0x01FF | Reserved for Future Proprietary Use (RFQU) |

Alternatively, when the responding LM 404b determines (at 419b) that the major type and/or the minor type included in the QLMP_feature_req opcode is recognized (e.g., QLMP_feature(s) are supported), the responding LM 404b may respond to the LMP_encapsulated_header PDU 418 that includes the QLMP_feature_req opcode with a LMP_accepted PDU 421c.

Referring to FIG. 4C, the initiating LM 404a may send a LMP_encapsulated_payload PDU 422 that includes the QLMP_feature_req opcode to the responding LM 404b. When the LMP_encapsulated_payload PDU 422 that includes the QLMP_feature_req opcode is decoded and/or recognized, the responding LM 404b may transmit an LMP_accepted PDU 423 to the initiating LM 404a. Otherwise, the responding LM 404b may send a LMP_not_accepted PDU (not shown).

In certain configurations, the responding LM 404b may transmit a QLMP_feature_res PDU 424a to the responding QLM 408b. The responding QLM 408b may transmit a QLMP_feature_res PDU 424b to the responding LM 404b (e.g., that includes a bit map of supported QLMP features).

The responding LM 404b may transmit a LMP_encapsulated_header PDU 425 that includes a QLMP_feature_res_opcode to the initiating LM 404a. The QLMP_feature_res opcode may indicate that the requested QLMP_feature is supported by the second device 410b. When the initiating LM 404a decodes and/or recognizes the LMP_encapsulated_header PDU 425 that includes the QLMP_feature_res opcode, the initiating LM 404a may respond by transmitting a LMP_accepted PDU 426 to the responding LM 404b. Otherwise, the initiating LM 404a may send a LMP_not_accepted PDU (not shown).

In certain configurations, the responding LM 404b may transmit a LMP_encapsulated_payload PDU 427 that includes the QLMP_feature_res opcode and/or the QLMP_feature bit mask to the initiating LM 404a. When the initiating LM 404a decodes and/or recognizes the LMP_encapsulated_payload PDU 427 that includes the QLMP_feature_res opcode and/or the QLMP_feature bit map, the initiating LM 404a may respond by transmitting a LMP_accepted PDU 428 to the responding LM 404b. Otherwise, the initiating LM 404a may send a LMP_not_accepted PDU (not shown).

The initiating LM 404a may send a QLMP_feature_res PDU 429a (e.g., the includes the QLMP_feature bit mask from the responding QLM 408b) to the initiating QLM 408a to indicate QLMP features supported by the second device 410b (e.g., the responding LM 408b). The initiating QLM 408a may determine (at 429b) the QLMP features supported by the second device 410b based at least in part on the QLMP feature bit mask included in the QLMP_feature_res PDU 429a.

Using the mechanism described above with reference to FIGS. 4B and 4C, a first device of the present disclosure may be able to determine if a second device has a proprietary QLM, and if there are any shared QLMP features. When the first device and the second device share one or more QLMP features (e.g., virtual addressing, inter-virtual device messaging, TWS audio path configuration, split ACL, eSCO DTX, and/or higher layer channel messaging), the first device and/or the second device may implement the shared QLMP features, e.g., as described below with reference to FIGS. 4D-4L.

Figure 4D:
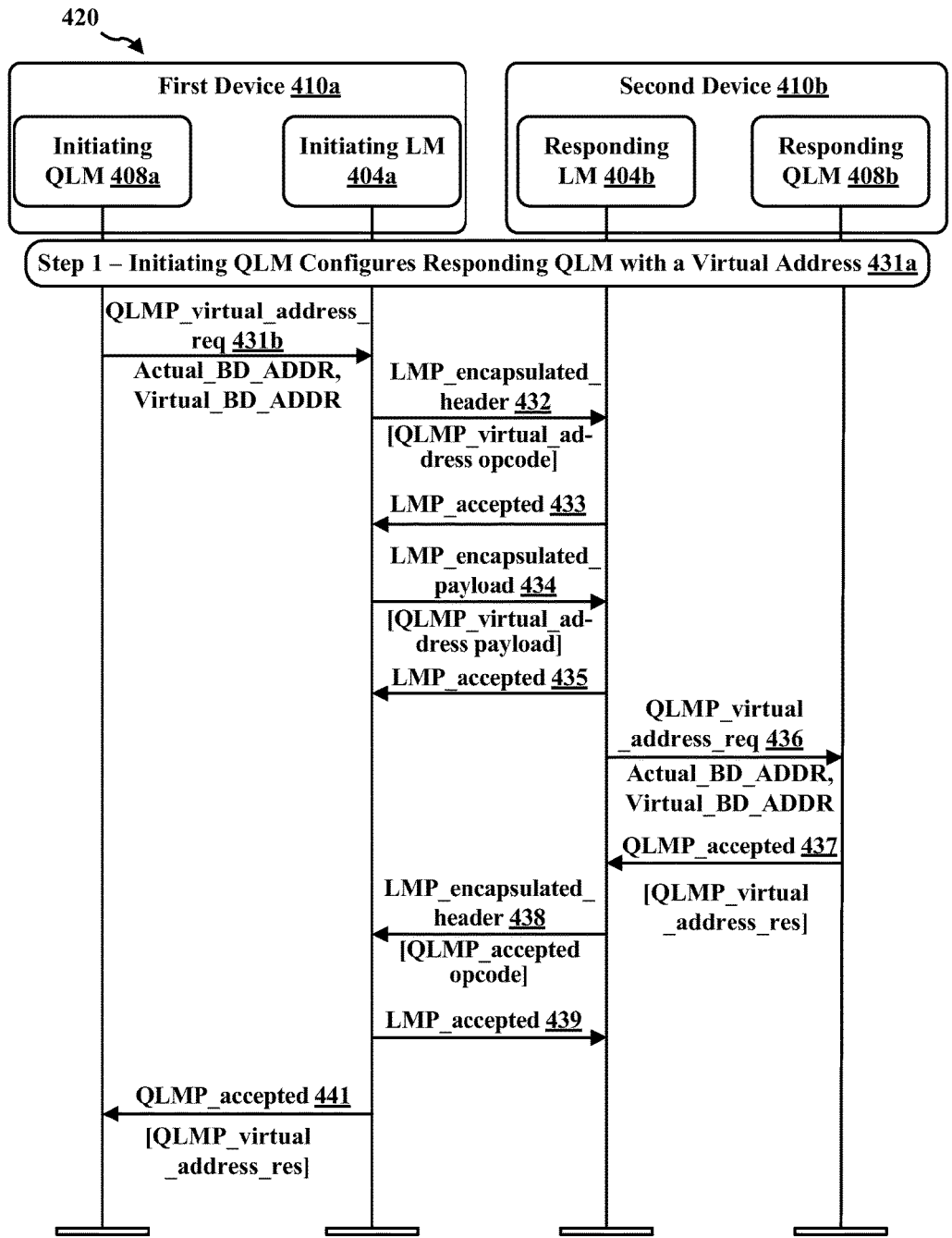
FIG. 4D illustrates a data flow that may be used to configure a remote device with a virtual address in accordance with certain aspects of the disclosure.

FIG. 4D illustrates a data flow 420 that may be used to configure a remote device with a virtual address in accordance with certain aspects of the disclosure. The virtual address configuration procedure illustrated in FIG. 4D may be performed by a first device 410a and a second device 410b. The first device 410a may be an initiator. The first device 410a may include an initiating LM 404a and an initiating QLM 408a. The second device 410b may be a responder. The second device 410b may include a responding LM 404b and a responding QLM 408b. In certain aspects, the first device 410a and the second device 410b may be BLE enabled devices. In certain other aspects, the first device 410a and the second device 410b may be peer proprietary devices. The first device 410a may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The second device 410b may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The initiating LM 404a may correspond to, e.g., LM 315. The responding LM 404b may correspond to, e.g., LM 315. The initiating QLM 408a may correspond to, e.g., QLM 317. The responding QLM 408b may correspond to, e.g., QLM 317. The QLMP PDUs illustrated in FIG. 4D may be tunneled through the LMP encapsulated PDU mechanism described above with respect to FIG. 4A.

The virtual addressing procedure illustrated in FIG. 4D may occur when the first device 410a determines during the QLMP feature exchange 416 in FIGS. 4B and 4C that the second device 410b supports virtual addressing. In certain configurations, the first device 410a may correspond to, e.g., wireless earbud 108a, and the second device 410b may correspond to, e.g., wireless earbud 108b.

A remote device (e.g., the first device 410a or the second device 410b) may utilize a virtual address for the purposes of communicating with a remote Host (e.g., the central device 102, the third device 410c seen in FIGS. 4F-4H and 4L). The first device 410a that supports virtual addressing may share the virtual address with the second device 410b when the first device 410a and the second device 410b act as one virtual device. For example, each earbud in a TWS pair may act as one virtual device when communicating with a remote handheld device. Acting as one virtual device may enable the first device 410a and the second device 410b to appear as a single device from the perspective of the remote Host (e.g., central device 102, the third device 410c seen in FIGS. 4F-4H and 4L). The feature bit and contents of a QLMP_virtual_address_req PDU and a QLMP_virtual_address_res PDU that are exchanged during the virtual addressing procedure are illustrated below in Table 8.

TABLE 8

Feature Bit and Contents of a QLMP_virtual_address_req PDU and a QLMP_virtual_address_res PDU

| Feature Bit | PDU | Contents |
| --- | --- | --- |
| 0 | QLMP_virtual_address_req | Address_Type, BD_ADDR |
| 0 | QLMP_virtual_address_res | Address_Type, BD_DDR |

As seen above in Table 8, the contents in a QLMP_virtual_address_req PDU may indicate the address type (e.g., Actual_Bluetooth device (BD)_address (ADDR) and/or Virtual_BD_ADDR). The Actual_BD_ADDR may be the actual BT address associated with, e.g., the first device 410a. The Virtual_BD_ADDR may be the PAIR_BD_ADDR associated with the first device 410a and the second device 410b when either the first device 410a and/or the second device 410b is communicating with a remote host.

Table 9 shown below indicates the scenarios in which the Actual_BD_ADDR is used and the scenarios in which the Virtual_BD_ADDR is used when the virtual address QLMP_ feature is disabled and enabled. In certain scenarios, a device may also enable page scanning on the Actual_BD_ADDR. When scanning on the Actual_BD_ADDR is successful, the connection (e.g., with the third device 410c) may be performed as if virtual addressing is disabled.

TABLE 9

Actual_BD_ADDR and Virtual_BD_ADDR use cases

| Virtual Addressing | Page Scanning | Page Response | Inquiry Response | Link Manager Functions | Host Functions |
| --- | --- | --- | --- | --- | --- |
| Disabled | Actual | Actual | Actual | Actual | Actual |
| Enabled | Virtual | Actual | Virtual | Actual | Virtual |

Referring to FIG. 4D, the initiating QLM 408a at the first device 410a may configure (at 431a) the responding QLM 408 at the second device 410b with a virtual address, as described below with reference to operations 431b-441.

The initiating QLM 408a may send a QLMP_virtual_address_req PDU 431b to the initiating LM 404a. The QLMP_virtual_address_req PDU 431b may include information associated with the Actual_BD_ADDR of the first device 410a and the Virtual_BD_ADDR associated with the first device 410a and the second device 410b pair. The initiating LM 404a may send a LMP_encapsulated_header PDU 432 to the responding LM 404b. The LMP_encapsulated_header PDU 432 may include a QLMP_virtual_address_opcode.

When the responding LM 404b determines that the major type and/or the minor type included in the QLMP_feature_req opcode is not recognized (e.g., the virtual addressing feature is not supported/not enabled by the second device 410b), the responding LM 404b may respond to the LMP_encapsulated_header PDU 432 with an LMP_not_accepted PDU (not shown). When the LMP_not_accepted PDU is received, the first device 410a may abort the virtual addressing procedure.

Alternatively, as shown in FIG. 4D, when the responding LM 404b determines that the major type and/or the minor type included in the QLMP_feature_req opcode is recognized (e.g., the virtual addressing feature is supported/enabled by the second device 410b), the responding LM 404b may send an LMP_accepted PDU 433 to the initiating LM 404a.

When the LMP_accepted PDU 433 is received, the initiating LM 404a may send an LMP_encapsulated_payload PDU 434 that includes a QLMP_virtual_address_payload to the responding LM 404b. In certain configurations, the QLMP_virtual_address_payload PDU 434 may include information associated with the Actual_BD_ADDR associated with the first device 410a and the Virtual_BD_ADDR associated with the first device 410a and the second device 410b.

When the responding LM 404b is unable to receive and/or decode the LMP_encapsulated_payload PDU 434, the responding LM 404b may respond to the LMP_encapsulated_payload PDU 434 with an LMP_not_accepted PDU (not shown). When the LMP_not_accepted PDU is received, the first device 410a may abort the virtual addressing procedure.

Alternatively, as shown in FIG. 4D, when the responding LM 404b receives and/or decodes the LMP_encapsulated_payload PDU 434, the responding LM 404b may send an LMP_accepted PDU 435 to the initiating LM 404a. The responding LM 404b may also send a QLMP_virtual_address_req PDU 436 to the responding QLM 408b. The QLMP_virtual_address_req PDU 436 may including information associated with the first device's Actual_BD_ADDR and the Virtual_BD_ADDR associated with both the first device 410a and the second device 410b. When the responding QLM 408b maintains the Actual_BD_ADDR of the first device 410a and the Virtual_BD_ADDR associated with both the first device 410a and the second device 410b, the responding QLM 408b may send a QLMP_accepted PDU 437 (e.g., a QLMP_virtual_address_res) to the responding LM 404b.

The responding LM 404b may send a LMP_encapsulated_header PDU 438 that includes the QLMP_accepted opcode (e.g., QLMP_virtual_address_res opcode) to the initiating LM 404a. When the LMP_encapsulated_header PDU 438 is received and decoded, the initiating LM 404a may send a LMP_accepted PDU 439 to the responding LM 404b.

The initiating LM 404a may send a QLMP_accepted PDU 441 (e.g., QLMP_virtual_address_res) to the initiating QLM 408a indicating that the Actual_BD_ADDR of the first device 410a and the Virtual_BD_ADDR associated with the first device 410a and the second device 410b is maintained by the second device 410b.

Alternatively, when the LMP_encapsulated_header PDU 438 is not received and/or decoded, the initiating LM 404a may send a LMP_not_accepted PDU (not shown) to the responding LM 404b. The responding LM 404b may resend the LMP_encapsulated_header PDU 438 when the LMP_not_accepted PDU is received.

Using the mechanism described above with reference to FIG. 4D, the first device 410a addressing may share the virtual address with the second device 410b so that the first device 410a and the second device 410b act as one virtual device when communicating with a third device (e.g., a handheld host).

Figure 4E:
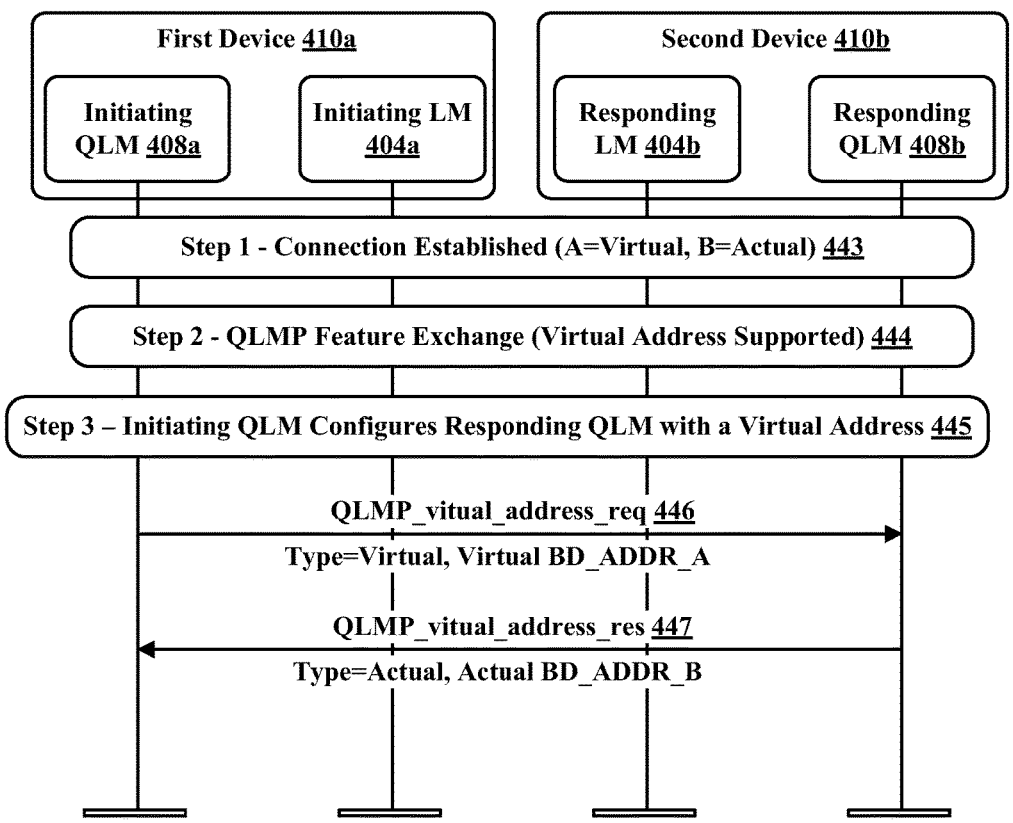
FIG. 4E illustrates a data flow that may be used to configure a remote device with a virtual address in accordance with certain aspects of the disclosure.

FIG. 4E illustrates a data flow 430 that may be used to configure a remote device with a virtual address in accordance with certain aspects of the disclosure. The virtual address configuration procedure illustrated in FIG. 4E may be performed by a first device 410a and a second device 410b. The first device 410a may be an initiator. The first device 410a may include an initiating LM 404a and an initiating QLM 408a. The second device 410b may be a responder. The second device 410b may include a responding LM 404b and a responding QLM 408. In certain aspects, the first device 410a and the second device 410b may be BLE enabled devices. In certain other aspects, the first device 410a and the second device 410b may be peer proprietary devices. The first device 410a may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The second device 410b may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The initiating LM 404a may correspond to, e.g., LM 315. The responding LM 404b may correspond to, e.g., LM 315. The initiating QLM 408a may correspond to, e.g., QLM 317. The responding QLM 408 may correspond to, e.g., QLM 317. The QLMP PDUs illustrated in FIG. 4E may be tunneled through the LMP encapsulated PDU mechanism described above with respect to FIG. 4A. For simplicity, QLMP PDUs are illustrated in FIG. 4E as being transmitted directly between the initiating QLM 408a and the responding QLM 408b without being tunneled the LMP_encapsulated PDU mechanism.

The virtual addressing procedure illustrated in FIG. 4E may occur when the first device 410a determines during the QLMP feature exchange 416 in FIGS. 4B and 4C that the second device 410b supports virtual addressing. In certain configurations, the first device 410a may correspond to, e.g., wireless earbud 108a, and the second device 410b may correspond to, e.g., wireless earbud 108b.

As seen in FIG. 4E, the first device 410a and the second device 410b may establish a connection (at 443) and the Actual_BD_ADDRs. The virtual address may be determined by the first device 410a. When Virtual Addressing is disabled, the device (e.g., the first device 410a and/or the second device 410b) sets the Address_Type to "Actual" and sets the BD_ADDR to the respective Actual BD_ADDR. When Virtual Addressing is enabled, a device (e.g., the first device 410a and/or second device 410b) sets the Address_Type to "Virtual" and sets the BD_ADDR to its Virtual_BD_ADDR.

The first device 410a and the second device 410b may perform QLMP feature exchange (at 444), e.g., as described above with reference to FIGS. 4B and 4C. When the QLMP virtual addressing feature is supported by both the first device 410a and the second device 410b, the initiating QLM 408a may initiate the Virtual Address sequence to configure and/or update (at 445) both devices with the Virtual_BD_ADDR. For example, the initiating QLM 408a may initiate the virtual address sequence by sending a QLMP_virtual_address_req 446 to the responding QLM 408. The QLMP_virtual_address_req 446 may include information associated with the virtual address for the first device 410a and the second device 410b.

When the second device 410b supports the QLMP virtual addressing feature, the actual BD_ADDR of the second device 410b may be included in the QLMP_virtual_address_res PDU 447 that is sent from the responding QLM 408. The first device 410a may map the actual address of the second device 410b to the virtual address. Similarly, the second device 410b may map the actual address of the first device 410a to the virtual address.

Using the mechanism described above with reference to FIG. 4E, the first device 410a may configure the second device 410b with a virtual address when the pair acts as one virtual device when communicating with a third device (e.g., handheld host).

Figure 4F:
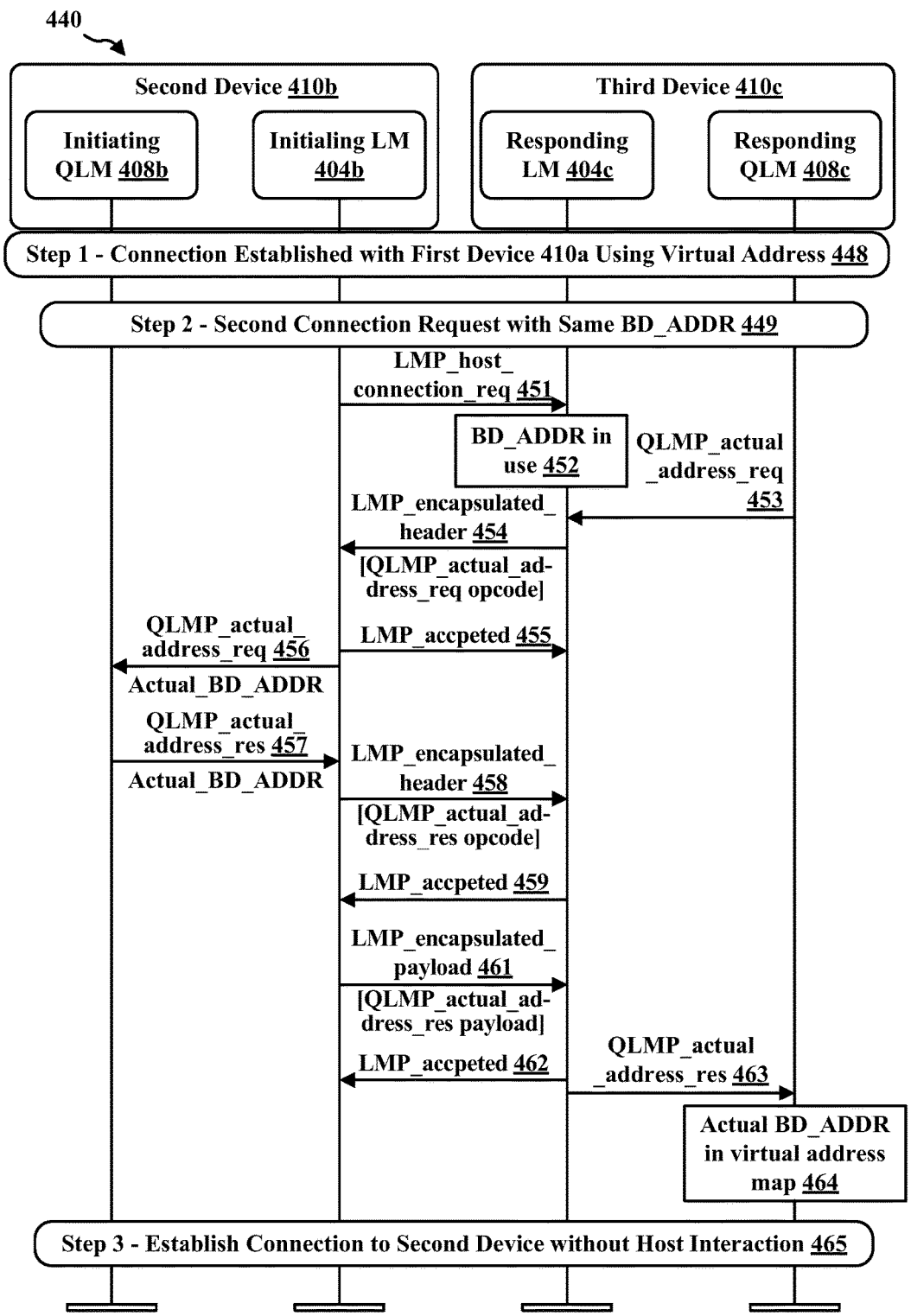
FIG. 4F illustrates a data flow that may be used to perform actual address verification of a second device by a third device when a connection between a first device and the third device has been established using a virtual address in accordance with certain aspects of the disclosure.

FIG. 4F illustrates a data flow 440 that may be used to perform actual address verification of a second device 410b by a third device 410c when a connection between a first device 410a and the third device 410c is established using a virtual address in accordance with certain aspects of the disclosure. The virtual address used to establish the previous connection between the first device 410a and the third device 410c may be associated with a first device (e.g., first device 410a) and the second device 410b. The second device 410b may be an initiator. The second device 410b may include an initiating LM 404b and an initiating QLM 408b. The third device 410c may be a responder. The third device 410c may include a responding LM 404c and a responding QLM 408c. In certain aspects, the first device 410a, the second device 410b and the third device 410c may be BLE enabled devices. In certain other aspects, the second device 410b and the third device 410c may be peer proprietary devices. The second device 410b may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The third device 410c may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The initiating LM 404b may correspond to, e.g., LM 315. The responding LM 404c may correspond to, e.g., LM 315. The initiating QLM 408b may correspond to, e.g., QLM 317. The responding QLM 408c may correspond to, e.g., QLM 317. The QLMP PDUs illustrated in FIG. 4F may be tunneled through the LMP encapsulated PDU mechanism described above with respect to FIG. 4A.

In certain configurations, the first device 410a may correspond to, e.g., wireless earbud 108a, the second device 410b may correspond to, e.g., wireless earbud 108b, and the third device 410c may correspond to, e.g., central device 102.

Since multiple devices (e.g., the first device 410a and the second device 410b) may be using the same virtual address, a single device in a device pair may use a host connection with the third device 410c for communications. A host connection with a second device in the device pair may be established but communications may not occur on the host connection. FIG. 4F illustrates how host connections with different devices using the same Virtual Address may be established.

When a connection is established from the first device 410a using a Virtual Address, if the second device 410b does not currently have a Host Connection using the same Virtual Address, a Host Connection may be established between the third device 410c and the first device 410a. The QLM/LM of the first device 410a may use the use the Virtual Address when communicating with the third device.

Connections from the second device 410b using the same Virtual Address may have a full host connection (e.g., QLM/LM connection) with the third device 410c, but may not communicate with the third device 410c.

The QLM of the third device 410c (e.g., responding QLM 408c) may maintain a database of all actual addresses associated with a particular virtual address. In the event that the first device 410a and the second device 410b are connected with the same Virtual Address to the third device 410c, and the first device 410a with the Host Connection disconnects for any reason (link supervision timeout, disconnect, etc.), when the second device 410b is synchronized with the state information associated with the third device 410c, the Host Connection may be re-assigned to the second device 410b.

Referring to FIG. 4F, a connection may be established (at 448) between a first device 410a (e.g., see FIGS. 4B-4E) and the third device 410c. The first device 410a may send information associated with a mapping of a virtual address (e.g., a Virtual_BD_ADDR associated with both the first device 410a and the second device 410b) to each of the actual addresses (e.g., Actual_BD_ADDRs) associated with each of the first device 410a and the second device 410b. The third device 410c may maintain a mapping of the virtual address and respective actual addresses associated with the first device 410a and the second device 410b.

At some time after the connection is established (at 448) between the first device 410a and the third device 410c, the second device 410b may request (at 449) to establish a connection with third device 410c. The request (at 449) may include information associated with the virtual address. The request (at 449) to establish a connection with the third device 410c may include operations 451-464 described below.

For example, the initiating LM 404b may send a LMP_host_connection_req PDU 451 to the responding LM 404c. The LMP_host_connection_req PDU 451 may include information associated with the virtual address that is associated with both the first device 410a and the second device 410b.

The third device 410c may determine (at 452) if the virtual address is presently in use by the third device 410c. When it is determined that the virtual address is presently in use, the responding QLM 408c may send a QLMP_actual_address_req PDU 453 to the responding LM 404c. The responding LM 404c may send a LMP_encapsulated_header PDU 454 that includes a QLMP_actual_address_req opcode to the initiating LM 404b.

When the initiating LM 404b determines that the major type and/or the minor type included in the QLMP_actual_address_req opcode is not recognized, the responding LM 404b may respond to the LMP_encapsulated_header PDU 432 with an LMP_not_accepted PDU (not shown). When the LMP_not_accepted PDU is received, the connection establishment procedure may be aborted.

Alternatively, as shown in FIG. 4F, when the initiating LM 404bb determines that the major type and/or the minor type included in the QLMP_actual_address_req opcode is recognized, the initiating LM 404b may send an LMP_accepted PDU 455 to the responding LM 404c.

The initiating LM 404b may send the QLMP_actual_address request PDU 456 to the initiating QLM 408b. The QLMP_actual_address request PDU 456 may indicate that the Actual_BD_ADDR of the second device 410b is requested by the third device 410c. The initiating QLM 408b may send a QLMP_actual_address_res PDU 457 that includes information associated with the Actual_BD_ADDR of the second device 410b to the initiating LM 404b.

The initiating LM 404b may send a LMP_encapsulated_header PDU 458 that includes a QLMP_actual_address_res opcode to the responding LM 404c. When the responding LM 404c determines that the major type and/or the minor type included in the QLMP_actual_address_res opcode is not recognized, the responding LM 404c may respond to the LMP_encapsulated_header PDU 458 with an LMP_not_accepted PDU (not shown). When the LMP_not_accepted PDU is received, the connection establishment procedure may be aborted.

Alternatively, as shown in FIG. 4F, when the responding LM 404c determines that the major type and/or the minor type included in the QLMP_actual_address_req opcode is recognized, the responding LM 404c may send an LMP_accepted PDU 459 to the initiating LM 404b.

The initiating LM 404b may send a LMP_encapsulated_payload PDU 461 that includes the QLMP_actual_address_payload to the responding LM 404c. When the responding LM 404c is unable to receive and/or decode the LMP_encapsulated_payload PDU 461, the responding LM 404c may respond to the LMP_encapsulated_payload PDU 461 with a LMP_not_accepted PDU (not shown in). When the LMP_not_accepted PDU is received, the connection establishment procedure may be aborted.

Alternatively, as shown in FIG. 4F, when the responding LM 404c is able to receive and/or decode the LMP_encapsulated_payload PDU 461, the responding LM 404c may send a LMP_accepted PDU 462 to the initiating LM 404b. The responding LM 404c may send the QLMP_actual_address_res PDU 463 to the responding QLM 408c. When the responding QLM 408c determines (at 464) that the Actual_BD_ADDR associated with the second device 410b is mapped to the virtual address (e.g., that was originally communicated by the first device 410a), the third device 410c may establish a connection (at 465) with the second device 410b.

By maintaining a database of all actual addresses associated with a virtual address, the third device 410c may establish a host connection with the second device 410b when a host connection with the first device 410a was previously established.

Figure 4G:
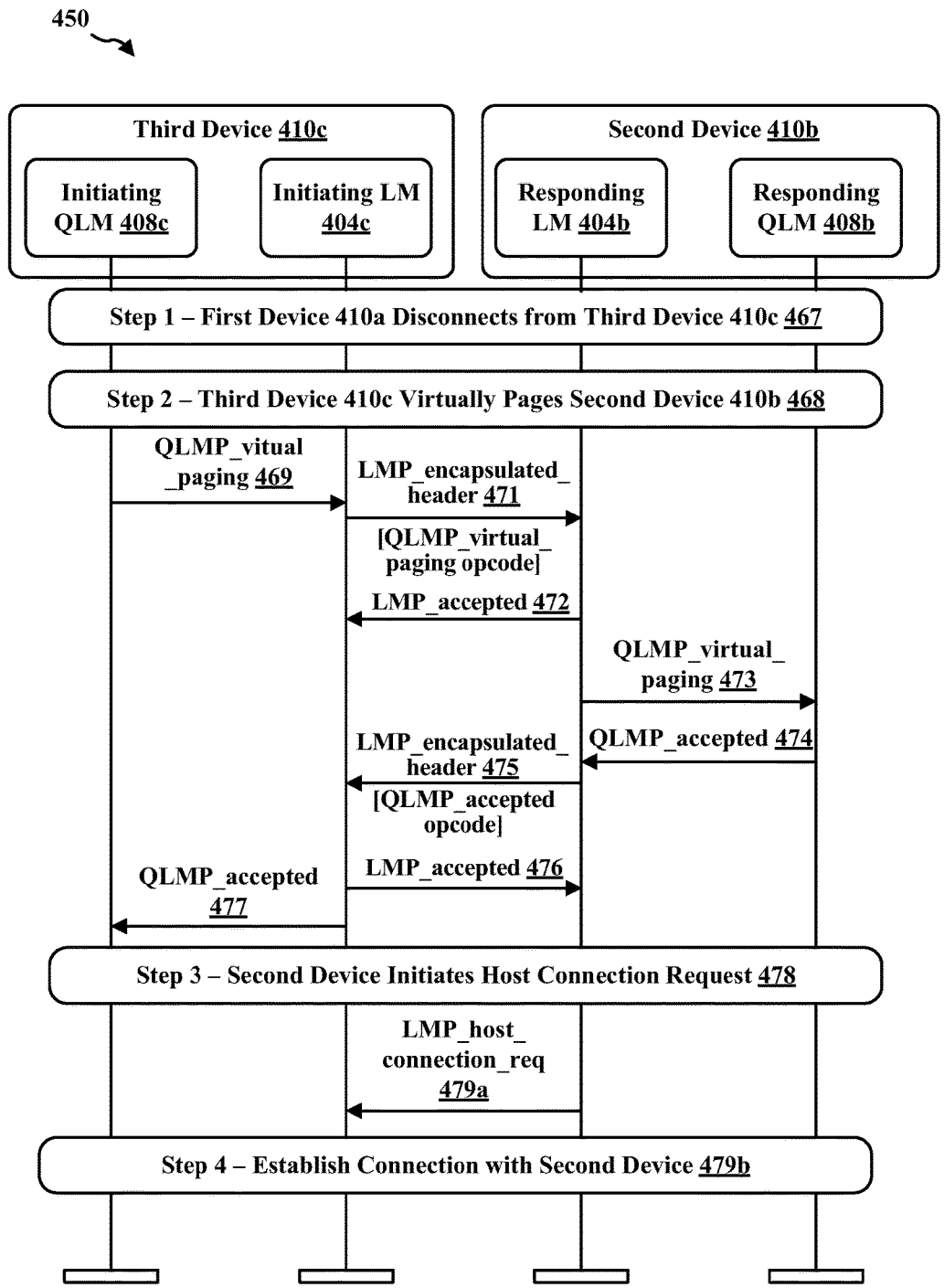
FIG. 4G illustrates a data flow that may be used to perform a virtual paging mechanism in accordance with certain aspects of the disclosure.

FIG. 4G illustrates a data flow 450 that may be used to perform a virtual paging mechanism in accordance with certain aspects of the disclosure. The virtual paging mechanism illustrated in FIG. 4G may be performed by a second device 410b and a third device 410c when a Host Connection between the third device 410c and a first device 410a is lost. The third device 410c may be an initiator. The third device 410c may include an initiating LM 404c and an initiating QLM 408c. The second device 410b may be a responder. The second device 410b may include a responding LM 404b and a responding QLM 408b. In certain aspects, the first device 410a, the second device 410b, and the third device 410c may be BLE enabled devices. In certain other aspects, the second device 410b and the third device 410c may be peer proprietary devices. The first device 410a may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The second device 410b may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The third device 410c may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The initiating LM 404c may correspond to, e.g., LM 315. The responding LM 404b may correspond to, e.g., LM 315. The initiating QLM 408c may correspond to, e.g., QLM 317. The responding QLM 408b may correspond to, e.g., QLM 317. The QLMP PDUs illustrated in FIG. 4G may be tunneled through the LMP encapsulated PDU mechanism described above with respect to FIG. 4A.

In certain configurations, the first device 410a may correspond to, e.g., wireless earbud 108a, the second device 410b may correspond to, e.g., wireless earbud 108b, and the third device 410c may correspond to, e.g., central device 102.

Referring to FIG. 4G, the first device 410a may disconnect (at 467) from the third device 410c. The first device 410a may disconnect (at 467) from the third device 410c due to, e.g., link supervision timeout. If the third device 410c has maintained a list of actual addresses that map to the virtual address used in the Host Connection with the first device 410a, the third device 410c may virtually page (at 468) the second device 410b when the first device 410a disconnects from the third device 410c. The third device 410c may virtually page (at 468) the second device 410b as described below with reference to operations 469-477.

For example, the initiating QLM 408c may send a QLMP_virtual_paging PDU 469 to the initiating LM 404c.

The initiating LM 404c may send a LMP_encapsulated_header PDU 471 including a QLMP_virtual_paging opcode to the responding LM 404b.

When the responding LM 404b determines that the major type and/or the minor type included in the QLMP_virtual_paging opcode is not recognized, the responding LM 404b may respond to the LMP_encapsulated_header PDU 471 with an LMP_not_accepted PDU (not shown). When the LMP_not_accepted PDU is received, the virtual paging procedure may be aborted.

Alternatively, as shown in FIG. 4G, when the responding LM 404b determines that the major type and/or the minor type included in the QLMP_virtual_paging opcode is recognized, the responding LM 404b may send an LMP_accepted PDU 472 to the initiating LM 404c.

The responding LM 404b may send the QLMP_virtual_paging PDU 473 to the responding QLM 408b. When the virtual paging is not supported and/or enabled by the second device 410b, the responding QLM 408b may send a QLMP_not_accepted PDU (not shown) to the responding LM 404b. The responding LM 404b may send a LMP_not_accepted PDU (not shown) to the initiating LM 404c. The virtual paging procedure may be aborted when the LMP_not_accepted PDU is received.

Alternatively, as illustrated in FIG. 4G, when virtual paging is supported and enabled by the second device 410b, the responding QLM 408b may send a QLMP_accepted PDU 474 to the responding LM 404b. The responding LM 404b may send a LMP_encapsulated_header PDU 475 that includes a QLMP_accepted opcode to the initiating LM 404c. When the initiating LM 404c determines that the major type and/or the minor type included in the QLMP_accepted opcode is not recognized, the initiating LM 404c may respond to the LMP_encapsulated_header PDU 475 with an LMP_not_accepted PDU (not shown). When the LMP_not_accepted PDU is received, the virtual paging procedure may be aborted.

Alternatively, as shown in FIG. 4G, when the initiating LM 404c determines that the major type and/or the minor type included in the QLMP_accepted opcode is recognized, the initiating LM 404c may send an LMP_accepted PDU 476 to the responding LM 404b.

The initiating LM 404c may send a QLMP_accepted PDU 477 to the initiating QLM 408c indicating that the virtual paging was received and accepted by the second device 410b.

The second device 410b may initiate (at 478) a Host Connection Request with the third device 410c. For example, the second device 410b may initiate (at 478) the Host Connection Request by sending a LMP_host_connection_req PDU 479a from the LM 404b (which is now the initiating LM) at the second device 410b to the LM 404c (which is now the responding LM) at the third device 410c. The third device 410c may establish (at 479b) a host connection with the second device 410b that may enable communications between the second device 410b and the third device 410c.

Using the virtual paging mechanism described above with reference to FIG. 4G, the third device 410c may be able to virtually page the second device 410b (e.g., using the virtual address) when a host connection is lost with the first device 410a. The second device 410b and the third device 410c may be able to establish a host connection after performing the virtual paging mechanism in order to maintain communications between the first device 410a/second device 410b pair and the third device 410c.

Figure 4H:
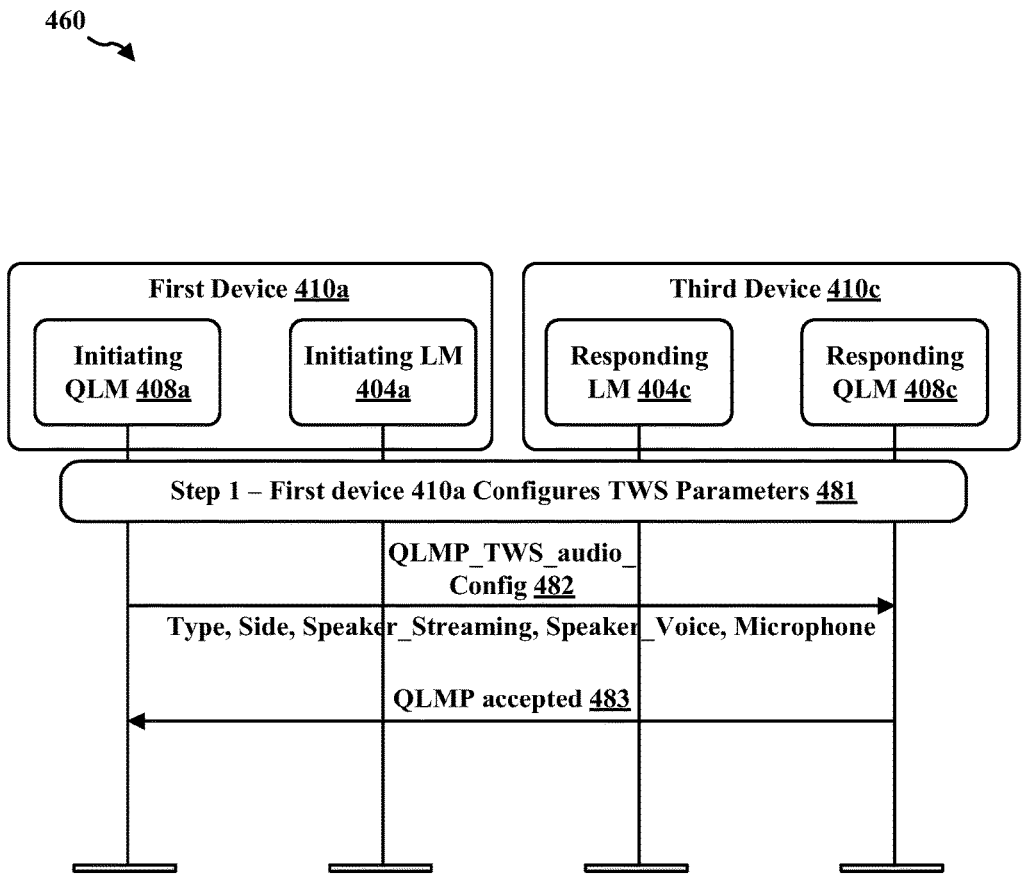
FIG. 4H illustrates a data flow that may be used to configure TWS communications in accordance with certain aspects of the disclosure.

FIG. 4H illustrates a data flow 460 that may be used to configure TWS communications in accordance with certain aspects of the disclosure. The TWS configuration procedure illustrated in FIG. 4H may be performed by a first device 410a and a third device 410c. The first device 410a may be an initiator. The first device 410a may include an initiating LM 404a and an initiating QLM 408a. The third device 410c may be a responder. The third device 410c may include a responding LM 404c and a responding QLM 408c. In certain aspects, the first device 410a and the third device 410c may be BLE enabled devices. In certain other aspects, the first device 410a and the third device 410c may be peer proprietary devices. The first device 410a may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The third device 410c may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The initiating LM 404a may correspond to, e.g., LM 315. The responding LM 404c may correspond to, e.g., LM 315. The initiating QLM 408a may correspond to, e.g., QLM 317. The responding QLM 408c may correspond to, e.g., QLM 317. The QLMP PDUs illustrated in FIG. 4H may be tunneled through the LMP encapsulated PDU mechanism described above with respect to FIG. 4A. For simplicity, QLMP PDUs are illustrated in FIG. 4H as being transmitted directly between the initiating QLM 408a and the responding QLM 408c without being tunneled the LMP_encapsulated PDU mechanism.

TWS communications may be enabled when the first device 410a determines during the QLMP feature exchange 416 in FIGS. 4B and 4C that the third device 410c supports TWS communications. In certain configurations, the first device 410a may correspond to, e.g., wireless earbud 108a, and the second device 410b may correspond to, e.g., central device 102. In certain other configurations, the first device 410a may correspond to, e.g., wireless earbud 108a, and the third device 410c may correspond to, e.g., wireless earbud 108b. The third device 410c may correspond to the second device 410b in FIGS. 4B and 4C.

TWS earbuds (e.g., earbud 108a, 108b) may act as a single device from the perspective of the audio source device (e.g., central device 102). Since the earbuds may be independent devices, and there is flexibility on whether each earbud will be in the user's ear, configuration may be used to improve routing of audio data for streaming and voice use cases to a particular earbud.

The first device 410a may configure (at 481) various TWS parameters, such as, TWS type (e.g., mono or stereo), TWS side (e.g., left, right, or left and right), speaker streaming (e.g., enabled or disabled), speaker voice (e.g., enabled or disabled), and/or microphone (e.g., enabled or disabled), just to name a few. The configured TWS parameters may be conveyed to the third device 410c in a QLMP_TWS_audio_config PDU 482.

The feature bit and contents of a QLMP_TWS_audio_config PDU 482 are illustrated below in Table 10.

TABLE 10

The Feature Bit and Contents of a QLMP_TWS_audio_config PDU

| Feature Bit | PDU | Contents |
| --- | --- | --- |
| 2 | QLMP_TWS_audio_config | TWS_Type, TWS_Side, Speaker_Streaming, Speaker_Voice, Microphone |

To inform the proprietary controller at the third device 410c of the current audio path configuration of the first device 410a, when the first device 410a and the second device 410b support the TWS Audio Path Configuration QLMP feature, the initiating QLM 408a may send a QLMP_TWS_audio_config PDU 482 with the parameters set to the current state of each parameter to the responding QLM 408c at the third device 410c. The QLMP_TWS_audio_config PDU 482 may include information associated with the TWS parameters, such as, TWS type (e.g., mono or stereo), TWS side (e.g., left, right, or left and right), speaker streaming (e.g., enabled or disabled), speaker voice (e.g., enabled or disabled), and/or microphone (e.g., enabled or disabled), just to name a few.

The QLMP_TWS_audio_config PDU 482 may be sent after connection establishment (and before audio/video or eSCO connection establishment). The QLMP_TWS_audio_config PDU 482 may be also be sent whenever the state of any of the TWS parameters changes.

Some TWS parameters may remain constant for longer periods of time (e.g., TWS type and TWS side), as compared with other TWS parameters. The other parameters (e.g., speaker streaming, speaker voice, and/or microphone) may change more frequently than TWS type and TWS side, e.g., when an earbud is inserted or removed from an ear.

The speaker streaming parameter may be set based on whether the speaker path for streaming audio is enabled or disabled. The speaker voice parameter may be set based on whether the speaker path for voice is enabled or disabled. The speaker streaming and speaker voice parameters may be set the same or differently depending on the application.

The microphone parameter may be set based on whether the microphone path for voice is enabled or disabled. The application layer of a protocol stack may control whether the microphone path is enabled on the earbud.

After receiving the QLMP_TWS_audio_config PDU 482, the responding QLM 408c may respond with a QLMP_accepted PDU 483 indicating the TWS audio configurations are supported, and will be used for communications with the first device 410a.

Figure 4I:
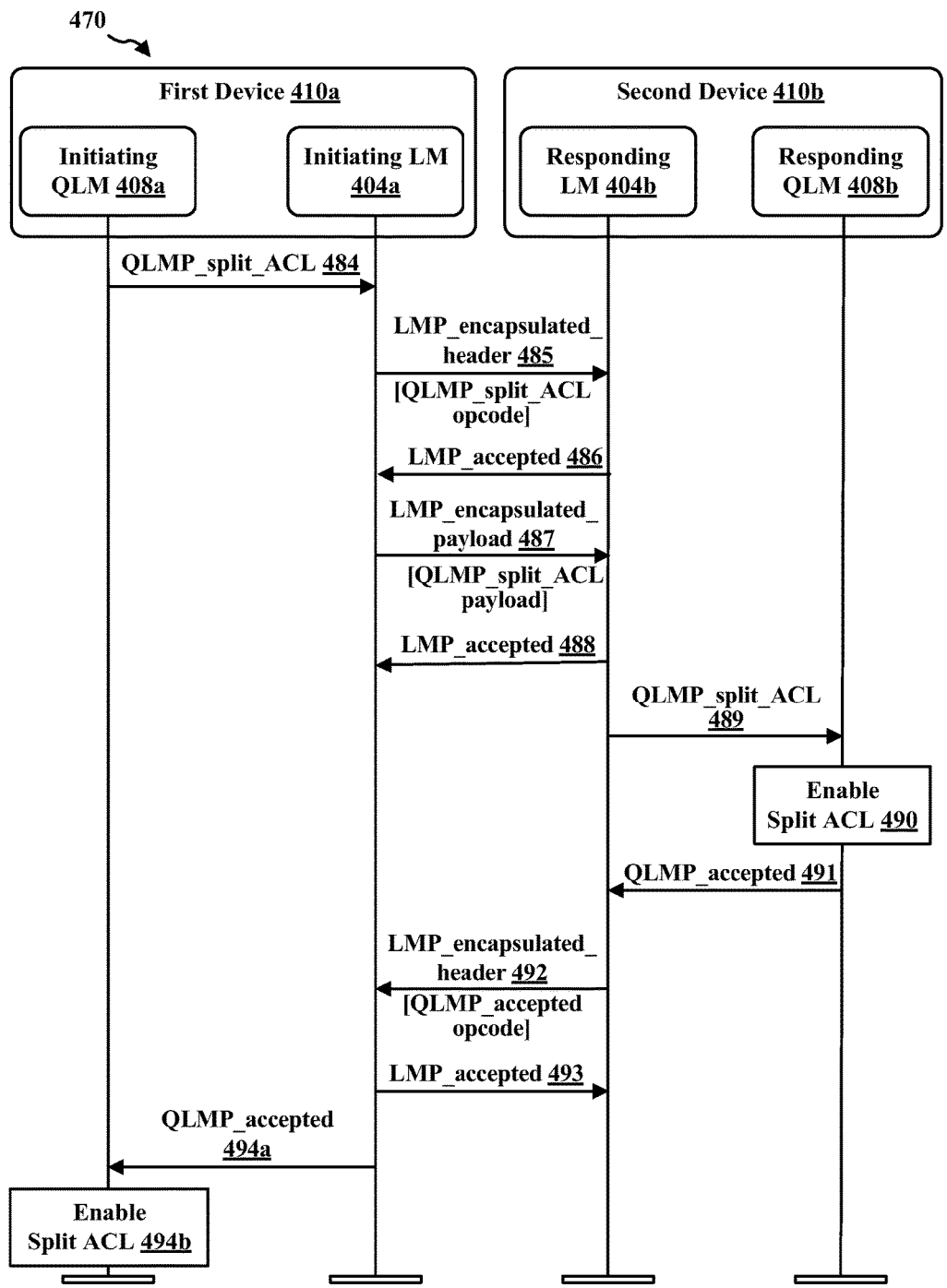
FIG. 4I illustrates a data flow that may be used to configure split ACL communications in accordance with certain aspects of the disclosure.

FIG. 4I illustrates a data flow 470 that may be used to configure split ACL communications in accordance with certain aspects of the disclosure. The split ACL configuration procedure illustrated in FIG. 4I may be performed by a first device 410a and a second device 410b. The first device 410a may be an initiator. The first device 410a may include an initiating LM 404a and an initiating QLM 408a. The second device 410b may be a responder. The second device 410b may include a responding LM 404b and a responding QLM 408b. In certain aspects, the first device 410a and the second device 410b may be BLE enabled devices. In certain other aspects, the first device 410a and the second device 410b may be peer proprietary devices. The first device 410a may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The second device 410b may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The initiating LM 404a may correspond to, e.g., LM 315. The responding LM 404b may correspond to, e.g., LM 315. The initiating QLM 408a may correspond to, e.g., QLM 317. The responding QLM 408b may correspond to, e.g., QLM 317. The QLMP PDUs illustrated in FIG. 4I may be tunneled through the LMP encapsulated PDU mechanism described above with respect to FIG. 4A.

Split ACL communications may be enabled when the first device 410a determines during the QLMP feature exchange 416 in FIGS. 4B and 4C that the second device 410b supports split ACL communications. In certain configurations, the first device 410a may correspond to, e.g., wireless earbud 108a, and the second device 410b may correspond to, e.g., central device 102. In certain other configurations, the first device 410a may correspond to, e.g., wireless earbud 108a, and the second device 410b may correspond to, e.g., wireless earbud 108b.

Referring to FIG. 4I, the initiating QLM 408a may send a QLMP_split_ACL PDU 484 to the initiating LM 404a. The initiating LM 404a may send a LMP_encapsulated_header PDU 485 including the QLMP_split_ACL_opcode to the responding LM 404b. When the responding LM 404b determines that the major type and/or the minor type included in the QLMP_split_ACL opcode is not recognized, the responding LM 404b may respond to the LMP_encapsulated_header PDU 485 with an LMP_not_accepted PDU (not shown). When the LMP_not_accepted PDU is received, the split_ACL configuration procedure may be aborted.

Alternatively, as shown in FIG. 4I, when the responding LM 404b determines that the major type and/or the minor type included in the QLMP_split_ACL opcode is recognized, the responding LM 404b may send an LMP_accepted PDU 486 to the initiating LM 404a.

When the LMP_accepted PDU 486 is received, the initiating LM 404a may send a LMP_encapsulated_payload PDU 487 that includes a QLMP_split_ACL payload to the responding LM 404b. When the responding LM 404b is unable to receive and/or decode the LMP_encapsulated_payload PDU 487, the responding LM 404b may send a LMP_not_accepted PDU (not shown). When the LMP_not_accepted PDU is received, the split_ACL configuration procedure may be aborted.

Alternatively, as shown in FIG. 4I, when the responding LM 404b receives and/or decodes the LMP_encapsulated_payload PDU 487, the responding LM 404b may send an LMP_accepted PDU 488 to the initiating LM 404a. The responding LM 404b may also send a QLMP_split_ACL PDU 489 to the responding QLM 408b. The responding QLM 408b may enable (at 490) split ACL communications. The responding QLM 408b may send a QLMP_accepted PDU 491 to the responding LM 404b.

The responding LM 404b may send a LMP_encapsulated_header PDU 492 that includes a QLMP_accepted opcode to the initiating LM 404a. When the initiating LM 404a determines that the major type and/or the minor type included in the QLMP_accepted opcode is not recognized, the initiating LM 404a may respond to the LMP_encapsulated_header PDU 492 with an LMP_not_accepted PDU (not shown). When the LMP_not_accepted PDU is received, the split ACL configuration procedure may be aborted.

Alternatively, as shown in FIG. 4I, when the initiating LM 404a determines that the major type and/or the minor type included in the QLMP_accepted opcode is recognized, the initiating LM 404a may send an LMP_accepted PDU 493 to the responding LM 404b.

The initiating LM 404a may send a QLMP_accepted PDU 494a to the initiating QLM 408a indicating that split ACL communications are enabled at the second device 410b. The first device 410a may enable (at 494b) split ACL when the QLMP_accepted PDU 494a is received.

Figure 4J:
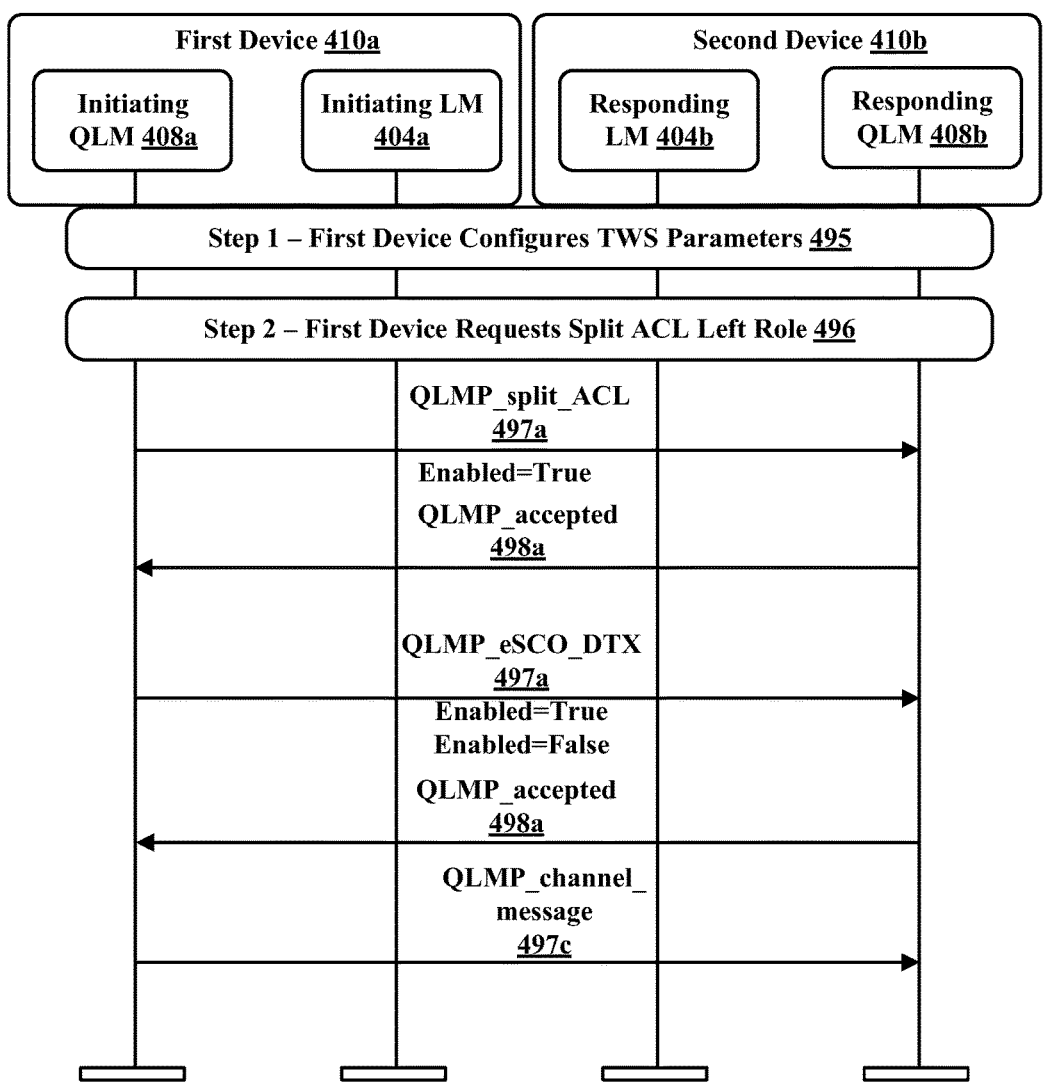
FIG. 4J illustrates a data flow that may be used to configure split ACL communications, eSCO DTX, and/or higher layer channel messaging in accordance with certain aspects of the disclosure.

FIG. 4J illustrates a data flow 480 that may be used to configure split ACL communications, eSCO DTX, and/or higher layer channel messaging in accordance with certain aspects of the disclosure. The split ACL configuration procedure illustrated in FIG. 4J may be performed by a first device 410a and a second device 410b. The first device 410a may be an initiator. The first device 410a may include an initiating LM 404a and an initiating QLM 408a. The second device 410b may be a responder. The second device 410b may include a responding LM 404b and a responding QLM 408b. In certain aspects, the first device 410a and the second device 410b may be BLE enabled devices. In certain other aspects, the first device 410a and the second device 410b may be peer proprietary devices. The first device 410a may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The second device 410b may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455. The initiating LM 404a may correspond to, e.g., LM 315. The responding LM 404b may correspond to, e.g., LM 315. The initiating QLM 408a may correspond to, e.g., QLM 317. The responding QLM 408b may correspond to, e.g., QLM 317. The QLMP PDUs illustrated in FIG. 4J may be tunneled through the LMP encapsulated PDU mechanism described above with respect to FIG. 4A. For simplicity, QLMP PDUs are illustrated in FIG. 4J as being transmitted directly between the initiating QLM 408a and the responding QLM 408b without being tunneled the LMP_encapsulated PDU mechanism.

Split ACL communications, eSCO DTX, and/or higher layer channel messaging may be enabled when the first device 410a determines during the QLMP feature exchange 416 in FIGS. 4B and 4C that the second device 410b supports split ACL communications, eSCO DTX, and/or higher layer channel messaging. In certain configurations, the first device 410a may correspond to, e.g., wireless earbud 108a, and the second device 410b may correspond to, e.g., central device 102. In certain other configurations, the first device 410a may correspond to, e.g., wireless earbud 108a, and the second device 410b may correspond to, e.g., wireless earbud 108b. In certain configurations, the second device 410b may correspond to the third device 410c described above with reference to FIGS. 4F-4H, and below with reference to FIG. 4L.

Referring to FIG. 4J, the first device 410a may configure (at 495) TWS parameters at the second device 410b using, e.g., the mechanism described above with reference to FIG. 4H. The first device 410a may request (at 496) a particular split ACL role based on operations 497a and 498a.

When both the first device 410*a* and the second device 410*b* support the QLMP split ACL feature, split ACL may be enabled by the first device 410*a* by sending the QLMP_split_ACL PDU 497*a* (also described above with reference to FIG. 4I). The QLMP_split_ACL PDU 497*a* may enable split ACL communications by setting the Enable parameter in the QLMP_split_ACL PDU 497*a* to "TRUE".

Three modes of operation may be possible based on the TWS_side parameter in the QLMP_TWS_audio_config PDU (described above with reference to FIG. 4H): left only, right only, or joint coding. If the second device 410*b* accepts the split ACL configuration, the second device 410*b* may respond with a QLMP_accepted PDU 498*a*. Otherwise, the second device 410*b* may send a QLMP_not_accepted PDU (not shown). The feature bit and contents of a QLMP_split_ACL PDU 497*a* are illustrated below in Table 11.

TABLE 11

Feature Bit and Contents of QLMP_split_ACL PDU

| Feature Bit | PDU | Contents |
| --- | --- | --- |
| 3 | QLMP_split_ACL | Enable |

The TWS eSCO feature may enable a virtual pair of devices (e.g., the first device 410*a* and the second device 410*b*) to share an audio path thereby enabling both earbuds to hear a voice call and one or both earbuds to provide the microphone path. Support for TWS eSCO may be detected via the QLMP TWS eSCO feature bit or may be indicated by a higher layer. No QLMP signaling is required for TWS eSCO.

To enable DTX, the QLMP_eSCO_DTX PDU 497*b* may be sent with the Enable parameter set to TRUE. If the responding QLM 408*b* accepts enabling DTX, the responding QLM 408*b* may respond with an QLMP_accepted PDU 498. Otherwise, it shall send a QLMP_not_accepted PDU (not shown).

To disable DTX, the QLMP_eSCO_DTX PDU 497*b* may be sent with the Enable parameter set to FALSE. If the responding QLM 408*b* accepts disabling DTX, the responding QLM 408*b* may respond with an QLMP_accepted PDU 498*a*. Otherwise, it shall send a QLMP_not_accepted PDU (not shown).

DTX may be enabled or disabled when no eSCO connections are in progress with a host device. DTX may be global parameter for the host device, and persists over multiple eSCO connections.

The Silence_Interval parameter (not shown) indicates the number of eSCO intervals between updating the silence parameters. The unit of Silence_Interval is an integer multiple of eSCO intervals (UINT8). The silence interval parameter may indicate a period where communications do not occur.

The Silence_Interval parameter may be modified after DTX is enabled since Silence_Interval parameter value may be dependent on the selected codec.

To update the Silence_Interval, either device may send the QLMP_eSCO_DTX PDU 497*b* with Enable still set to TRUE and a different Silence_Interval value.

In certain configurations, the first device 410*a* may support sending Higher Layer Channel Messages through QLMP.

The feature bit and contents of a QLMP_channel_message PDU 497*c* are illustrated below in Table 12.

TABLE 12

Feature Bit and Contents of QLMP_channel_message

| Feature Bit | PDU | Contents |
| --- | --- | --- |
| 6 | QLMP_channel_message | channel_ID, message |

If the first device 410*a* and the second device 410*b* support the higher layer channel message feature, the first device 410*a* may send a higher layer channel message to the second device 410*b* by sending the QLMP_channel_message PDU 497*c*. There may no QLMP acknowledgement message beyond the baseband acknowledgement (ACK).

Figure 4K:
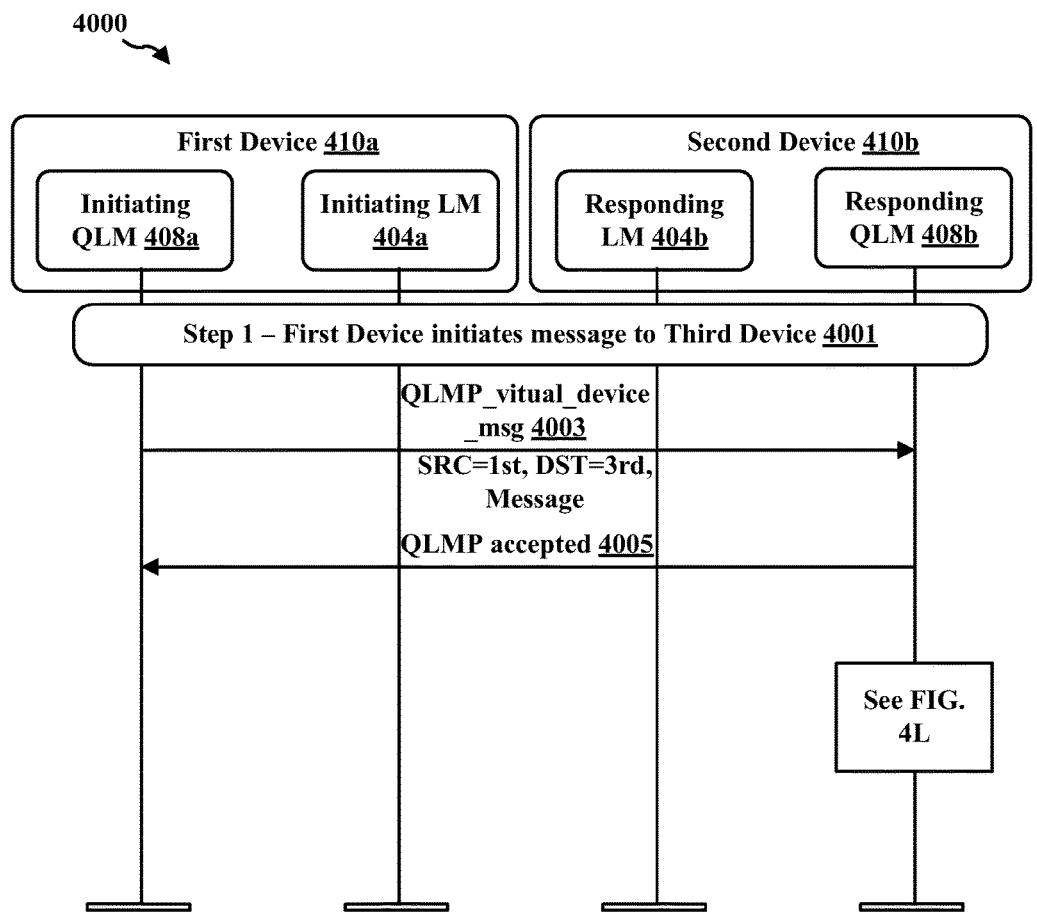
FIGS. 4K and 4L illustrate a data flow that may be used to perform inter-virtual device messaging in accordance with certain aspects of the disclosure.
Figure 4L:
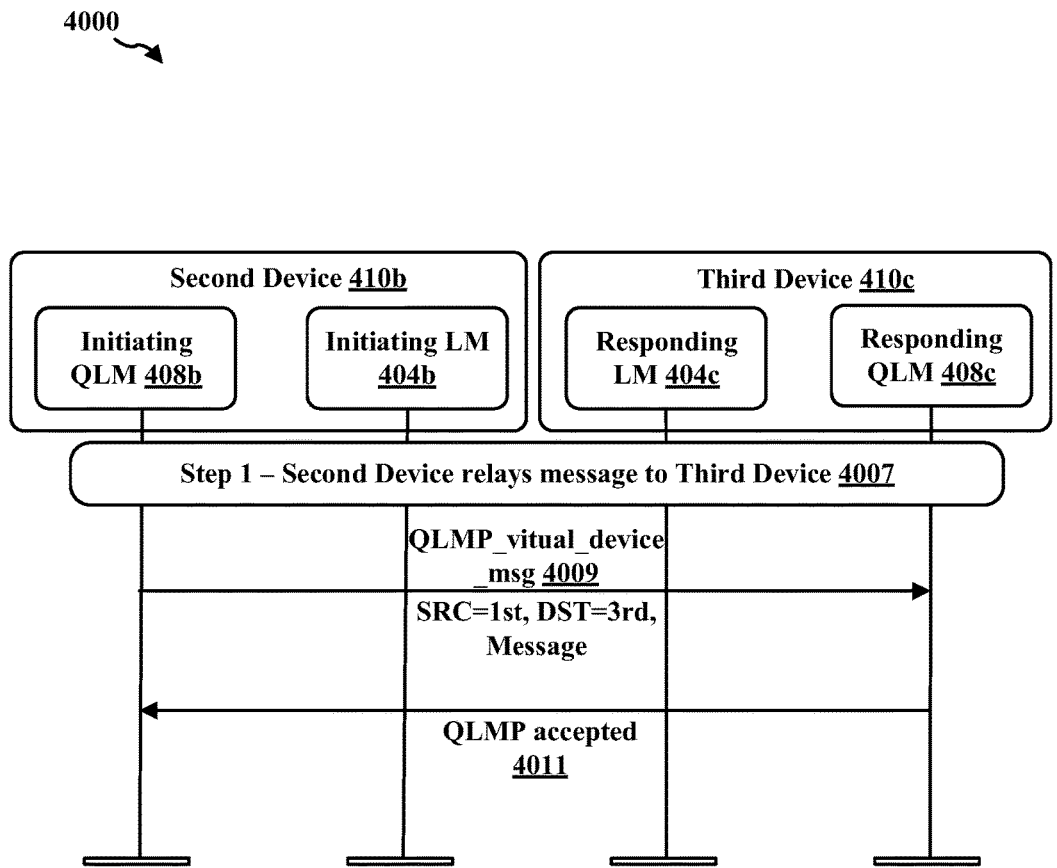

FIGS. 4K and 4L illustrate a data flow 4000 that may be used to perform inter-virtual device messaging in accordance with certain aspects of the disclosure. The inter-virtual device messaging procedure illustrated in FIGS. 4K and 4L may be performed by a first device 410*a*, a second device 410*b*, and a third device 410*c*. In FIG. 4K, the first device 410*a* may be an initiator. In FIG. 4K, the first device 410*a* may include an initiating LM 404*a* and an initiating QLM 408*a*. In FIG. 4K, the second device 410*b* may be a responder. In FIG. 4K, the second device 410*b* may include a responding LM 404*b* and a responding QLM 408*b*. In FIG. 4L, the second device 410*b* may be an initiator. In FIG. 4L, the second device 410*b* may include an initiating LM 404*b* and an initiating QLM 408*b*. In FIG. 4L, the third device 410*c* may be a responder. In FIG. 4L, the third device 410*c* may include a responding LM 404*c* and a responding QLM 408*c*. In certain aspects, the first device 410*a*, the second device 410*b*, and the third device 410*c* may be BLE enabled devices. In certain other aspects, the first device 410*a* and the second device 410*b* may be peer proprietary devices. The first device 410*a* may correspond to, e.g., central device 102, peripheral device 104, 106, 108*a*, 108*b*, 110, 112, 114, wireless device 200, the apparatus 802/802', 1102/1102', 1402/1402', the first device 510*a*, 610*a*, the second device 510*b*, 610*b*, 850, 1150, 1450, the third device 510*c*, 610*c*, 1155, 1455. The second device 410*b* may correspond to, e.g., central device 102, peripheral device 104, 106, 108*a*, 108*b*, 110, 112, 114, wireless device 200, the apparatus 802/802', 1102/1102', 1402/1402', the first device 510*a*, 610*a*, the second device 510*b*, 610*b*, 850, 1150, 1450, the third device 510*c*, 610*c*, 1155, 1455. The third device 410*c* may correspond to, e.g., central device 102, peripheral device 104, 106, 108*a*, 108*b*, 110, 112, 114, wireless device 200, the apparatus 802/802', 1102/1102', 1402/1402', the first device 510*a*, 610*a*, the second device 510*b*, 610*b*, 850, 1150, 1450, the third device 510*c*, 610*c*, 1155, 1455. Initiating LM 404*a* may correspond to, e.g., LM 315. LM 404*b* may correspond to, e.g., LM 315. LM 404*c* may correspond to, e.g., LM 315. QLM 408*a* may correspond to, e.g., QLM 317. QLM 408*b* may correspond to, e.g., QLM 317. QLM 408*c* may correspond to, e.g., QLM 317. The QLMP PDUs illustrated in FIGS. 4K and 4L may be tunneled through the LMP encapsulated PDU mechanism described above with respect to FIG. 4A. For simplicity, QLMP PDUs are illustrated in FIGS. 4K and 4L as being transmitted directly between the initiating QLM 408*a* and the responding QLM 408*b*, and the initiating QLM 408*b* and the responding QLM 408*c* without being tunneled the LMP_encapsulated PDU mechanism.

Inter-virtual device messaging may be performed when the first device 410*a* determines during the QLMP feature exchange 416 in FIGS. 4B and 4C that the virtual device messaging is supported at the second device 410b and/or the third device 410c. In certain configurations, the first device 410a may correspond to, e.g., wireless earbud 108a, the second device 410b may correspond to, e.g., central device 102, and the third device 410c may correspond to, e.g., wireless earbud 108b.

Virtual devices (e.g., the first device 410a and the third device 410c) may need to communicate with each other from time to time. Instead of creating and managing a connection between the first device 410a and the third device 410c, the first device 410a and the third device 410c may support the QLMP Inter-Virtual Device Messaging feature. The QLMP Inter-Virtual Device Messaging feature may enable the first device 410a and the third device 410c to relay messages to one another via the second device 410b. The second device 410b may relay messages from the first device 410a to the third device 410c, and vice versa.

Referring to FIG. 4K, the first device 410a may initiate (at 4001) sending a message to the third device 410c (seen in FIG. 4L). To send a message to the third device 410c (e.g., the other device using the same virtual address as the first device 410a), the first device 410a sends the QLMP_virtual_device_msg PDU 4003 with the BD_ADDR_src set to its Actual_BD_ADDR, the BD_ADDR_dest set to the destination BD_ADDR (if not known, set to all zeros), and the variable length message. The feature bit and contents of a QLMP_virtual_device_msg PDU 4003 are illustrated below in Table 12.

TABLE 12

Feature Bit and Contents of a QLMP_virtual_device_msg PDU

| Feature Bit | PDU | Contents |
|---|---|---|
| 1 | QLMP_virtual_device_msg | BD_ADDR_src, BD_ADDR_dest, Message |

If the second device 410b accepts the QLMP_virtual_device_msg PDU 4003, the second device 410b may respond with a QLMP_accepted PDU 4005. Otherwise, the second device 410b may send a QLMP_not_accepted PDU (not shown).

Referring to FIG. 4L, when the second device 410b accepts the QLMP_virtual_device_msg PDU 4003, the second device may relay (at 4007) the message to the third device 410c. If the third device 410c accepts the QLMP_virtual_device_msg PDU 4009, the second device 410b may respond with a QLMP_accepted PDU 4011. Otherwise, the third device 410c may send a QLMP_not_accepted PDU (not shown).

FIGS. 5A-5E illustrates a data flow 500 that may be used to perform various procedures related to QLM discovery, QLMP feature discovery, and/or QLMP feature exchange in accordance with certain aspects of the disclosure. The operations described below may be performed by a first device 510a, a second device 510b, and a third device 510c. In certain aspects, the first device 510a, the second device 510b, and the third device 510c may be BLE enabled devices. In certain other aspects, the first device 510a, the second device 510b, and the third device 510c may be peer proprietary devices. The first device 510a may correspond to, e.g., central device 102, peripheral device 104, 106, 108a, 108b, 110, 112, 114, wireless device 200, the apparatus 802/802', 1102/1102', 1402/1402', the first device 410a, 610a, the second device 410b, 610b, 850, 1150, 1450, the third device 410c, 610c, 1155, 1455. The second device 510b may correspond to, e.g., central device 102, peripheral device 104, 106, 108a, 108b, 110, 112, 114, wireless device 200, the apparatus 802/802', 1102/1102', 1402/1402', the first device 410a, 610a, the second device 410b, 610b, 850, 1150, 1450, the third device 410c, 610c, 1155, 1455. The third device 510c may correspond to, e.g., central device 102, peripheral device 104, 106, 108a, 108b, 110, 112, 114, wireless device 200, the apparatus 802/802', 1102/1102', 1402/1402', the first device 410a, 610a, the second device 410b, 610b, 850, 1150, 1450, the third device 510c, 610c, 1155, 1455. QLMP PDUs sent in the operations illustrated in FIGS. 5A-5E may be tunneled through the LMP encapsulated PDU mechanism described above with respect to FIG. 4A.

Referring to FIG. 5A, the first device 510a and the second device 510b may perform (at 501) a pair exchange. During the pair exchange, the BD_ADDRs (e.g., actual and/or virtual) may be exchanged, and a link_key used for communications between the first device 510a and the second device 510b may be established. In certain configurations, the pair exchange may include performing QLM discovery and/or QLMP feature discovery using the techniques described above with reference to FIGS. 4B and 4C.

Referring to FIG. 5B, the second device 510b may connect to the third device 510c by initiating (at 502) standard pairing. The second device 510b may use the virtual BD_ADDR of the first device 510a/second device 510b pair to establish the connection with the third device 510c. If the first device 510a attempts to connect with the third device 510c at the same time that the second device 510b is performing standard pairing, the connection with the first device 510a may be rejected.

After the second device 510b completes the standard pairing procedure with the third device 510c, the second device 510b may establish (at 503) a connection with the first device 510a. Establishing (at 503) a connection with the first device 510a may include sending pairing information associated with the third device 510c such as the link_key and actual BD_ADDR of the third device 510c.

Figures 5C, 5D, 5E:
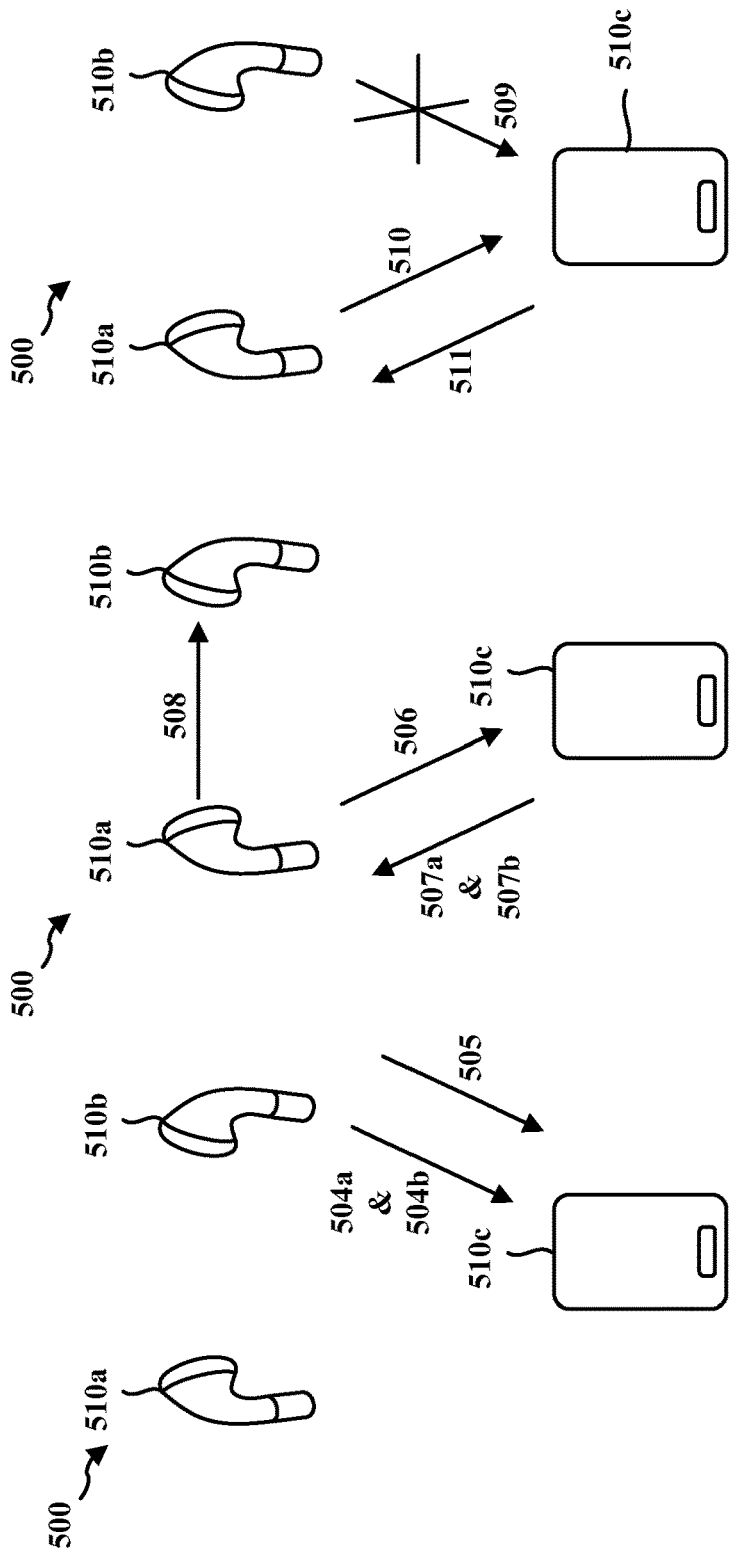

Referring to FIG. 5C, the second device 510b may page (at 504a) the third device 510c using the virtual_BD_ADDR associated with the first device 510a and the second device 510b. The third device 510c may establish (at 504b) a connection with the LM of the third device 510c.

After the connection with the LM is established (at 504b), the second device 510b may send (at 505) a virtual address resolving list to the third device 510c. The virtual address resolving list may include a mapping of the actual BD_ADDRs for the first device 510a and the second device 510b with the virtual BD_ADDR.

Referring to FIG. 5D, the first device 510a may page (at 506) the third device 510c using the virtual BD_ADDR. The third device 510c may determine that a connection is already established with the virtual BD_ADDR (e.g., with the second device 510b). The third device 510c may attempt (at 507a) to establish a QLM connection with the first device 510a. If the attempt (at 507a) fails, the third device 510c may not establish a QLM connection with the first device 510a (e.g., if a QLM connection with the first device 510a is already established). If the attempt (at 507a) is successful, the third device 510c may request (at 507b) a hostless connection (e.g., a connection over which communications may not occur) with the first device 510a. The hostless connection may be implemented using a link_key associated with the virtual BD_ADDR. The first device 510a may establish (at 508) a connection with the second device 510b to establish a control link between the first device 510a and the second device 510b.

Referring to FIG. 5E, the second device 510b may disconnect (at 509) from the third device 510c. Hence, the host connection with the second device 510b is no longer present, and any audio streaming may also be disconnected from the second device 510b. The third device 510c may be configured to send (at 510) a virtual paging request to the first device 510a using, e.g., the techniques discussed above with reference to FIG. 4G.

The first device 510a may restart a baseband connection with the third device 510c, and send (at 511) a LMP_host_connection_req PDU to the third device 510c using, e.g., the techniques described above with reference to FIG. 4G. A host connection may be established when the LMP_host_connection_req PDU is received by the third device 510c. At this point, the first device 510a effectively fills the role previously held by the second device 510b prior to disconnection (at 509).

FIG. 6A illustrates a full-relay technique 600 for sending an audio stream from a third device 610c to a first device 610a and second device 610b. In certain configurations, the first device 610a and the second device 610b may be an earbud pair.

As illustrated in FIG. 6A, an audio stream 601 may be received by the second device 610b in the earbud pair (e.g., the first device 610a and second device 610b), and the second device 610b may relay the audio stream 603 to the first device 610a in the earbud pair. Audio data in the audio stream that is associated with the second device 610b may be output by the second device 610b. Similarly, audio data in the audio stream that is associated with the first device 610a may be output by the first device 610a. In some scenarios, the audio stream received by the second device 610b may not include audio data for the second device 610b. However, because the second device 610b acts as a relay for the first device 610a, the second device 610b may remain in an awake state even when the audio stream does not include audio data for the second device 610b. Hence, power consumption associated with the earbud pair may be increased as compared to a scenario in which the second device 610b remains in a sleep mode when the audio stream 601 does not include audio data for the second device 610b.

FIG. 6B illustrates a split ACL technique 615 for sending an audio stream from a third device 610c to a first device 610a and second device 610b in accordance with certain aspects of the disclosure. The first device 610a may correspond to, e.g., central device 102, peripheral device 104, 106, 108a, 108b, 110, 112, 114, wireless device 200, the apparatus 802/802', 1102/1102', 1402/1402', the first device 410a, 510a the second device 410b, 850, 1150, 1450, the third device 410c, 1155, 1455. The second device 410b may correspond to, e.g., central device 102, peripheral device 104, 106, 108a, 108b, 110, 112, 114, wireless device 200, the apparatus 802/802', 1102/1102', 1402/1402', the first device 410a, the second device 410b, 510b, 850, 1150, 1450, the third device 410c, 1155, 1455. The third device 610c may correspond to, e.g., central device 102, peripheral device 104, 106, 108a, 108b, 110, 112, 114, wireless device 200, the apparatus 802/802', 1102/1102', 1402/1402', the first device 410a, the second device 410b, 850, 1150, 1450, the third device 410c, 510c, 1155, 1455.

To minimize the audio data sent to the first device 610a and the second device 610b in an audio streaming mode of operation, the split ACL feature described above with reference to FIG. 4I may be used. When the third device 610c performs split ACL, the third device 610c may isolate the "left" data from the coded audio stream and send the left data to the left earbud (e.g., the first device 610a). Similarly, the third device 610c may isolate the "right" data from the coded audio stream and send the right data to the right earbud (e.g., the second device 610b) when split ACL is performed. The proprietary controller at the third device 610c may separate audio data into left and right streams, as discussed below with reference to FIG. 6C.

Split ACL may be enabled by proprietary HCI commands or via a QLMP sequence, as described above with reference to FIG. 4I. Split ACL may reduce power consumption in TWS earbuds by only sending data to an earbud that will be used.

Figure 6C:
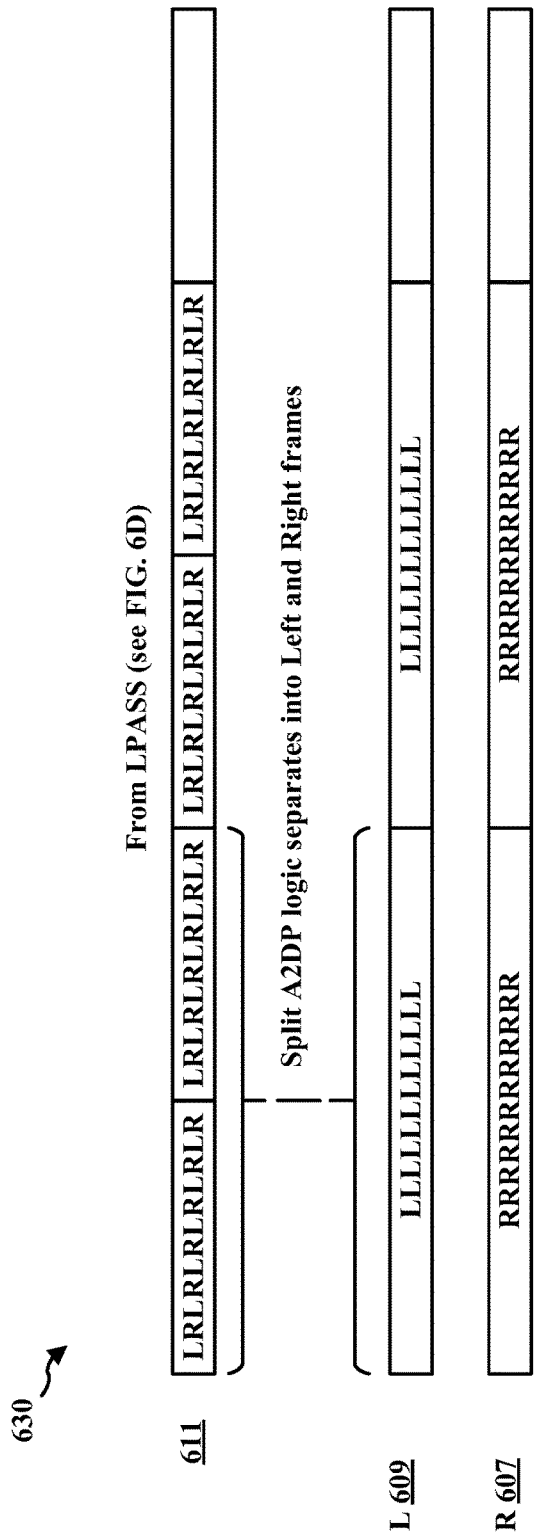
FIG. 6C illustrates a technique for separating an audio data into a left stream and a right stream in order to provide split ACL communication in accordance with certain aspects of the disclosure.

FIG. 6C illustrates a technique 630 for separating audio data 611 into a left stream 609 and a right stream 607 in order to provide split ACL communication in accordance with certain aspects of the disclosure. The left stream 609 may be sent to the first device 610a, and the right stream 607 may be sent to the second device 610b seen in FIG. 6B. The technique illustrated in FIG. 6C may be performed by, e.g., the third device 610c discussed above with reference to FIG. 6B.

Figure 6D:
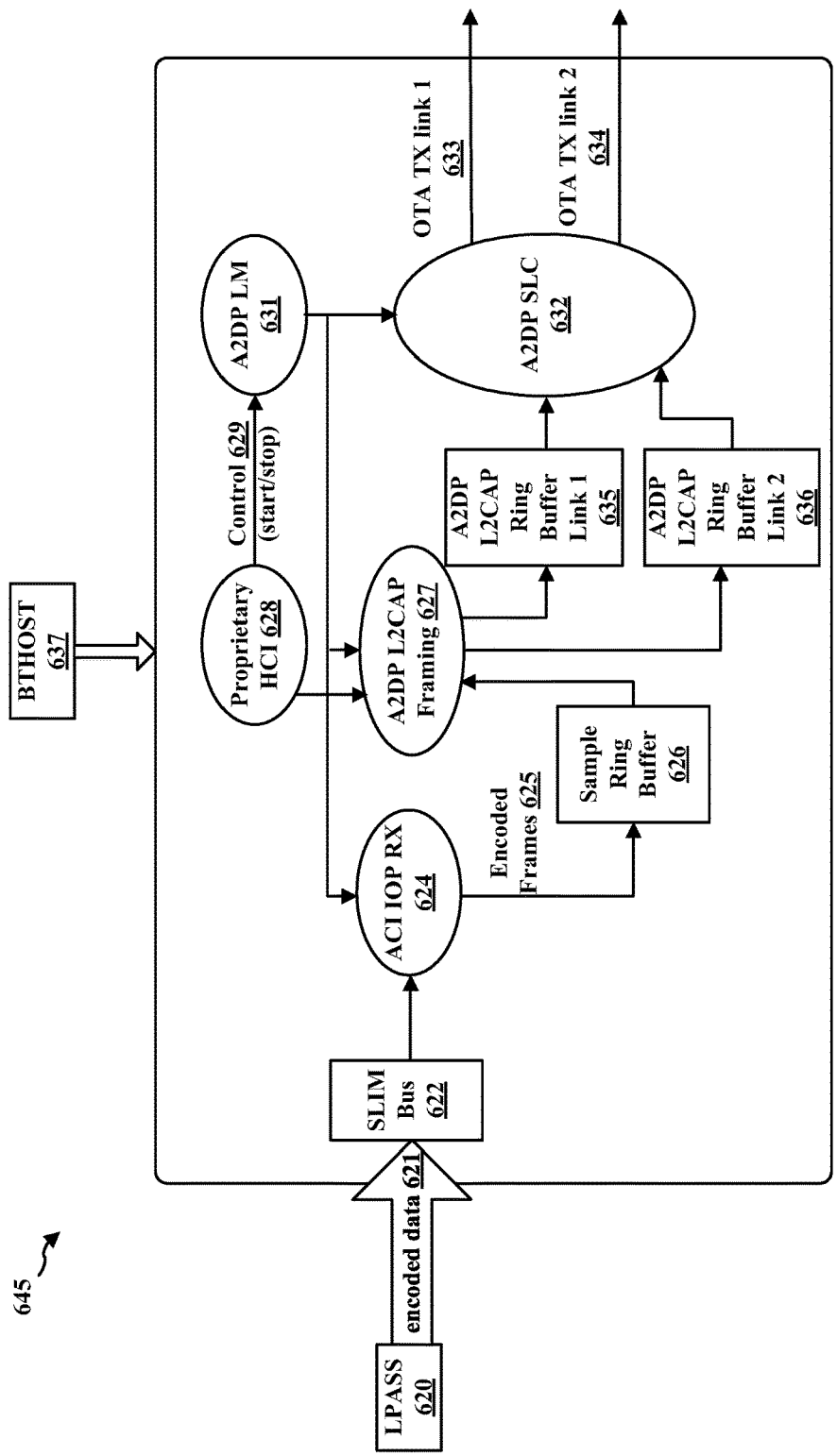
FIG. 6D illustrates a block diagram of a proprietary controller in accordance with certain aspects of the present disclosure.

FIG. 6D illustrates a block diagram of a proprietary controller 645 in accordance with certain aspects of the present disclosure.

As seen in FIG. 6D, a low power audio subsystem (LPASS) 620 may be configured to send encoded audio data 621 to the serial lower-power inter-chip media (SLIM) bus 622.

The SLIM bus 622 may be configured to act as a standard interface between baseband or application processors and peripheral components. The SLIM bus 622 may be configured to send a signal associated with the encoded audio data to the application controller interface (ACI) interoperable prototype (IOP) receiver (RX) 624. The ACI IOP RX 624 may be configured to send encoded frames 625 to the sample ring buffer 626.

The sample ring buffer 626 may be implemented as a buffer for audio data transmission. The sample ring buffer 626 may be configured to send a signal associated with at least one audio transmission to the advanced audio distribution profile (A2DP) L2CAP framing component 627.

The A2DP L2CAP framing component 627 may be configured to separate left and right data of audio data received from the sample ring buffer 626. The A2DP L2CAP framing component 627 may be configured to send one or more signals associated with the left data and the right data to different L2CAP ring buffers 635, 636 for two radio links 633, 634. The A2DP L2CAP framing component 627 may be configured to add headers to the left data and the right data.

The A2DP SLC component 632 may be configured to select data from the A2DP L2CAP ring buffer for link 1 635 and the A2DP L2CAP ring for buffer link 2 636 for two ACL links (e.g., over the air (OTA) transmission (TX) link 1 633 and OTA TX link 2 634). The total size of the L2CAP ring buffer for link 1 635 and the L2CAP ring buffer for link 2 636 is the same as with a single joint stereo link.

The proprietary HCI component 628 may be configured to implement procedures associated with split ACL, and send a control signal 629 to start or stop a split ACL procedure to the A2DP LM 631. The A2DP LM 631 may send a signal to start or stop an ACL transmission to the A2DP SLC 632.

The BTHOST 637 may be configured to determine, e.g., information related to BT hosts and protocol service multiplexor (PSM) values.

Figure 7A:
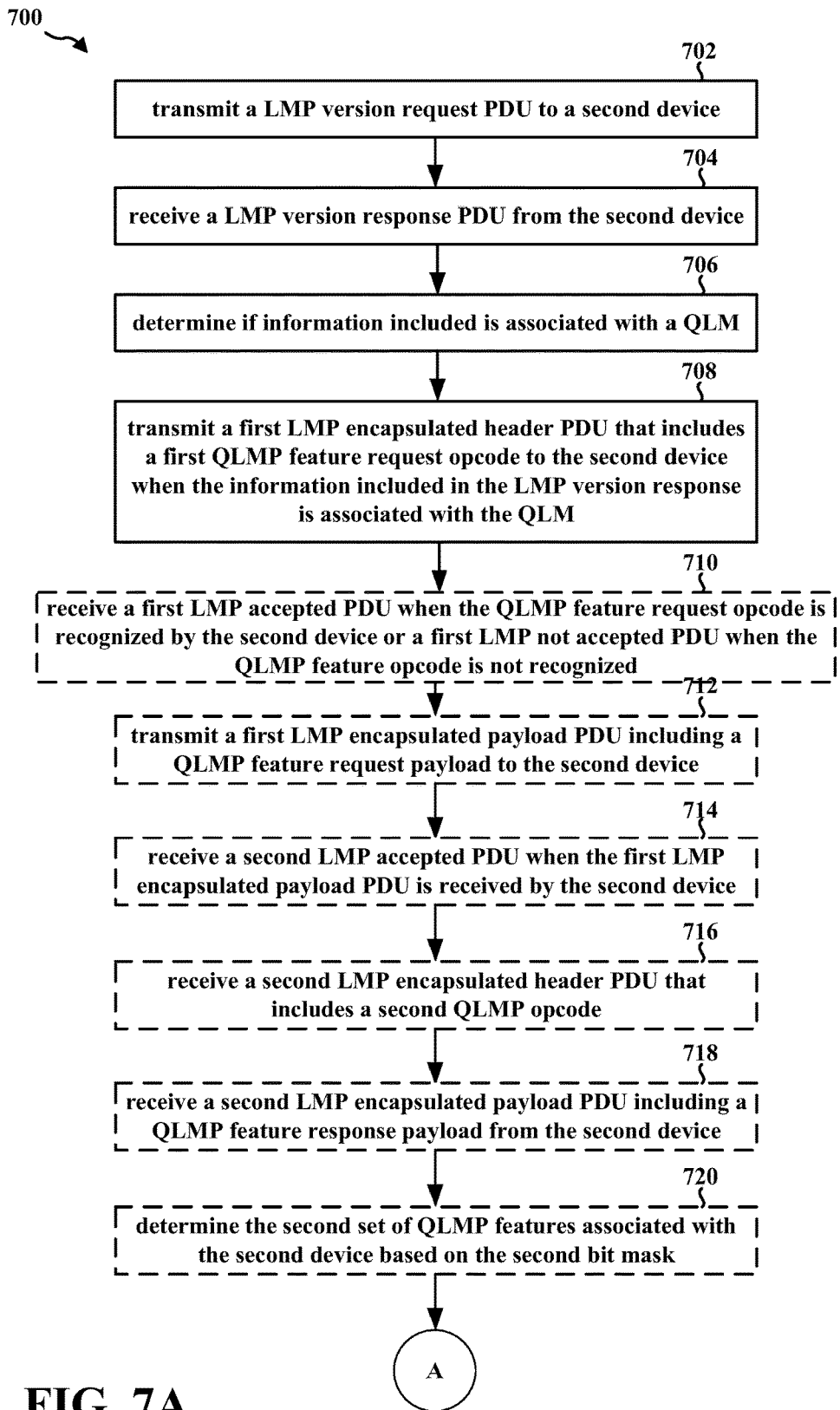
FIGS. 7A and 7B are a flowchart of a method of wireless communication.
Figure 7B:
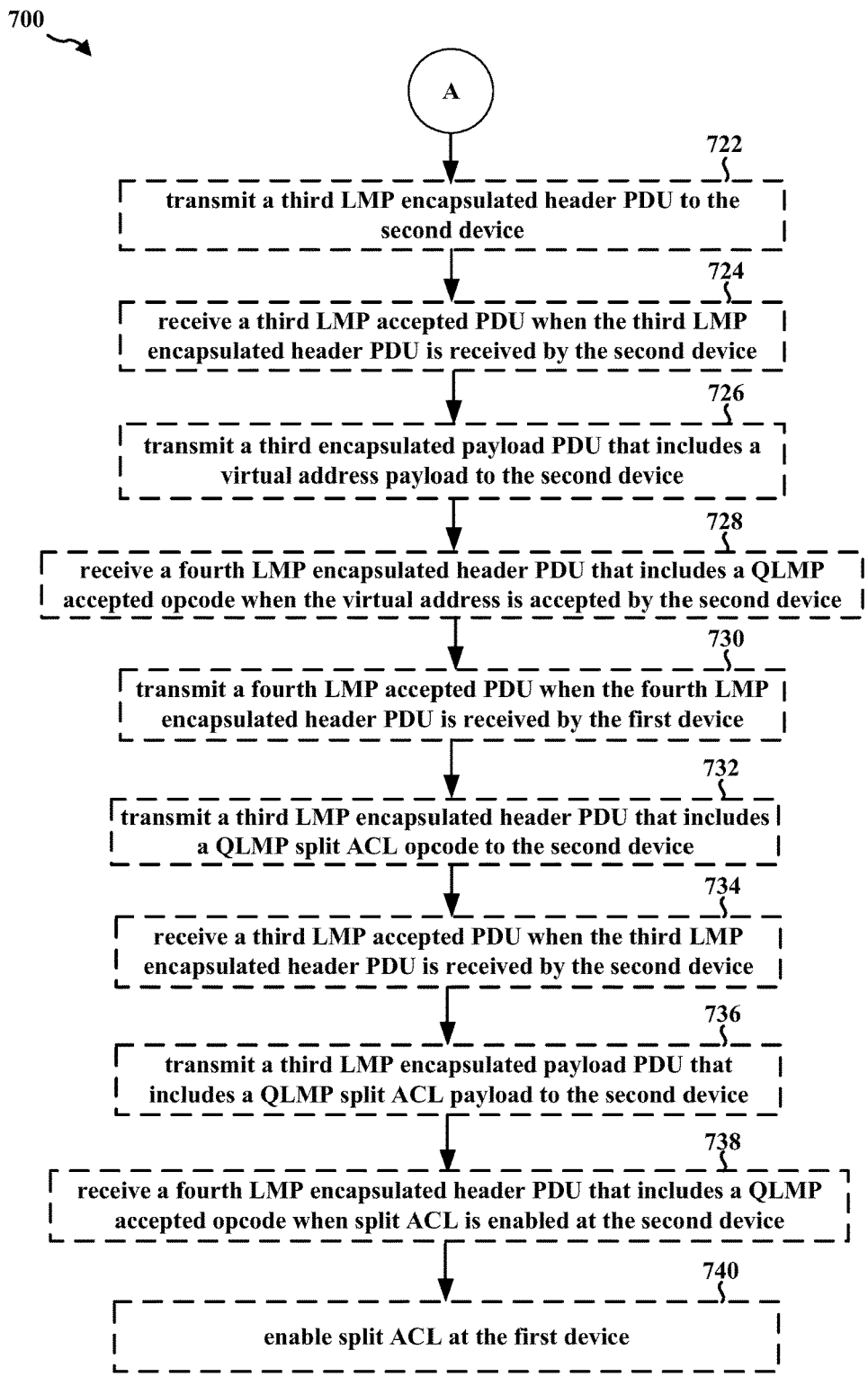

FIGS. 7A and 7B are a flowchart 700 of a method of wireless communication. The method may be performed by a first device (e.g., central device 102, peripheral device 104, 106, 108a, 108b, 110, 112, 114, wireless device 200, the apparatus 802/802', 1102/1102', 1402/1402', the first device 410, 510a, 610a, the second device 410b, 510b, 610b, 850, 1150, 1450, the third device 410c, 510c, 610c, 1155, 1455). In FIGS. 7A and 7B, optional operations are indicated with dashed lines.

At 702, the first device may transmit a LMP version request PDU to a second device. For example, referring to FIGS. 4B and 4C, the LM version exchange 412 may include a transmission of a LMP_version_req PDU 413 by the initiating LM 404a to the responding LM 404b. In certain implementations, the LMP_version_req PDU 413 may include one or more of a first CompID that is associated with the initiating LM 404a, a first VersNr that specifies the version of the LMP that is supported by the first device 410a, and/or a first SubVersNr that is associated with proprietary RF implementations, proprietary base band implementations, and/or proprietary LM implementations associated with the first device 410a. In certain other implementations, the LMP_version_req PDU 413 may not include one or more of a first CompID that is associated with the initiating LM 404a, a first VersNr that specifies the version of the LMP that is supported by the first device 410a, and/or a first SubVersNr that is associated with proprietary RF implementations, proprietary base band implementations, and/or proprietary LM implementations associated with the first device 410a.

At 704, the first device may receive a LMP version response PDU from the second device. In one aspect, the LMP version response PDU may include at least one of a link layer identification, a version number, or a sub-version number associated with the second device. For example, referring to FIGS. 4B and 4C, the LM version exchange 412 may also include the responding LM 404b transmitting a LMP_version_res PDU 414 to the initiating LM 404b. The LMP_version_res PDU 414 may include one or more of a second CompID that is associated with the responding LM 404b, a second VersNr that specifies the version of the LMP that is supported by the second device 410b, and/or a second SubVersNr that is associated with proprietary RF implementations, proprietary base band implementations, and/or proprietary LM implementations associated with the second device 410b.

At 706, the first device may determine if one or more of the link layer identification, the version number, or the sub-version number included in the LMP version response PDU are associated with a QLM. For example, referring to FIGS. 4B and 4C, the initiating QLM 408a may determine (at 415) if one or more of the second CompID, the second VersNr, and/or the second SubVersNr included in the LMP_version_res PDU 414 are associated with a recognized QLM (e.g., if responding QLM 408b is associated with the same company as initiating QLM 408a). For example, the initiating QLM 408a may compare one or more of the second CompID, the second VersNr, and/or the second SubVersNr to a list of proprietary CompIDs, VersNrs, and/or SubVersNrs that are associated with the initiating QLM 408a, and hence, considered valid. Valid VersNr and SubVersNr for each valid CompID are shown above in Table 4.

At 708, the first device may transmit a first LMP encapsulated header PDU that includes a first QLMP feature request opcode to the second device when it is determined that one or more of the link layer identification, the version number, or the sub-version number included in the LMP version response PDU are associated with the QLM. For example, referring to FIGS. 4B and 4C, the initiating LM 404a may tunnel the QLMP_feature_req PDU 417 to the responding LM 404b by including a QLMP_feature_req opcode in a LMP_encapsulated_header PDU 418 that is transmitted to the responding LM 404b. In certain configurations, the QLMP_feature_req opcode may be used to test whether any QLMP features are supported by the responding QLM 408b. Requested and/or supported QLMP features may be represented as a bit mask transferred in the QLMP_feature_req PDU 417 and QLMP_feature_res PDU 429. The bit mask may include, e.g., 16 bytes. An example bit map that may be included in one or more of QLMP_feature_req PDU 417 and QLMP_feature_res PDUs 429 is illustrated above in Table 5.

At 710, the first device may receive a first LMP accepted PDU when the QLMP feature request opcode is recognized by the second device or receive a LMP not accepted PDU when the QLMP feature request opcode is not recognized by the second device. For example, referring to FIGS. 4B and 4C, when the responding LM 404b determines (at 419b) that the major type and/or the minor type included in the QLMP_feature_req opcode is recognized (e.g., QLMP feature(s) are supported), the responding LM 404b may respond to the LMP_encapsulated_header PDU 418 that includes the QLMP_feature_req opcode with a LMP_accepted PDU 421c. When the responding LM 404b determines (at 419a) that the major type and/or the minor type included in the QLMP_feature_req opcode is not recognized (e.g., the requested QLMP feature is not supported), the responding LM 404b may transmit an LMP_not_accepted PDU 421a to the initiating LM 404a At 712, the first device may transmit a first LMP encapsulated payload PDU including a QLMP feature request payload to the second device. In one aspect, the QLMP feature request payload may include a first bit mask that indicates a first set of QLMP features associated with the first device. For example, referring to FIGS. 4B and 4C, the initiating LM 404a may send a LMP_encapsulated_payload PDU 422 that includes the QLMP_feature_req opcode to the responding LM 404b.

At 714, the first device may receive a second LMP accepted PDU when the first LMP encapsulated payload PDU is received by the second device. For example, referring to FIGS. 4B and 4C, the responding LM 404b may transmit an LMP_accepted PDU 423 that is received by the initiating LM 404a.

At 716, the first device may receive a second LMP encapsulated header PDU that includes a second QLMP opcode. For example, referring to FIGS. 4B and 4C, the responding LM 404b may transmit a LMP_encapsulated_ header PDU 425 that includes a QLMP_feature_res_opcode, and is received by the initiating LM 404a. The QLMP_feature_res opcode may indicate that the requested QLMP feature is supported by the second device 410b.

At 718, the first device may receive a second LMP encapsulated payload PDU including a QLMP feature response payload from the second device. In one aspect, the QLMP feature response payload may include a second bit mask that indicates a second set of QLMP features associated with the second device. For example, referring to FIGS. 4B and 4C, the responding LM 404b may transmit a LMP_encapsulated_payload PDU 427 that includes the QLMP_feature_res opcode and/or the QLMP feature bit mask to the initiating LM 404a At 720, the first device may determine the second set of QLMP features associated with the second device based on the second bit mask. In certain aspects, the second set of QLMP features associated with the second device may include virtual addressing. In certain other aspects, the second set of QLMP features associated with the second device includes a split ACL link. For example, referring to FIGS. 4B and 4C, initiating QLM 408a may determine (at 429b) the QLMP features supported by the second device 410b based at least in part on the QLMP feature bit mask included in the QLMP_feature_res PDU 429a.

At 722, the first device may transmit a third LMP encapsulated header PDU to the second device. In one aspect, the third LMP encapsulated header PDU may include at least in part a QLMP virtual address opcode. For example, referring to FIG. 4D, the initiating LM 404a may send a LMP_encapsulated_header PDU 432 to the responding LM 404b. The LMP_encapsulated_header PDU 432 may include a QLMP_virtual_address_opcode.

At 724, the first device may receive a third LMP accepted PDU when the third LMP encapsulated header PDU is received by the second device. For example, referring to FIG. 4D, when the responding LM 404b determines that the major type and/or the minor type included in the QLMP_feature_req opcode is recognized (e.g., the virtual addressing feature is supported/enabled by the second device 410b), the responding LM 404b may send an LMP_accepted PDU 433 to the initiating LM 404a.

At 726, the first device may transmit a third encapsulated payload PDU that includes a virtual address payload to the second device. In one aspect, the virtual address payload may indicate a virtual address that is associated with both the first device and the second device. For example, referring to FIG. 4D, when the LMP_accepted PDU 433 is received, the initiating LM 404a may send an LMP_encapsulated_payload PDU 434 that includes a QLMP_virtual_address_payload to the responding LM 404b. In certain configurations, the QLMP_virtual_address_payload PDU 434 may include information associated with the Actual_BD_ADDR associated with the first device 410a and the Virtual_BD_ADDR associated with the first device 410a and the second device 410b.

At 728, the first device may receive a fourth LMP encapsulated header PDU that includes a QLMP accepted opcode when the virtual address is accepted by the second device. For example, referring to FIG. 4D, the responding LM 404b may send a LMP_encapsulated_header PDU 438 that includes the QLMP_accepted opcode (e.g., QLMP_virtual_address_res opcode) to the initiating LM 404a.

At 730, the first device may transmit a fourth LMP accepted PDU when the fourth LMP encapsulated header PDU is received by the first device. For example, referring to FIG. 4D, when the LMP_encapsulated_header PDU 438 is received and decoded, the initiating LM 404a may send a LMP_accepted PDU 439 to the responding LM 404b.

At 732, the first device may transmit a third LMP encapsulated header PDU that includes a QLMP split ACL opcode to the second device. For example, referring to FIG. 4I, initiating LM 404a may send a LMP_encapsulated_header PDU 485 including the QLMP_split_ACL_opcode to the responding LM 404b.

At 734, the first device may receive a third LMP accepted PDU when the third LMP encapsulated header PDU is received by the second device. For example, referring to FIG. 4I, when the responding LM 404b determines that the major type and/or the minor type included in the QLMP_split_ACL opcode is recognized, the responding LM 404b may send an LMP_accepted PDU 486 that is received by the initiating LM 404a.

At 736, the first device may transmit a third LMP encapsulated payload PDU that includes a QLMP split ACL payload to the second device. For example, referring to FIG. 4I, the initiating LM 404a may send a LMP_encapsulated_payload PDU 487 that includes a QLMP_split_ACL payload to the responding LM 404b.

At 738, the first device may receive a fourth LMP encapsulated header PDU that includes a QLMP accepted opcode when split ACL is enabled at the second device. For example, referring to FIG. 4I, the responding LM 404b may send a LMP_encapsulated_header PDU 492 that includes a QLMP_accepted opcode to the initiating LM 404a.

At 740, the first device may enable split ACL at the first device. For example, referring to FIG. 4I, first device 410a may enable (at 494b) split ACL when the QLMP_accepted PDU 494a is received.

Figure 8:
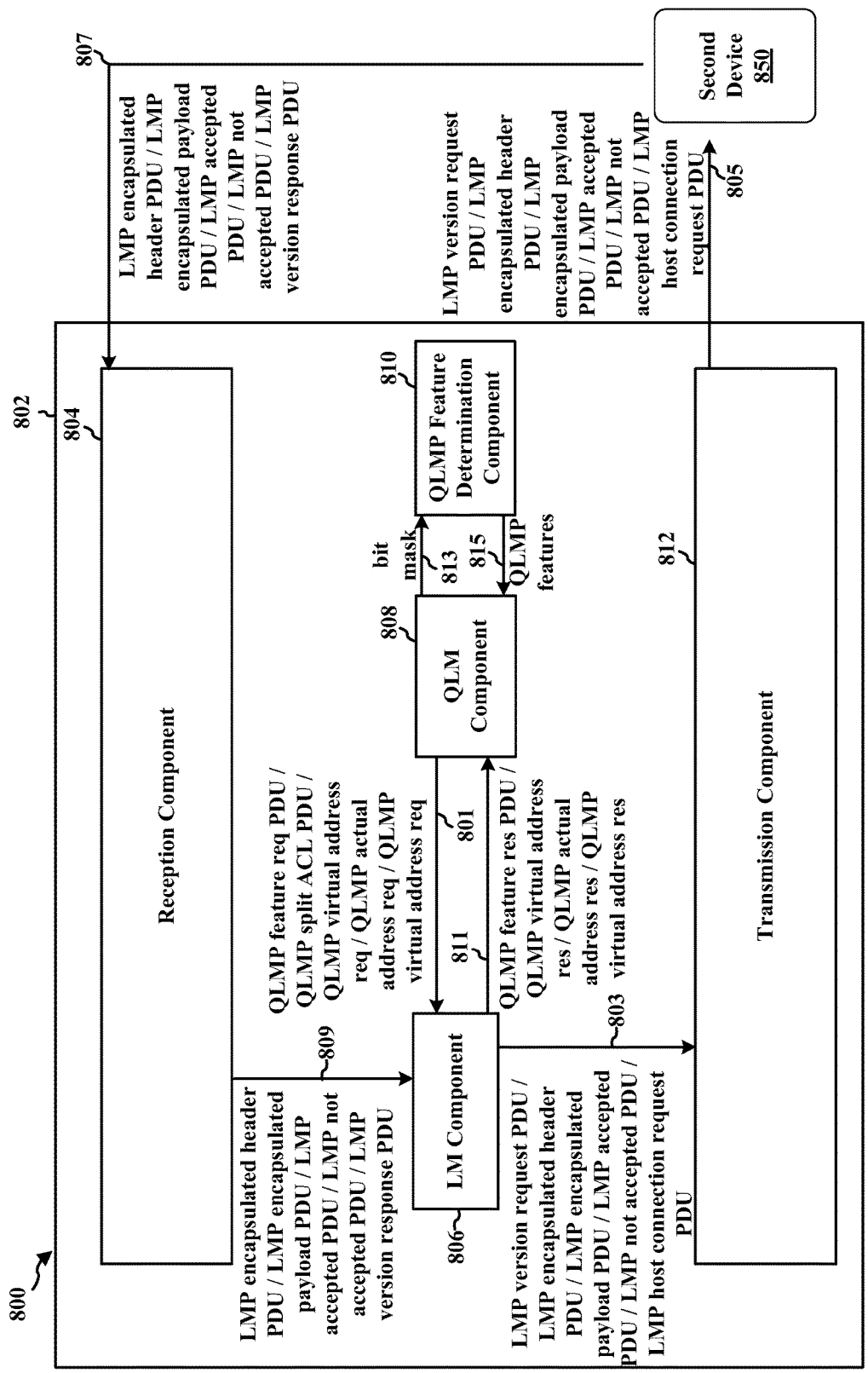
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a first device (e.g., central device 102, peripheral device 104, 106, 108a, 108b, 110, 112, 114, wireless device 200, the apparatus 802', the first device 510a, 610a, the second device 510b, 610b, 850, 1150, 1450, the third device 510c, 610c, 1155, 1455) in communication with a second device (e.g., central device 102, peripheral device 104, 106, 108a, 108b, 110, 112, 114, wireless device 200, the apparatus 1102/1102', 1402/1402', the first device 410a, 510a, 610a, the second device 510b, 610b, 1150, 1450, the third device 410c, 510c, 610c, 1155, 1455). The apparatus may include a reception component 804, a LM component 806, a QLM component 808, a QLMP feature determination component 810, and a transmission component 812.

The LM component 806 may be configured to send a signal 803 associated with an LMP version request PDU to the transmission component 812.

The transmission component 812 may be configured to transmit a LMP version request PDU to the second device 850. The reception component 804 may be configured to receive a LMP version response PDU 807 from the second device 850. In one aspect, the LMP version response PDU may include at least one of a link layer identification, a version number, or a sub-version number associated with the second device. The reception component 804 may be configured to send a signal 809 associated with the LMP version response PDU to the LM component 806. The LM component 806 may be configured to determine if one or more of the link layer identification, the version number, or the sub-version number included in the LMP version response PDU are associated with a recognized QLM. The LM component 806 may be configured to send a signal 811 indicating to the QLM component 808 that a recognized QLM is discovered at the second device 850.

The QLM component 808 may be configured to send a signal 801 associated with a QLMP feature request PDU to the LM component 806 when it is determined that one or more of the link layer identification, the version number, or the sub-version number included in the LMP version response PDU are associated with the QLM. The LM component 806 may be configured to send a signal 803 associated with a first LMP encapsulated header PDU that includes a first QLMP feature request opcode to the transmission component 812. The transmission component 812 may be configured to transmit the LMP encapsulated header PDU 805 that includes the first QLMP feature request opcode to the second device 850.

The reception component 804 may be configured to receive a first LMP accepted PDU 807 when the QLMP feature request opcode is recognized by the second device 850, or to receive a LMP not accepted PDU 807 when the QLMP feature request opcode is not recognized by the second device 850. The reception component 804 may be configured to send a signal 809 associated with the first LMP accepted PDU or the LMP not accepted PDU to the LM component 806.

The LM component 806 may be configured to send a signal 803 associated with a first LMP encapsulated payload PDU including a QLMP feature request payload to the transmission component 812. The transmission component 812 may be configured to transmit a first LMP encapsulated payload PDU 805 including a QLMP feature request payload to the second device 850. In one aspect, the QLMP feature request payload may include a first bit mask that indicates a first set of QLMP features associated with the first device (e.g., apparatus 802).

The reception component 804 may be configured to receive a second LMP accepted PDU 807 when the first LMP encapsulated payload PDU is received by the second device 850. The reception component 804 may be configured to send a signal 809 associated with the second LMP accepted PDU to the LM component 806.

The reception component 804 may be configured to receive a second LMP encapsulated header PDU 807 that includes a second QLMP opcode. The reception component 804 may be configured to send a signal 809 associated with the a second LMP encapsulated header PDU that includes a second QLMP opcode to the LM component 806.

The reception component 804 may be configured to receive a second LMP encapsulated payload PDU 807 including a QLMP feature response payload from the second device 850. In one aspect, the QLMP feature response payload may include a second bit mask that indicates a second set of QLMP features associated with the second device. The reception component 804 may be configured to send a signal 809 associated with the second LMP encapsulated payload PDU including a QLMP feature response payload to the LM component 806. The LM component 806 may be configured to send a signal 811 associated with the second LMP encapsulated payload PDU including a QLMP feature response payload to the QLM component 808. The QLM component 808 may be configured to send a signal 813 associated with the second bit mask to the QLMP feature determination component 810.

The QLMP feature determination component 810 may be configured to determine the second set of QLMP features associated with the second device 850 based on the second bit mask. In certain aspects, the second set of QLMP features associated with the second device may include virtual addressing. In certain other aspects, the second set of QLMP features associated with the second device may include a split ACL link. The QLMP feature determination component 810 may be configured to send a signal 815 associated with the determined QLMP features associated with the second device 850 to the QLM component 808.

The QLM component 808 may be configured to send a signal 801 associated with a QLMP virtual address request PDU. The LM component 806 may be configured to send a signal 803 associated with a third LMP encapsulated header PDU that may include at least in part a QLMP virtual address opcode to the transmission component 812. The transmission component 812 may be configured to may transmit a third LMP encapsulated header PDU 805 to the second device 850. In one aspect, the third LMP encapsulated header PDU may include at least in part a QLMP virtual address opcode.

The reception component 804 may be configured to receive a third LMP accepted PDU 807 when the third LMP encapsulated header PDU is received by the second device 850. The reception component 804 may be configured to send a signal 809 associated with the third LMP accepted PDU to the LM component 806.

The LM component 806 may be configured to send a signal 803 associated with a third encapsulated payload PDU that includes a virtual address payload to the transmission component 812. The transmission component 812 may be configured to transmit a third encapsulated payload PDU 805 that includes a virtual address payload to the second device 850. In one aspect, the virtual address payload may indicate a virtual address that is associated with both the first device and the second device 850.

The reception component 804 may be configured to receive a fourth LMP encapsulated header PDU 807 that includes a QLMP accepted opcode when the virtual address is recognized by the second device 850. The reception component 804 may be configured to send a signal 809 associated with the fourth LMP encapsulated header PDU to the LM component 806. The LM component 806 may be configured to send a signal 811 associated with the QLMP accepted PDU to the QLM component 808.

The LM component 806 may be configured to send a signal 803 associated with a fourth LMP accepted PDU when the signal associated with fourth LMP encapsulated header PDU is received from the reception component 804. The transmission component 812 may be configured to transmit a fourth LMP accepted PDU when the fourth LMP encapsulated header PDU is received by the first device.

The QLM component 808 may be configured to send a signal 801 associated with a QLMP split ACL PDU to the LM component 806. The LM component 806 may be configured to send a signal 803 associated with a third LMP encapsulated header PDU that includes a QLMP split ACL opcode to the transmission component 812. The transmission component 812 may be configured to transmit a third LMP encapsulated header PDU 805 that includes a QLMP split ACL opcode to the second device 850.

The reception component 804 may be configured to receive a third LMP accepted PDU 807 when the third LMP encapsulated header PDU is received by the second device 850. The reception component 804 may be configured to send a signal 809 associated with the third LMP accepted PDU to the LM component 806.

The LM component 806 may be configured to send a signal 803 associated with a third LMP encapsulated payload PDU that includes a QLMP split ACL payload to the transmission component 812. The transmission component 812 may be configured to transmit a third LMP encapsulated payload PDU 805 that includes a QLMP split ACL payload to the second device 850.

The reception component 804 may be configured to receive a fourth LMP encapsulated header PDU 807 that includes a QLMP accepted opcode when split ACL is enabled at the second device 850. The reception component 804 may be configured to send a signal 809 associated with the fourth LMP encapsulated header PDU that includes a QLMP accepted opcode to the LM component 806. The LM component 806 may be configured to send a signal 811 associated with the fourth LMP encapsulated header PDU that includes a QLMP accepted opcode to the QLM component 808. The QLM component 808 may be configured to enable split ACL at the first device.

The apparatus may include additional components that perform each of the blocks of the algorithm in the aforementioned flowcharts of FIGS. 7A and 7B As such, each block in the aforementioned flowcharts of FIGS. 7A and 7B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
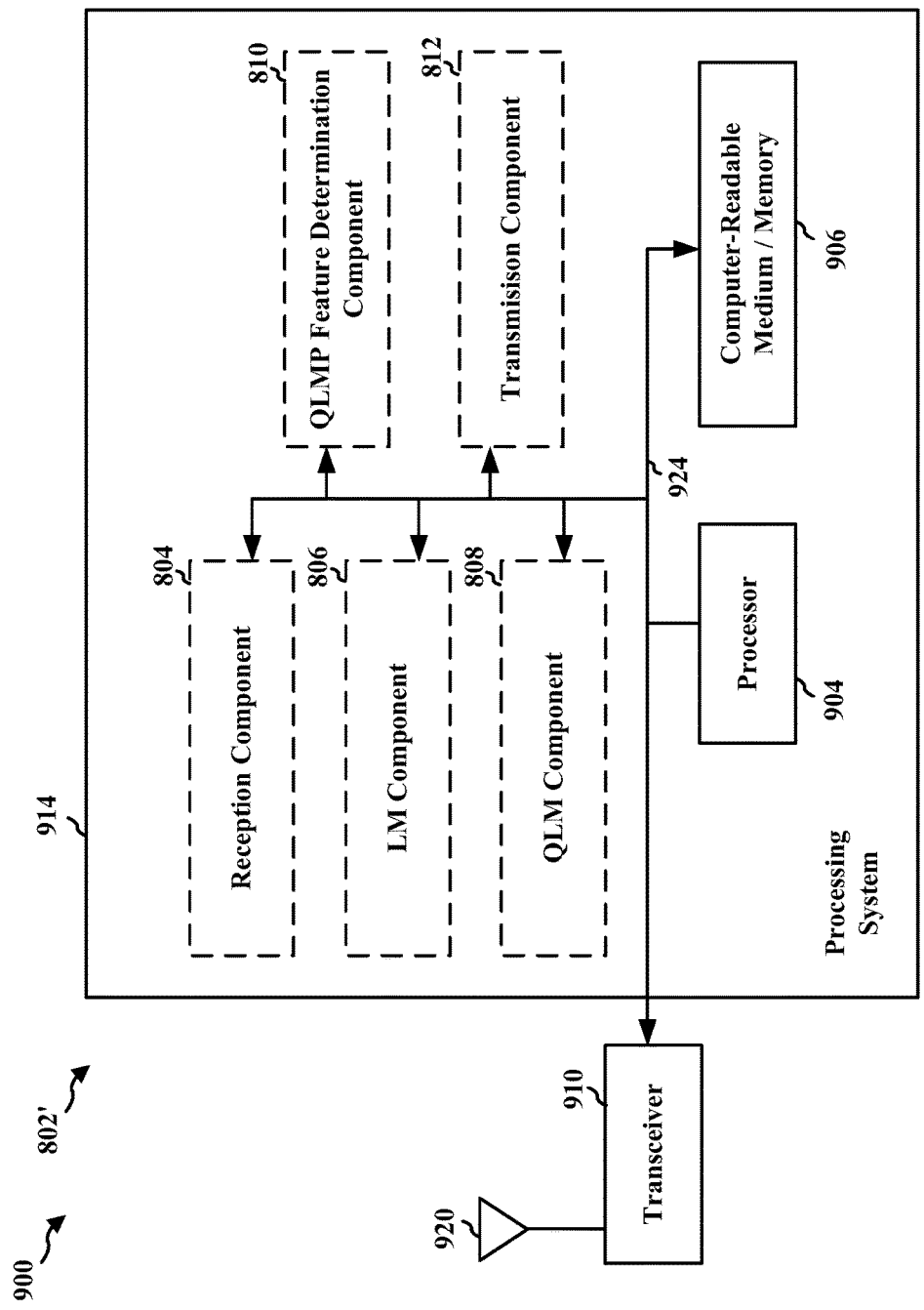
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 812, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof.

In certain configurations, the apparatus 802/802' for wireless communication may include means for transmitting a LMP version request PDU to a second device. In certain other configurations, the apparatus 802/802' for wireless communication may include means for receiving a LMP version response PDU from the second device. In one aspect, the LMP version response PDU may include at least one of a link layer identification, a version number, or a sub-version number associated with the second device. In certain other configurations, the apparatus 802/802' for wireless communication may include means for determining if one or more of the link layer identification, the version number, or the sub-version number included in the LMP version response PDU are associated with a QLM. In certain other configurations, the apparatus 802/802' for wireless communication may include means for transmitting a first LMP encapsulated header PDU that includes a first QLMP feature request opcode to the second device when it is determined that one or more of the link layer identification, the version number, or the sub-version number included in the LMP version response PDU are associated with the QLM. In certain other configurations, the apparatus 802/802' for wireless communication may include means for receiving a first LMP accepted PDU when the QLMP feature request opcode is recognized by the second device or receive a LMP not accepted PDU when the QLMP feature request opcode is not recognized by the second device. In certain other configurations, the apparatus 802/802' for wireless communication may include means for transmitting a first LMP encapsulated payload PDU including a QLMP feature request payload to the second device. In one aspect, the QLMP feature request payload may include a first bit mask that indicates a first set of QLMP features associated with the first device. In certain other configurations, the apparatus 802/802' for wireless communication may include means for receiving a second LMP accepted PDU when the first LMP encapsulated payload PDU is received by the second device. In certain other configurations, the apparatus 802/802' for wireless communication may include means for receiving a second LMP encapsulated header PDU that includes a second QLMP opcode. In certain other configurations, the apparatus 802/802' for wireless communication may include means for receiving a second LMP encapsulated payload PDU including a QLMP feature response payload from the second device. In one aspect, the QLMP feature response payload may include a second bit mask that indicates a second set of QLMP features associated with the second device. In certain other configurations, the apparatus 802/802' for wireless communication may include means for determining the second set of QLMP features associated with the second device based on the second bit mask. In certain aspects, the second set of QLMP features associated with the second device may include virtual addressing. In certain other aspects, the second set of QLMP features associated with the second device includes a split ACL link. In certain other configurations, the apparatus 802/802' for wireless communication may include means for transmitting a third LMP encapsulated header PDU to the second device. In one aspect, the third LMP encapsulated header PDU may include at least in part a QLMP virtual address opcode. In certain other configurations, the apparatus 802/802' for wireless communication may include means for receiving a third LMP accepted PDU when the third LMP encapsulated header PDU is received by the second device. In certain other configurations, the apparatus 802/802' for wireless communication may include means for transmitting a third encapsulated payload PDU that includes a virtual address payload to the second device. In one aspect, the virtual address payload may indicate a virtual address that is associated with both the first device and the second device. In certain other configurations, the apparatus 802/802' for wireless communication may include means for receiving a fourth LMP encapsulated header PDU that includes a QLMP accepted opcode when the virtual address is accepted by the second device. In certain other configurations, the apparatus 802/802' for wireless communication may include means for transmitting a fourth LMP accepted PDU when the fourth LMP encapsulated header PDU is received by the first device. In certain other configurations, the apparatus 802/802' for wireless communication may include means for transmitting a third LMP encapsulated header PDU that includes a QLMP split ACL opcode to the second device. In certain other configurations, the apparatus 802/802' for wireless communication may include means for receiving a third LMP accepted PDU when the third LMP encapsulated header PDU is received by the second device. In certain other configurations, the apparatus 802/802' for wireless communication may include means for transmitting a third LMP encapsulated payload PDU that includes a QLMP split ACL payload to the second device. In certain other configurations, the apparatus 802/802' for wireless communication may include means for receiving a fourth LMP encapsulated header PDU that includes a QLMP accepted opcode when split ACL is enabled at the second device. In certain other configurations, the apparatus 802/802' for wireless communication may include means for enabling split ACL at the first device. The aforementioned means may be one or more of the aforementioned processor(s) 202, short-range communications controller 252, the proprietary controller 256, and/or radio 230 in FIG. 2, the LM 315 and/or the QLM 317 in FIG. 3, components of the apparatus 802 and/or the processing system 914 of the apparatus 802' configured to perform the functions recited by the aforementioned means.

Figure 10A:
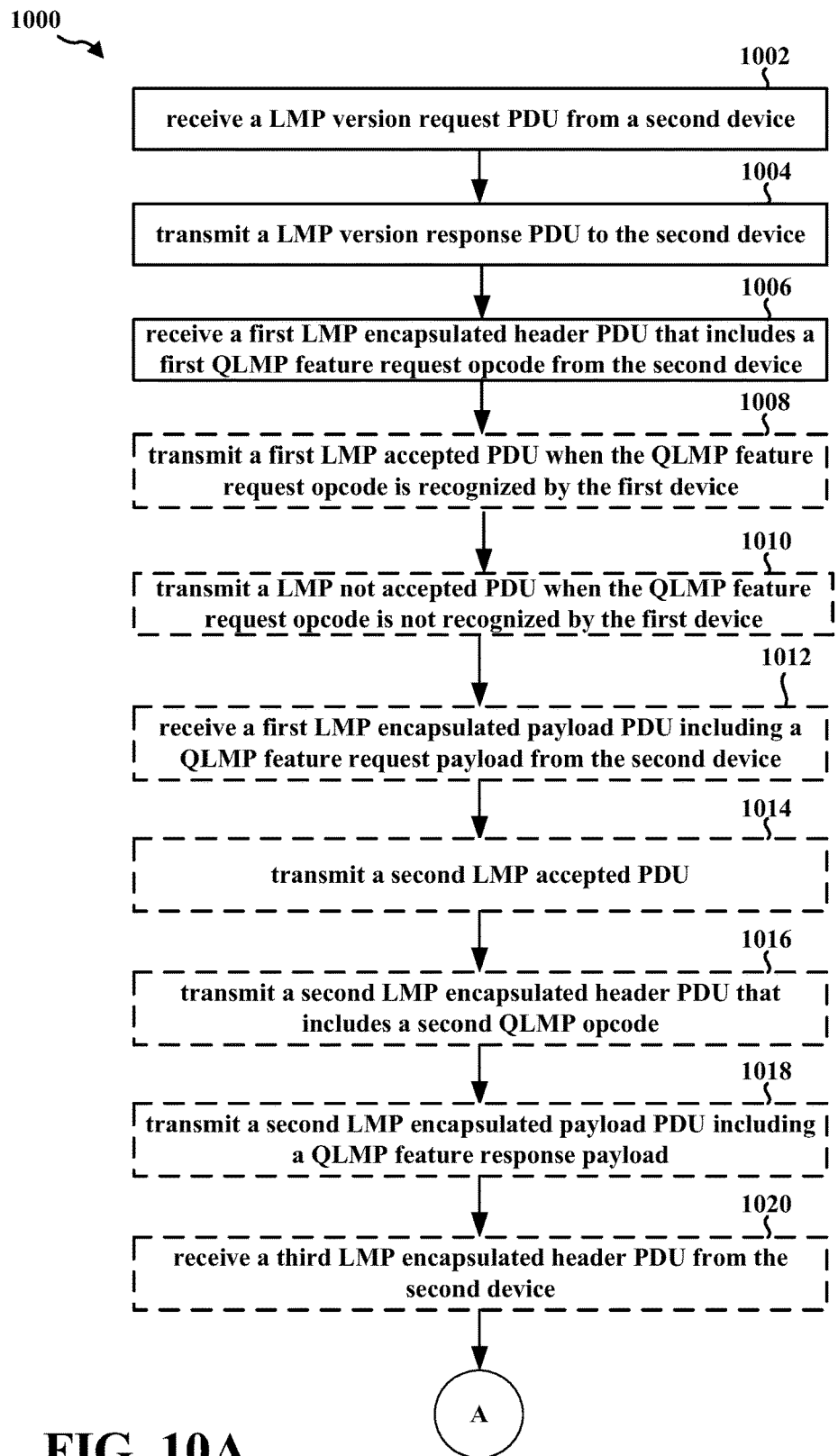
FIGS. 10A-10C are a flowchart of a method of wireless communication.
Figure 10B:
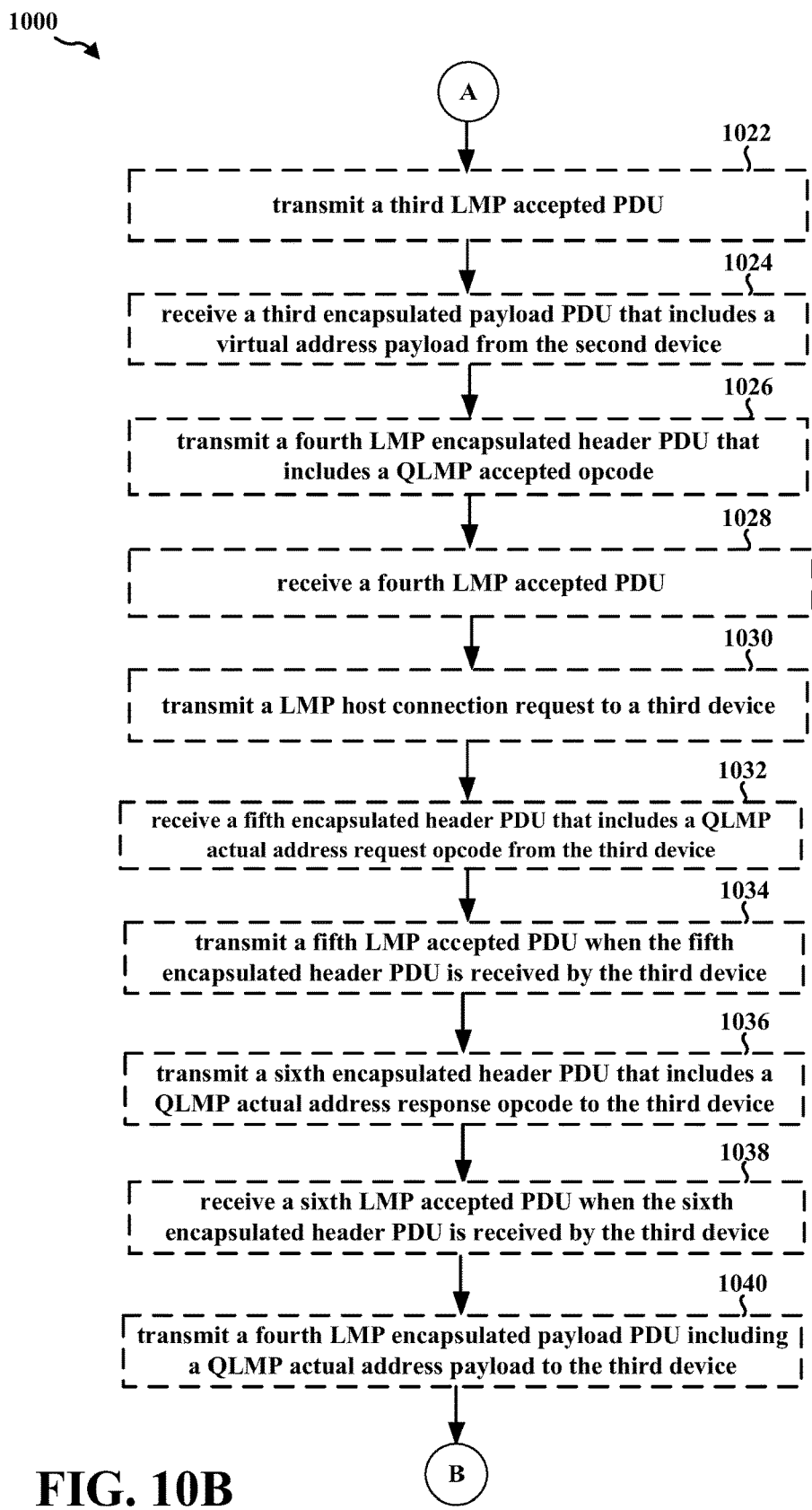
Figure 10C:
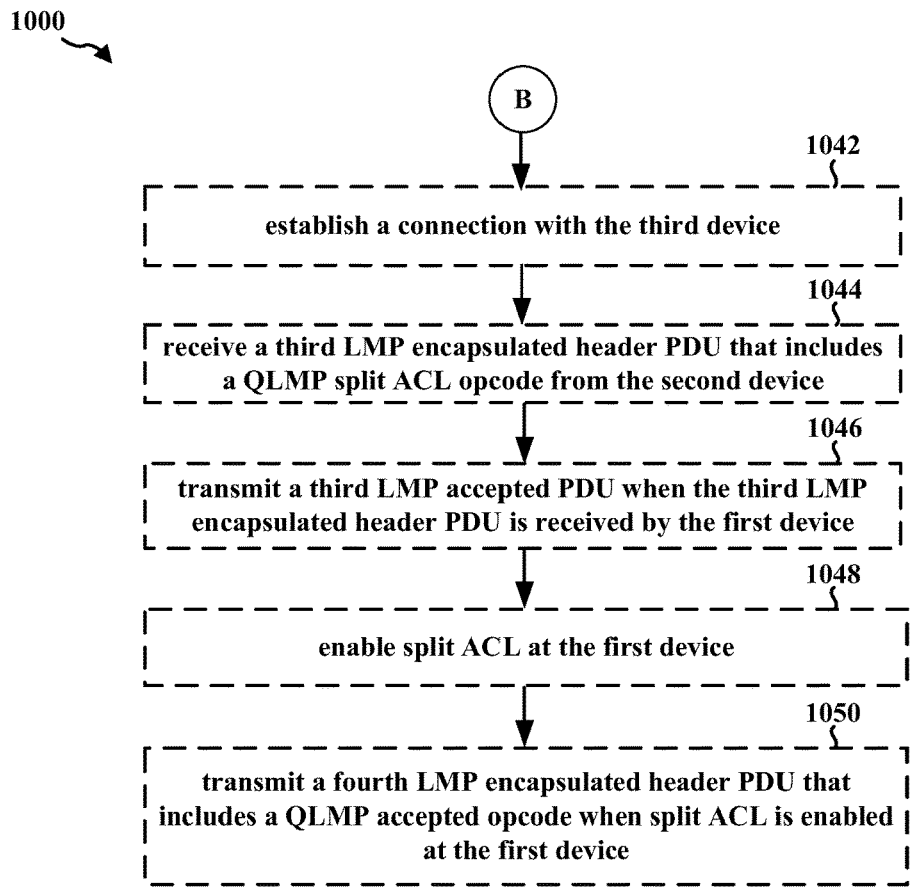

FIGS. 10A-10C are a flowchart 1000 of a method of wireless communication. The method may be performed by a first device (e.g., The first device 410a may correspond to, e.g., central device 102, peripheral device 104, 106, 108a, 108b, 110, 112, 114, wireless device 200, the apparatus 802/802', 1102/1102', 1402/1402', the first device 410a, 510a, 610a, the second device 410b, 510b, 610b, 850, 1150, 1450, the third device 410c, 510c, 610c, 1155, 1455). In FIGS. 10A-10B, optional operations are indicated with dashed lines.

At 1002, the first device may receive a LMP version request PDU from a second device. For example, referring to FIGS. 4B and 4C, the LM version exchange 412 may include a transmission of a LMP_version_req PDU 413 by the initiating LM 404a that is received by the responding LM 404b. In certain implementations, the LMP_version_req PDU 413 may include one or more of a first CompID that is associated with the initiating LM 404a, a first VersNr that specifies the version of the LMP that is supported by the first device 410a, and/or a first SubVersNr that is associated with proprietary RF implementations, proprietary base band implementations, and/or proprietary LM implementations associated with the first device 410a. In certain other implementations, the LMP_version_req PDU 413 may not include one or more of a first CompID that is associated with the initiating LM 404a, a first VersNr that specifies the version of the LMP that is supported by the first device 410a, and/or a first SubVersNr that is associated with proprietary RF implementations, proprietary base band implementations, and/or proprietary LM implementations associated with the first device 410a.

At 1004, the first device may transmit a LMP version response PDU to the second device. In one aspect, the LMP version response PDU may include at least one of a link layer identification, a version number, or a sub-version number associated with the first device. For example, referring to FIGS. 4B and 4C, the LM version exchange 412 may also include the responding LM 404b transmitting a LMP_version_res PDU 414 to the initiating LM 404b. The LMP_version_res PDU 414 may include one or more of a second CompID that is associated with the responding LM 404b, a second VersNr that specifies the version of the LMP that is supported by the second device 410b, and/or a second SubVersNr that is associated with proprietary RF implementations, proprietary base band implementations, and/or proprietary LM implementations associated with the second device 410b.

At 1006, the first device may receive a first LMP encapsulated header PDU that includes a first QLMP feature request opcode from the second device when one or more of the link layer identification, the version number, or the sub-version number included in the LMP version response PDU are associated with the QLM of the second device. For example, referring to FIGS. 4B and 4C, the initiating LM 404a may tunnel the QLMP_feature_req PDU 417 to the responding LM 404b by including a QLMP_feature_req opcode in a LMP_encapsulated_header PDU 418 that is transmitted to the responding LM 404b. In certain configurations, the QLMP_feature_req opcode may be used to test whether any QLMP features are supported by the responding QLM 408b. Requested and/or supported QLMP features may be represented as a bit mask transferred in the QLMP_feature_req PDU 417 and QLMP_feature_res PDU 429. The bit mask may include, e.g., 16 bytes. An example bit map that may be included in one or more of QLMP_feature_req PDU 417 and QLMP_feature_res PDUs 429 is illustrated above in Table 5.

At 1008, the first device may transmit a first LMP accepted PDU when the QLMP feature request opcode is recognized by the first device. For example, referring to FIGS. 4B and 4C, when the responding LM 404b determines (at 419b) that the major type and/or the minor type included in the QLMP_feature_req opcode is recognized (e.g., QLMP feature(s) are supported), the responding LM 404b may respond to the LMP_encapsulated_header PDU 418 that includes the QLMP_feature_req opcode with a LMP_accepted PDU 421c.

At 1010, the first device may transmit a LMP not accepted PDU when the QLMP feature request opcode is not recognized by the first device. For example, referring to FIGS. 4B and 4C, when the responding LM 404b determines (at 419a) that the major type and/or the minor type included in the QLMP_feature_req opcode is not recognized (e.g., the requested QLMP feature is not supported), the responding LM 404b may transmit an LMP_not_accepted PDU 421a to the initiating LM 404a.

At 1012, the first device may receive a first LMP encapsulated payload PDU including a QLMP feature request payload from the second device. In one aspect, the QLMP feature request payload may include a first bit mask that indicates a first set of QLMP features associated with the second device. For example, referring to FIGS. 4B and 4C, the initiating LM 404a may send a LMP_encapsulated_payload PDU 422 that includes the QLMP_feature_req opcode to the responding LM 404b.

At 1014, the first device may transmit a second LMP accepted PDU when the first LMP encapsulated payload PDU is received. For example, referring to FIGS. 4B and 4C, the responding LM 404b may transmit an LMP_accepted PDU 423 that is received by the initiating LM 404a.

At 1016, the first device may transmit a second LMP encapsulated header PDU that includes a second QLMP opcode. For example, referring to FIGS. 4B and 4C, the responding LM 404b may transmit a LMP_encapsulated_header PDU 425 that includes a QLMP_feature_res_opcode. The QLMP_feature_res opcode may indicate that the requested QLMP feature is supported by the second device 410b.

At 1018, the first device may transmit a second LMP encapsulated payload PDU including a QLMP feature response payload to the second device. In one aspect, the QLMP feature response payload may include a second bit mask that indicates a second set of QLMP features associated with the first device. For example, referring to FIGS. 4B and 4C, the responding LM 404*b* may transmit a LMP_encapsulated_payload PDU 427 that includes the QLMP_feature_res opcode and/or the QLMP feature bit mask to the initiating LM 404*a*

At 1020, the first device may receive a third LMP encapsulated header PDU from the second device. In one aspect, the third LMP encapsulated header PDU may include at least in part a QLMP virtual address opcode. For example, referring to FIG. 4D, the initiating LM 404*a* may send a LMP_encapsulated_header PDU 432 to the responding LM 404*b*. The LMP_encapsulated_header PDU 432 may include a QLMP_virtual_address_opcode.

Referring to FIG. 10B, at 1022, the first device may transmit a third LMP accepted PDU when the third LMP encapsulated header PDU is received. For example, referring to FIG. 4D, when the responding LM 404*b* determines that the major type and/or the minor type included in the QLMP_feature_req opcode is recognized (e.g., the virtual addressing feature is supported/enabled by the second device 410*b*), the responding LM 404*b* may send an LMP_accepted PDU 433 to the initiating LM 404*a*.

At 1024, the first device may receive a third encapsulated payload PDU that includes a virtual address payload from the second device. In one aspect, the virtual address payload may indicate a virtual address that is associated with both the first device and the second device. For example, referring to FIG. 4D, when the LMP_accepted PDU 433 is received, the initiating LM 404*a* may send an LMP_encapsulated_payload PDU 434 that includes a QLMP_virtual_address_payload that may be received by the responding LM 404*b*. In certain configurations, the QLMP_virtual_address_payload PDU 434 may include information associated with the Actual_BD_ADDR associated with the first device 410*a* and the Virtual_BD_ADDR associated with the first device 410*a* and the second device 410*b*.

At 1026, the first device may transmit a fourth LMP encapsulated header PDU that includes a QLMP accepted opcode when the virtual address is accepted. For example, referring to FIG. 4D, the responding LM 404*b* may send a LMP_encapsulated_header PDU 438 that includes the QLMP_accepted opcode (e.g., QLMP_virtual_address_res opcode) to the initiating LM 404*a*.

At 1028, the first device may receive a fourth LMP accepted PDU when the fourth LMP encapsulated header PDU is received by the second device. For example, referring to FIG. 4D, when the LMP_encapsulated_header PDU 438 is received and decoded, the initiating LM 404*a* may send a LMP_accepted PDU 439 to the responding LM 404*b*.

At 1030, the first device may transmit a LMP host connection request to a third device. For example, referring to FIG. 4F, the initiating LM 404*b* may send a LMP_host_connection_req PDU 451 to the responding LM 404*c*. The LMP_host_connection_req PDU 451 may include information associated with the virtual address that is associated with both the first device 410*a* and the second device 410*b*.

At 1032, the first device may receive a fifth encapsulated header PDU that includes a QLMP actual address request opcode from the third device. For example, referring to FIG. 4F, the responding LM 404*c* may send a LMP_encapsulated_header PDU 454 that includes a QLMP_actual_address_req opcode that is received by the initiating LM 404*b*.

At 1034, the first device may transmit a fifth LMP accepted PDU when the fifth encapsulated header PDU is received. For example, referring to FIG. 4F, when the initiating LM 404*bb* determines that the major type and/or the minor type included in the QLMP_actual_address_req opcode is recognized, the initiating LM 404*b* may send an LMP_accepted PDU 455 to the responding LM 404*c*.

At 1036, the first device may transmit a sixth encapsulated header PDU that includes a QLMP actual address response opcode to the third device. For example, referring to FIG. 4F, the initiating LM 404*b* may send a LMP_encapsulated_header PDU 458 that includes a QLMP_actual_address_res opcode to the responding LM 404*c*.

At 1038, the first device may receive a sixth LMP accepted PDU when the sixth encapsulated header PDU is received by the third device. For example, referring to FIG. 4F, the responding LM 404*c* may send an LMP_accepted PDU 459 that is received by the initiating LM 404*b*.

At 1040, the first device may transmit a fourth LMP encapsulated payload PDU including a QLMP actual address payload to the third device. For example, referring to FIG. 4F, the initiating LM 404*b* may send a LMP_encapsulated_payload PDU 461 that includes the QLMP_actual_address_payload to the responding LM 404*c*.

Referring to FIG. 10C, at 1042, the first device may establish a connection with the third device. For example, referring to FIG. 4F, when the responding QLM 408*c* determines (at 464) that the Actual_BD_ADDR associated with the second device 410*b* is mapped to the virtual address (e.g., that was originally communicated by the first device 410*a*), the third device 410*c* may establish a connection (at 465) with the second device 410*b*.

At 1044, the first device may receive a third LMP encapsulated header PDU that includes a QLMP split ACL opcode from the second device. For example, referring to FIG. 4I, initiating LM 404*a* may send a LMP_encapsulated_header PDU 485 including the QLMP_split_ACL_opcode that is received by the responding LM 404*b*.

At 1046, the first device may transmit a third LMP accepted PDU when the third LMP encapsulated header PDU to the second device. For example, referring to FIG. 4I, when the responding LM 404*b* determines that the major type and/or the minor type included in the QLMP_split_ACL opcode is recognized, the responding LM 404*b* may send an LMP_accepted PDU 486 that is received by the initiating LM 404*a*.

At 1048, the first device may enable split ACL. For example, referring to FIG. 4I, responding QLM 408*b* may enable (at 490) split ACL communications.

At 1050, the first device may transmit a fourth LMP encapsulated header PDU that includes a QLMP accepted opcode when split ACL is enabled at the second device. For example, referring to FIG. 4I, the responding LM 404*b* may send a LMP_encapsulated_header PDU 492 that includes a QLMP_accepted opcode to the initiating LM 404*a*.

Figure 11:
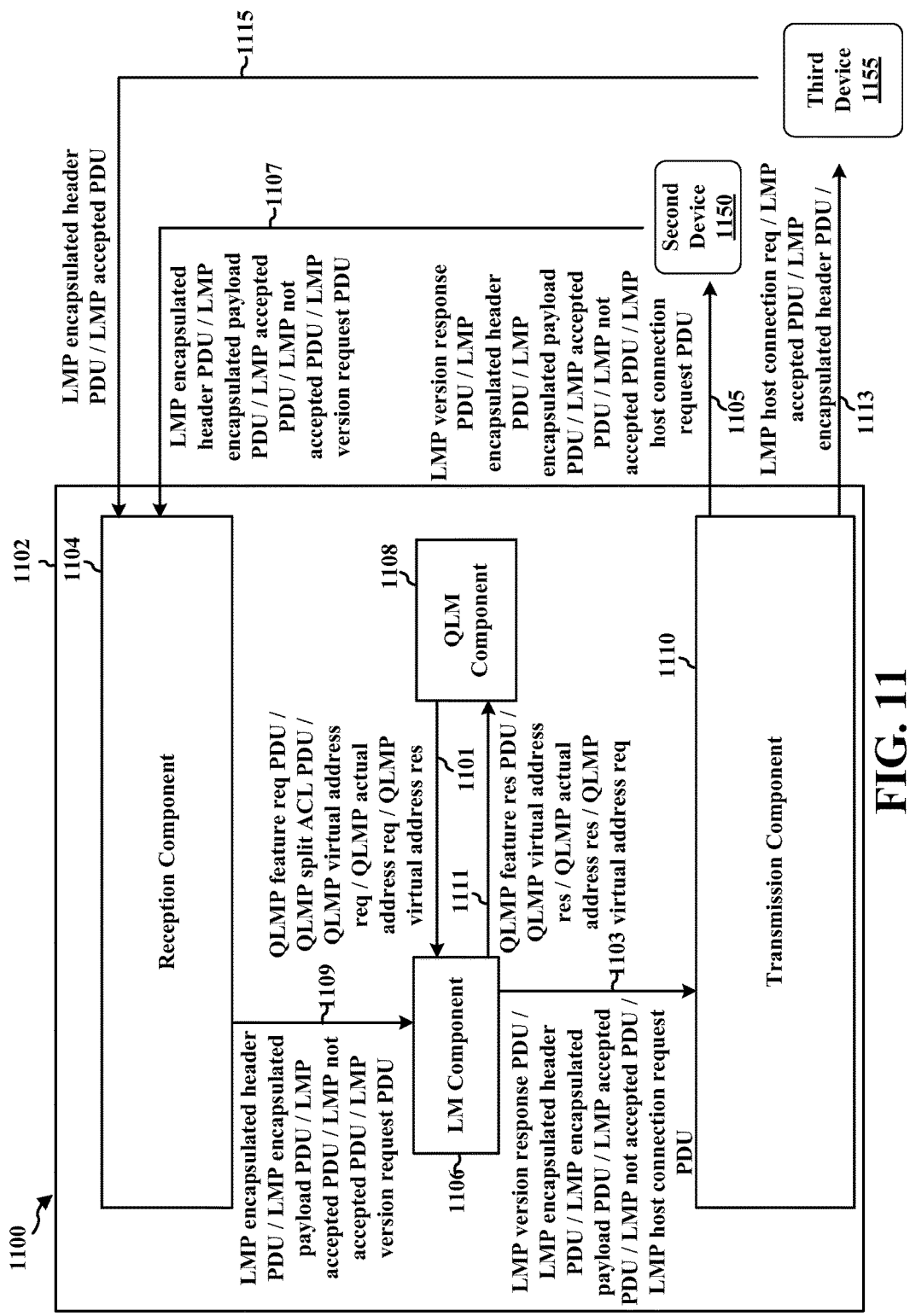
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a first device (e.g., central device 102, peripheral device 104, 106, 108*a*, 108*b*, 110, 112, 114, wireless device 200, the apparatus 802/802', 1102', 1402/1402', the first device 410*a*, 510*a*, 610*a*, the second device 410*b*, 510*b*, 610*b*, 850, 1450, the third device 410*c*, 510*c*, 610*c*, 1455) in communication with a second device 1150 (e.g., central device 102, peripheral device 104, 106, 108*a*, 108*b*, 110, 112, 114, wireless device 200, the apparatus 802/802', 1102', 1402/1402', the first device 410*a*, 510*a*, 610*a*, the second device 410*b*, 510*b*, 610*b*, 850, 1450, the third device 410*c*, 510*c*, 610*c*, 1455) and a third device 1155 (e.g., central device 102, peripheral device 104, 106, 108*a*, 108*b*, 110, 112, 114, wireless device 200, the apparatus 802/802', 1102', 1402/1402', the first device 410a, 510a, 610a, the second device 410b, 510b, 610b, 850, 1450, the third device 410c, 510c, 610c, 1455). The second device 410b may correspond to, e.g., central device 102, peripheral device 104, 106, 108a, 108b, 110, 112, 114, wireless device 200, the apparatus 802/802', 1102'/1102', 1402/1402', the first device 510a, 610a, the second device 510b, 610b, 850, 1150, 1450, the third device 510c, 610c, 1155, 1455. The third device 410c may correspond to, e.g., central device 102, peripheral device 104, 106, 108a, 108b, 110, 112, 114, wireless device 200, the apparatus 802/802', 1102/1102', 1402/1402', the first device 510a, 610a, the second device 510b, 610b, 850, 1150, 1450, the third device 510c, 610c, 1155, 1455.

The apparatus may include a reception component 1104, a LM component 1106, a QLM component 1108, and a transmission component 1110.

The reception component 1104 may be configured to receive a LMP version request PDU 1107 from a second device 1150.

The reception component 1104 may be configured to send a signal 1109 associated with the LMP version request PDU to the LM component 1106. The LM component 1106 may be configured to send a signal 1103 associated with a LMP version response PDU to the transmission component 1110.

The transmission component 1110 may be configured to transmit a LMP version response PDU 1105 to the second device 1150. In one aspect, the LMP version response PDU may include at least one of a link layer identification, a version number, or a sub-version number associated with the first device (e.g., the apparatus 1102).

The reception component 1104 may be configured to receive a first LMP encapsulated header PDU 1107 that includes a first QLMP feature request opcode from the second device 1150 when one or more of the link layer identification, the version number, or the sub-version number included in the LMP version response PDU are associated with the QLM of the second device 1150.

The reception component 1104 may be configured to send a signal 1109 associated with the first LMP encapsulated header PDU to the LM component 1106. The LM component 1106 may be configured to send a signal 1103 associated with a first LMP accepted PDU to the transmission component 1110 when the first QLMP feature opcode is recognized by the LM component 1106 and/or the QLM component 1108.

The transmission component 1110 may be configured to transmit a first LMP accepted PDU 1105 when the QLMP feature request opcode is recognized by the first device.

The reception component 1104 may be configured to receive a first LMP encapsulated payload PDU 1107 including a QLMP feature request payload from the second device 1150. In one aspect, the QLMP feature request payload may include a first bit mask that indicates a first set of QLMP features associated with the second device.

The reception component 1104 may be configured to send a signal 1109 associated with the first LMP encapsulated payload PDU to the LM component 1106. The LM component 1106 may be configured to send a signal 1111 associated with the first LMP encapsulated payload PDU to the QLM component 1108. The QLM component 1108 may be configured to send a signal 1101 associated with QLMP feature response to the LM component 1106. The LM component 1106 may be configured to send a signal 1103 associated with a second LMP accepted PDU and/or a second encapsulated header PDU that includes a second QLMP opcode to the transmission component 1110.

The transmission component 1110 may be configured to transmit a second LMP encapsulated payload PDU 1105 including a QLMP feature response payload to the second device 1150. In one aspect, the QLMP feature response payload may include a second bit mask that indicates a second set of QLMP features associated with the first device.

The reception component 1104 may be configured to receive a third LMP encapsulated header PDU from the second device 1150. In one aspect, the third LMP encapsulated header PDU may include at least in part a QLMP virtual address opcode.

The reception component 1104 may send a signal 1109 associated with the third LMP encapsulated header PDU to the LM component 1106. The LM component 1106 may send a signal 1111 associated with the third LMP encapsulated header PDU to the QLM component 1108. The QLM component 1108 may be configured to send a signal 1101 associated with a QLMP virtual address response to the LM component 1106. The LM component 1106 may be configured to send a signal 1103 associated with a third LMP accepted PDU to the transmission component 1110.

The transmission component 1110 may be configured to transmit a third LMP accepted PDU when the third LMP encapsulated header PDU is received.

The reception component 1104 may be configured to receive a third encapsulated payload PDU 1107 that includes a virtual address payload from the second device 1107. In one aspect, the virtual address payload may indicate a virtual address that is associated with both the first device and the second device 1150.

The reception component 1104 may be configured to send a signal 1109 associated with the third encapsulated payload PDU to the LM component 1106. The LM component 1106 may be configured to send a signal 1111 associated with the third encapsulated payload PDU to the QLM component 1108. The QLM component 1108 may be configured to send a signal 1101 associated with a QLMP virtual address response PDU to the LM component 1106. The LM component 1106 may be configured to send a signal associated with a fourth LMP encapsulated header PDU to the transmission component 1110.

The transmission component 1110 may be configured to transmit, to the second device 1150, a fourth LMP encapsulated header PDU that includes a QLMP accepted opcode when the virtual address is accepted.

The reception component 1104 may be configured to receive a fourth LMP accepted PDU 1105 when the fourth LMP encapsulated header PDU is received by the second device 1150.

The reception component 1104 may be configured to send a signal 1109 associated with the fourth LMP accepted PDU to the LM component 1106. The reception component 1104 may be configured to send a signal 1103 associated with a LMP host connection request to the transmission component 1110.

The transmission component 1110 may be configured to transmit a LMP host connection request 1113 to the third device 1155.

The reception component 1104 may be configure to receive a fifth encapsulated header PDU 1115 that includes a QLMP actual address request opcode from the third device 1155.

The reception component 1104 may be configured to send a signal 1109 associated with the fifth encapsulated header PDU to the LM component 1106. The LM component 1106 may be configured to send a signal 1111 associated with the fifth encapsulated header PDU to the QLM component 1108.

The QLM component 1108 may be configured to send a signal 1101 associated with a QLMP actual address response PDU to the LM component 1106. The LM component 1106 may be configured to send one or more signals associated with a fifth LMP accepted PDU and/or a sixth encapsulated header PDU to the transmission component 1110.

The transmission component 1110 may be configured to transmit a fifth LMP accepted PDU 1113 when the fifth encapsulated header PDU is received. The transmission component 1110 may be configured to transmit a sixth encapsulated header PDU 1113 that includes a QLMP actual address response opcode to the third device 1155.

The reception component 1104 may be configured to receive a sixth LMP accepted PDU when the sixth encapsulated header PDU is received by the third device.

The reception component 1104 may be configured to send a signal 1109 associated with the sixth LMP accepted PDU to the LM component 1106. The LM component 1106 may be configured to send a signal 1103 indicating that communication with the third device 1155 is established.

One or more of the reception component 1104, the LM component 1106, the QLM component 1108, and/or the transmission component 1110 may be configured to establish a connection with the third device 1155.

The reception component 1104 may be configured to receive a third LMP encapsulated header PDU 1107 that includes a QLMP split ACL opcode from the second device 1150.

The reception component 1104 may be configured to send a signal 1109 associated with the third LMP encapsulated header PDU that includes a QLMP split ACL opcode to the LM component 1106. The LM component 1106 may be configured to send a signal 1111 associated with the third LMP encapsulated header PDU that includes a QLMP split ACL opcode to the QLM component 1108.

One or more of the reception component 1104, the LM component 1106, the QLM component 1108, and/or the transmission component 1110 may be configured to enable split ACL.

The LM component 1106 may be configured to send one or more signals associated with a third LMP accepted PDU and/or a fourth LMP encapsulated header PDU that includes a QLMP accepted opcode when split ACL is enabled to the transmission component 1110.

The transmission component 1110 may be configured to transmit a third LMP accepted PDU when the third LMP encapsulated header PDU to the second device 1150. The transmission component 1110 may be configured to transmit a fourth LMP encapsulated header PDU that includes a QLMP accepted opcode when split ACL is enabled at the second device 1150.

The apparatus may include additional components that perform each of the blocks of the algorithm in the aforementioned flowcharts of FIGS. 10A-10C. As such, each block in the aforementioned flowcharts of FIGS. 10A-10C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
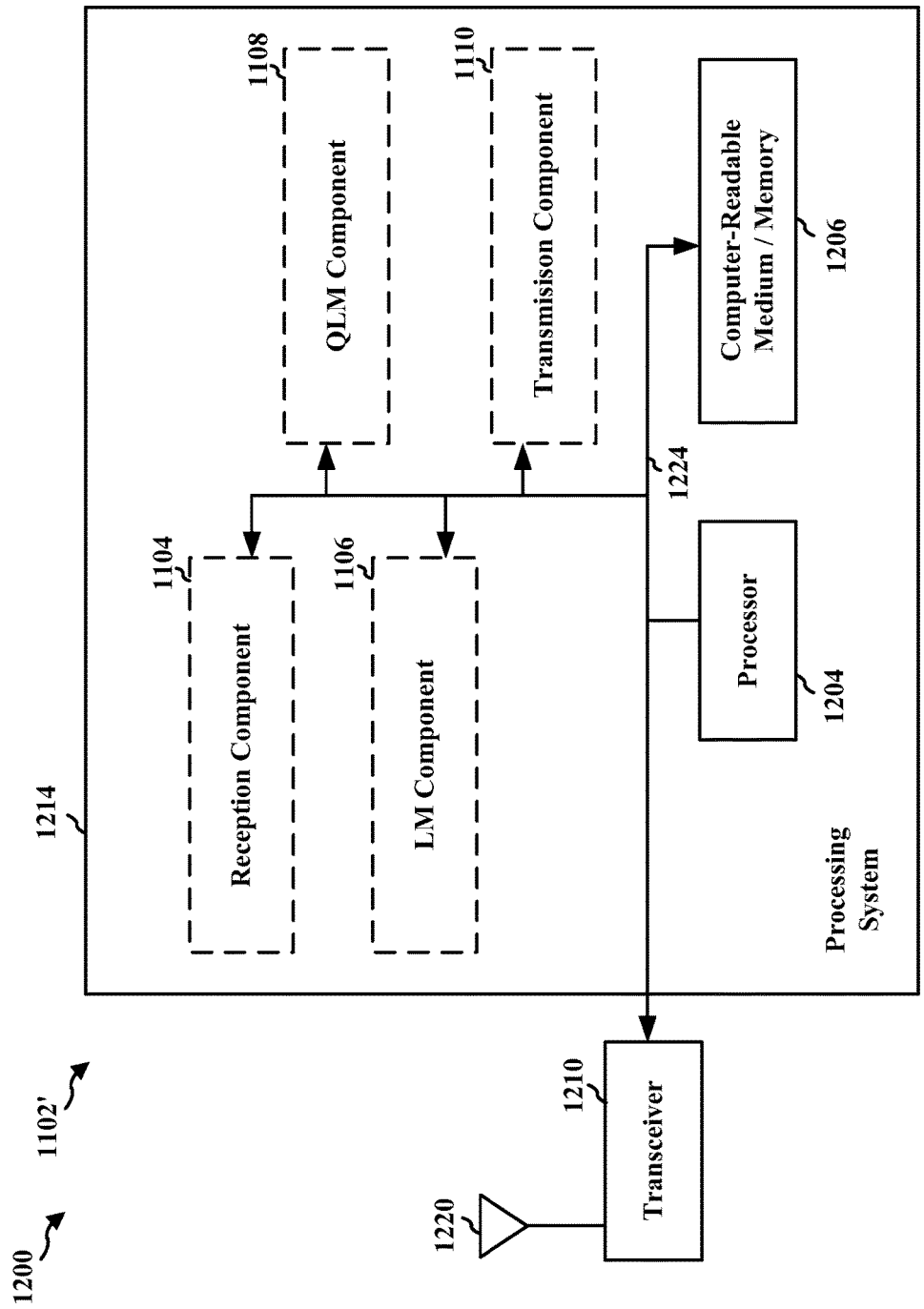
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof.

In certain configurations, the apparatus 1102/1102' for wireless communication may include means for receiving a LMP version request PDU from a second device. In certain other configurations, the apparatus 1102/1102' for wireless communication may include means for transmitting a LMP version response PDU to the second device. In one aspect, the LMP version response PDU may include at least one of a link layer identification, a version number, or a sub-version number associated with the first device. In certain other configurations, the apparatus 1102/1102' for wireless communication may include means for receiving a first LMP encapsulated header PDU that includes a first QLMP feature request opcode from the second device when one or more of the link layer identification, the version number, or the sub-version number included in the LMP version response PDU are associated with the QLM of the second device. In certain other configurations, the apparatus 1102/1102' for wireless communication may include means for transmitting a first LMP accepted PDU when the QLMP feature request opcode is recognized by the first device. In certain other configurations, the apparatus 1102/1102' for wireless communication may include means for transmitting a LMP not accepted PDU when the QLMP feature request opcode is not recognized by the first device. In certain other configurations, the apparatus 1102/1102' for wireless communication may include means for receiving a first LMP encapsulated payload PDU including a QLMP feature request payload from the second device. In one aspect, the QLMP feature request payload may include a first bit mask that indicates a first set of QLMP features associated with the first device. In certain other configurations, the apparatus 1102/1102' for wireless communication may include means for transmitting a second LMP accepted PDU when the first LMP encapsulated payload PDU is received. In certain other configurations, the apparatus 1102/1102' for wireless communication may include means for transmitting a second LMP encapsulated header PDU that includes a second QLMP opcode. In certain other configurations, the apparatus 1102/1102' for wireless communication may include means for transmitting a second LMP encapsulated payload PDU including a QLMP feature response payload to the second device. In one aspect, the QLMP feature response payload may include a second bit mask that indicates a second set of QLMP features associated with the first device. In certain other configurations, the apparatus 1102/1102' for wireless communication may include means for transmitting a third LMP accepted PDU when the third LMP encapsulated header PDU is received. In certain other configurations, the apparatus 1102/1102' for wireless communication may include means for receiving a third encapsulated payload PDU that includes a virtual address payload from the second device. In one aspect, the virtual address payload may indicate a virtual address that is associated with both the first device and the second device. In certain other configurations, the apparatus 1102/1102' for wireless communication may include means for transmitting a fourth LMP encapsulated header PDU that includes a QLMP accepted opcode when the virtual address is accepted. In certain other configurations, the apparatus 1102/1102' for wireless communication may include means for receiving a fourth LMP accepted PDU when the fourth LMP encapsulated header PDU is received by the second device. In certain other configurations, the apparatus 1102/1102' for wireless communication may include means for transmitting a LMP host connection request to a third device. In certain other configurations, the apparatus 1102/1102' for wireless communication may include means for receiving a fifth encapsulated header PDU that includes a QLMP actual address request opcode from the third device. In certain other configurations, the apparatus 1102/1102' for wireless communication may include means for transmitting a fifth LMP accepted PDU when the fifth encapsulated header PDU is received. In certain other configurations, the apparatus 1102/1102' for wireless communication may include means for transmitting a sixth encapsulated header PDU that includes a QLMP actual address response opcode to the third device. In certain other configurations, the apparatus 1102/1102' for wireless communication may include means for receiving a sixth LMP accepted PDU when the sixth encapsulated header PDU is received by the third device. In certain other configurations, the apparatus 1102/1102' for wireless communication may include means for transmitting a fourth LMP encapsulated payload PDU including a QLMP actual address payload to the third device. In certain other configurations, the apparatus 1102/1102' for wireless communication may include means for establishing a connection with the third device. In certain other configurations, the apparatus 1102/1102' for wireless communication may include means for receiving a third LMP encapsulated header PDU that includes a QLMP split ACL opcode from the second device. In certain other configurations, the apparatus 1102/1102' for wireless communication may include means for transmitting a third LMP accepted PDU when the third LMP encapsulated header PDU to the second device. In certain other configurations, the apparatus 1102/1102' for wireless communication may include means for enabling split ACL communications. In certain other configurations, the apparatus 1102/1102' for wireless communication may include means for transmitting a fourth LMP encapsulated header PDU that includes a QLMP accepted opcode when split ACL is enabled at the second device. The aforementioned means may be one or more of the aforementioned processor(s) 202, short-range communications controller 252, the proprietary controller 256, and/or radio 230 in FIG. 2, the LM 315 and/or the QLM 317 in FIG. 3, components of the apparatus 1102 and/or the processing system 1214 of the apparatus 1102' configured to perform the functions recited by the aforementioned means.

Figure 13:
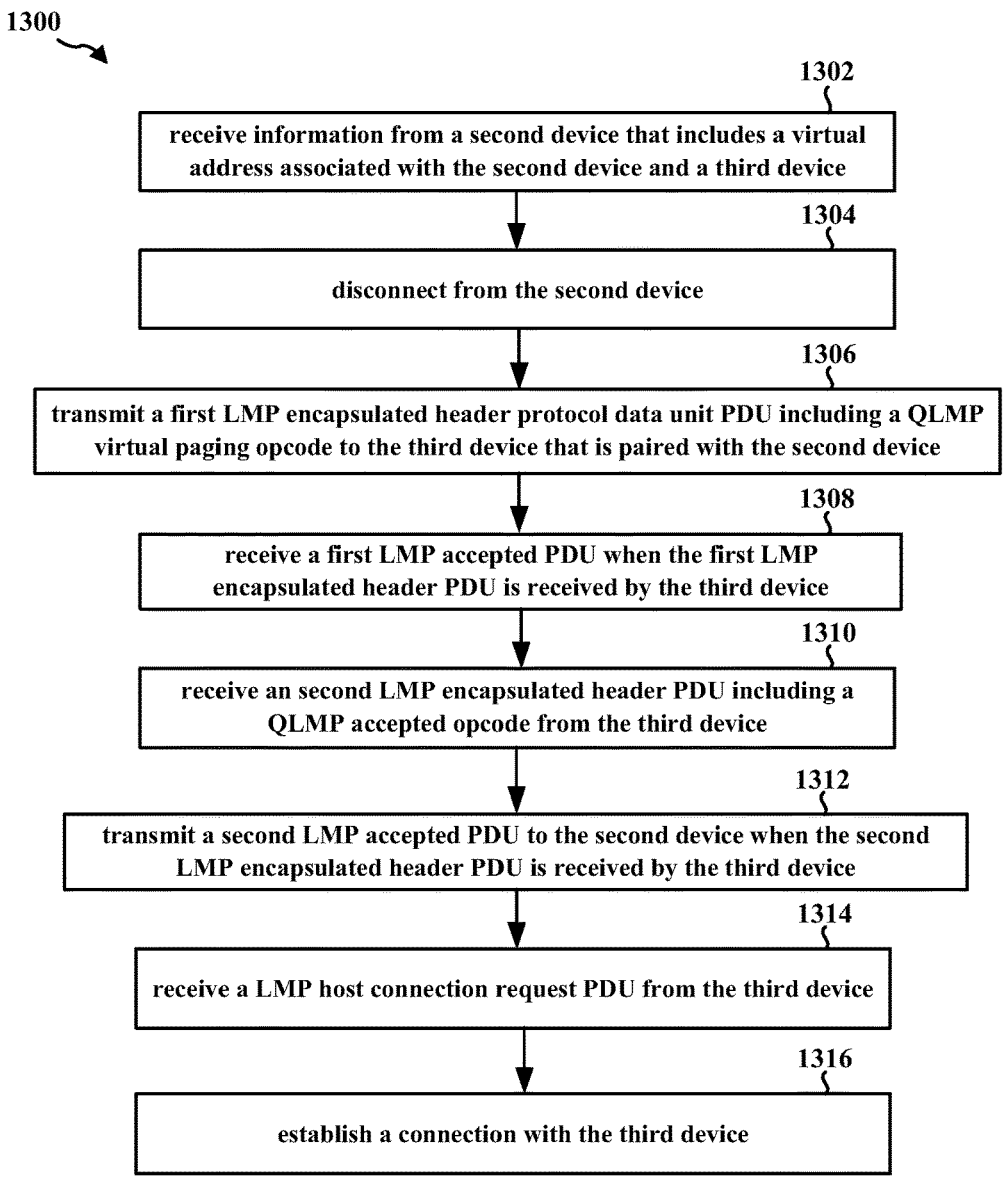
FIG. 13 is a flowchart of a method of wireless communication.

FIG. 13 is a flowchart 1300 of a method of wireless communication. The method may be performed by a first device (e.g., central device 102, peripheral device 104, 106, 108a, 108b, 110, 112, 114, wireless device 200, the apparatus 802/802', 1102/1102', 1402/1402', the first device 410a, 510a, 610a, the second device 410b, 510b, 610b, 850, 1450, the third device 410c, 510c, 610c, 1455).

At 1302, the first device may receive information from a second device that includes a virtual address associated with the second device and a third device. For example, referring to FIG. 4F, a connection may be established (at 448) between a first device 410a (e.g., see FIGS. 4B-4E) and the third device 410c. The first device 410a may send information associated with a mapping of a virtual address (e.g., a Virtual_BD_ADDR associated with both the first device 410a and the second device 410b) to each of the actual addresses (e.g., Actual_BD_ADDRs) associated with each of the first device 410a and the second device 410b. The third device 410c may maintain a mapping of the virtual address and respective actual addresses associated with the first device 410a and the second device 410b.

At 1304, the first device may disconnect from the second device. For example, referring to FIG. 4G, the first device 410a may disconnect (at 467) from the third device 410c. The first device 410a may disconnect (at 467) from the third device 410c due to, e.g., link supervision timeout.

At 1306, the first device may transmit a first LMP encapsulated header PDU including a QLMP virtual paging opcode to the third device that is paired with the second device. For example, referring to FIG. 4G, the initiating LM 404c may send a LMP_encapsulated_header PDU 471 including a QLMP_virtual_paging opcode to the responding LM 404b.

At 1308, the first device may receive a first LMP accepted PDU when the first LMP encapsulated header PDU is received by the third device. For example, referring to FIG. 4G, when the responding LM 404b determines that the major type and/or the minor type included in the QLMP_virtual_paging opcode is recognized, the responding LM 404b may send an LMP_accepted PDU 472 that is received by the initiating LM 404c.

At 1310, the first device may receive a second LMP encapsulated header PDU including a QLMP accepted opcode from the third device. For example, referring to FIG. 4G, the responding LM 404b may send a LMP_encapsulated_header PDU 475 that includes a QLMP_accepted opcode that is received by the initiating LM 404c.

At 1312, the first device may transmit a second LMP accepted PDU to the third device when the second LMP encapsulated header PDU is received by the first device. For example, referring to FIG. 4G, when the initiating LM 404c determines that the major type and/or the minor type included in the QLMP_accepted opcode is recognized, the initiating LM 404c may send an LMP_accepted PDU 476 to the responding LM 404b.

At 1314, the first device may receive a LMP host connection request PDU from the third device. For example, referring to FIG. 4G, the second device 410b may send a LMP_host_connection_req PDU 479a from the LM 404b (which is now the initiating LM) at the second device 410b to the LM 404c (which is now the responding LM) at the third device 410c.

At 1316, the first device may establish a connection with the third device. For example, referring to FIG. 4G, the third device 410c may establish (at 479b) a host connection with the second device 410b that may enable communications between the second device 410b and the third device 410c.

Figure 14:
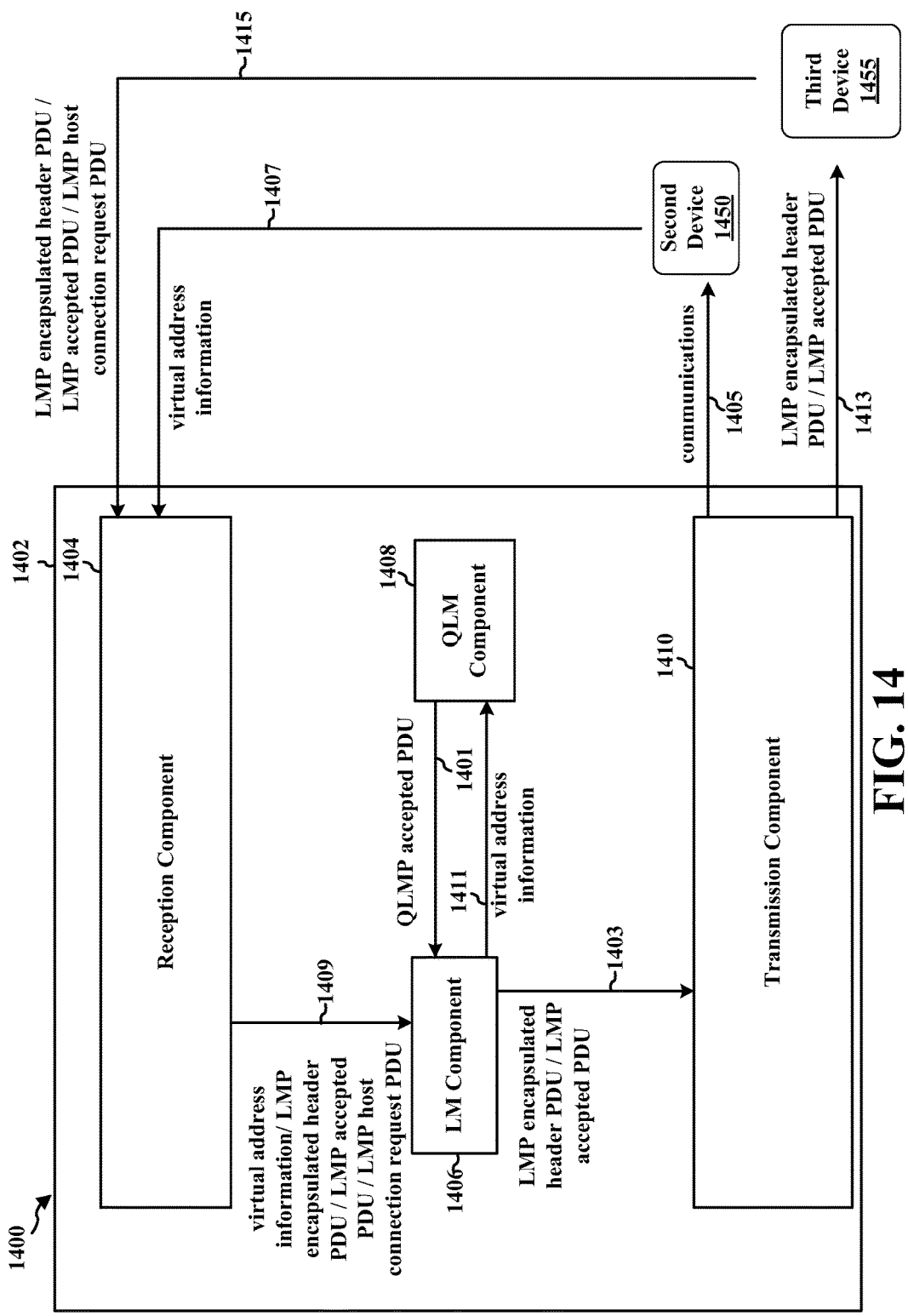
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a first device (e.g., central device 102, peripheral device 104, 106, 108a, 108b, 110, 112, 114, wireless device 200, the apparatus 802/802', 1102/1102', 1402', the first device 410a, 510a, 610a, the second device 410b, 510b, 610b, 850, 1150, the third device 410c, 510c, 610c, 1155) in communication with a second device 1450 (e.g., central device 102, peripheral device 104, 106, 108a, 108b, 110, 112, 114, wireless device 200, the apparatus 802/802', 1102/1102', 1402', the first device 410a, 510a, 610a, the second device 410b, 510b, 610b, 850, 1150, the third device 410c, 510c, 610c, 1155) and a third device 1455 (e.g., central device 102, peripheral device 104, 106, 108a, 108b, 110, 112, 114, wireless device 200, the apparatus 802/802', 1102/1102', 1402', the first device 410a, 510a, 610a, the second device 410b, 510b, 610b, 850, 1150, the third device 410c, 510c, 610c, 1155).

The apparatus may include a reception component 1404, a LM component 1406, a QLM component 1408, and a transmission component 1410.

The reception component 1404 may be configured to receive information 1407 from the second device 1450 that includes a virtual address associated with the second device 1450 and the third device 1455.

The reception component 1404 may be configured to send a signal 1409 associated with the virtual address information to the LM component 1406. The LM component 1406 may be configured to send a signal 1411 associated with the virtual address information to the QLM component 1408. The QLM component 1408 may be configured to maintain a mapping of the virtual address and the actual addresses of the second device 1450 and the third device 1455.

One or more of the reception component 1404, the LM component 1406, the QLM component 1408, and/or the transmission component 1410 may be configured to disconnect from the second device 1450. For example, a communication link 1405, 1407 with the second device 1450 may no longer be established.

The transmission component 1410 may be configured to transmit a first LMP encapsulated header PDU 1413 including a QLMP virtual paging opcode to the third device 1455 that is paired with the second device 1450.

The reception component 1404 may be configured to receive a first LMP accepted PDU 1415 when the first LMP encapsulated header PDU is received by the third device 1455.

The reception component 1404 may be configured to receive a second LMP encapsulated header PDU 1415 including a QLMP accepted opcode from the third device 1455.

The reception component 1404 may be configured to send a signal 1409 associated with the second LMP encapsulated header PDU to the LM component 1406. The LM component 1406 may be configured to send a signal 1411 associated with a second LMP accepted PDU to the transmission component 1410.

The transmission component 1410 may be configured to transmit a second LMP accepted PDU 1413 to the third device 1455 when the second LMP encapsulated header PDU is received.

The reception component 1404 may be configured to receive a LMP host connection request PDU 1415 from the third device 1455.

The reception component 1404 may be configured to send a signal 1409 associated with the LMP host connection request PDU to the LM component 1406. The LM component 1406 may be configured to send a signal 1411 associated with the LMP host connection request PDU to the QLM component 1408. The LM component 1406 may be configured to send a signal 1403 associated with the LMP host connection request PDU to the transmission component 1410.

One or more of the reception component 1404, the LM component 1406, the QLM component 1408, and/or the transmission component may be configured to establish a connection with the third device 1455.

Figure 15:
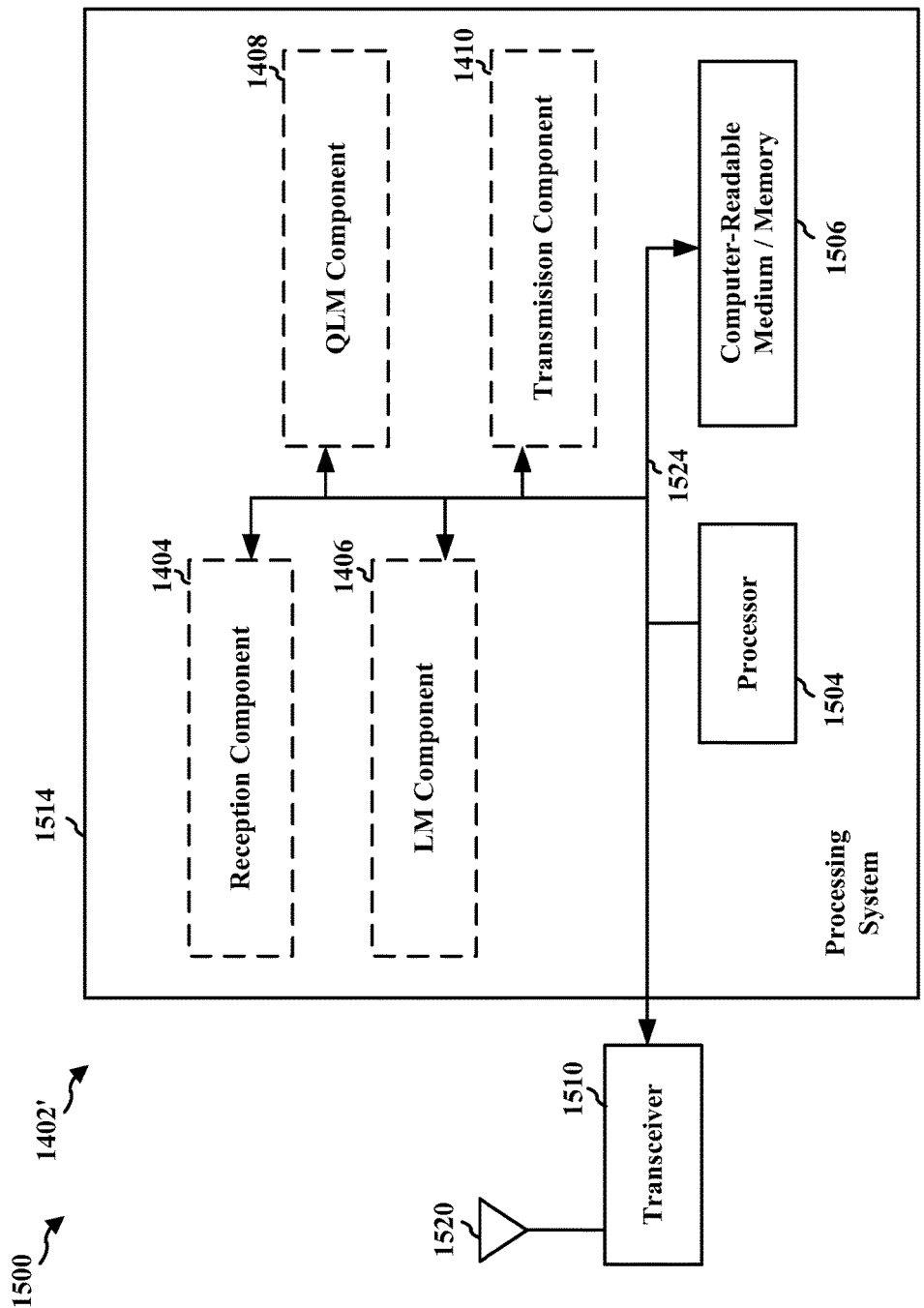
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410. The components may be software components running in the processor 1504, resident/stored in the computer readable medium/memory 1506, one or more hardware components coupled to the processor 1504, or some combination thereof.

In certain configurations, the apparatus 1402/1402' for wireless communication may include means for receiving information from a second device that includes a virtual address associated with the second device and a third device. In certain other configurations, the apparatus 1402/1402' for wireless communication may include means for disconnecting from the second device. In certain other configurations, the apparatus 1402/1402' for wireless communication may include means for transmitting a first LMP encapsulated header PDU including a QLMP virtual paging opcode to the third device that is paired with the second device. In certain other configurations, the apparatus 1402/1402' for wireless communication may include means for receiving a first LMP accepted PDU when the first LMP encapsulated header PDU is received by the third device. In certain other configurations, the apparatus 1402/1402' for wireless communication may include means for receiving a second LMP encapsulated header PDU including a QLMP accepted opcode from the third device. In certain other configurations, the apparatus 1402/1402' for wireless communication may include means for transmitting a second LMP accepted PDU to the third device when the second LMP encapsulated header PDU is received. In certain other configurations, the apparatus 1402/1402' for wireless communication may include means for receiving a LMP host connection request PDU from the third device. In certain other configurations, the apparatus 1402/1402' for wireless communication may include means for establishing a connection with the third device. The aforementioned means may be one or more of the aforementioned processor(s) 202, short-range communications controller 252, the proprietary controller 256, and/or radio 230 in FIG. 2, the LM 315 and/or the QLM 317 in FIG. 3, components of the apparatus 1402 and/or the processing system 1514 of the apparatus 1402' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a first device, the method comprising:
    transmitting a non-proprietary link manager protocol (LMP) version request protocol data unit (PDU) to a second device;
    receiving a LMP version response PDU from the second device, the LMP version response PDU including at least one of a link layer identification, a version number, or a sub-version number associated with the second device;
    determining if one or more of the link layer identification, the version number, or the sub-version number included in the LMP version response PDU are associated with a recognized proprietary link manager (QLM); and
    transmitting a first LMP encapsulated header PDU that includes a first QLM protocol (QLMP) feature request opcode to the second device when it is determined that one or more of the link layer identification, the version number, or the sub-version number included in the LMP version response PDU are associated with the recognized QLM.

2. The method of claim 1, further comprising:
    receiving a first LMP accepted PDU when the QLMP feature request opcode is recognized by the second device;
    receiving a LMP not accepted PDU when the QLMP feature request opcode is not recognized by the second device;
    transmitting a first LMP encapsulated payload PDU including a QLMP feature request payload to the second device, the QLMP feature request payload including a first bit mask that indicates a first set of QLMP features associated with the first device;
    receiving a second LMP accepted PDU when the first LMP encapsulated payload PDU is received by the second device;
    receiving a second LMP encapsulated header PDU that includes a second QLMP opcode;
    receiving a second LMP encapsulated payload PDU including a QLMP feature response payload from the second device, the QLMP feature response payload including a second bit mask that indicates a second set of QLMP features associated with the second device; and
    determining the second set of QLMP features associated with the second device based on the second bit mask.

3. The method of claim 2, wherein the second set of QLMP features associated with the second device includes virtual addressing, the method further comprising:
transmitting a third LMP encapsulated header PDU to the second device, the third LMP encapsulated header PDU including at least in part a QLMP virtual address opcode;
receiving a third LMP accepted PDU when the third LMP encapsulated header PDU is received by the second device;
transmitting a third encapsulated payload PDU that includes a virtual address payload to the second device, the virtual address payload indicating a virtual address that is associated with both the first device and the second device;
receiving a fourth LMP encapsulated header PDU that includes a QLMP accepted opcode when the virtual address is accepted by the second device; and
transmitting a fourth LMP accepted PDU when the fourth LMP encapsulated header PDU is received by the first device.

4. The method of claim 2, wherein the second set of QLMP features associated with the second device includes a split asynchronous connectionless (ACL) link, the method further comprising:
transmitting a third LMP encapsulated header PDU that includes a QLMP split ACL opcode to the second device;
receiving a third LMP accepted PDU when the third LMP encapsulated header PDU is received by the second device;
transmitting a third LMP encapsulated payload PDU that includes a QLMP split ACL payload to the second device;
receiving a fourth LMP encapsulated header PDU that includes a QLMP accepted opcode when split ACL is enabled at the second device; and
enabling split ACL at the first device.

5. A method of wireless communication performed by a first device, the method comprising:
receiving a non-proprietary link manager protocol (LMP) version request protocol data unit (PDU) from a second device;
transmitting a LMP version response PDU to the second device, the LMP version response PDU including at least one of a link layer identification, a version number, or a sub-version number associated with the first device; and
receiving a first LMP encapsulated header PDU that includes a first proprietary link manager protocol (QLMP) feature request opcode from the second device when one or more of the link layer identification, the version number, or the sub-version number included in the LMP version response PDU are associated with a proprietary link manager (QLM) recognized by the second device.

6. The method of claim 5, further comprising:
transmitting a first LMP accepted PDU when the QLMP feature request opcode is recognized by the first device;
transmitting a LMP not accepted PDU when the QLMP feature request opcode is not recognized by the first device;
receiving a first LMP encapsulated payload PDU including a QLMP feature request payload from the second device, the QLMP feature request payload including a first bit mask that indicates a first set of QLMP features associated with the second device;
transmitting a second LMP accepted PDU when the first LMP encapsulated payload PDU is received by the first device;
transmitting a second LMP encapsulated header PDU that includes a second QLMP opcode; and
transmitting a second LMP encapsulated payload PDU including a QLMP feature response payload to the second device, the QLMP feature response payload including a second bit mask that indicates a second set of QLMP features associated with the first device.

7. The method of claim 6, wherein when the first set of QLMP features associated with the first device includes virtual addressing, the method further comprises:
receiving a third LMP encapsulated header PDU from the second device, the third LMP encapsulated header PDU including at least in part a QLMP virtual address opcode;
transmitting a third LMP accepted PDU when the third LMP encapsulated header PDU is received by the first device;
receiving a third encapsulated payload PDU that includes a virtual address payload from the second device, the virtual address payload indicating a virtual address that is associated with both the first device and the second device;
transmitting a fourth LMP encapsulated header PDU that includes a QLMP accepted opcode when the first device accepts the virtual address; and
receiving a fourth LMP encapsulated header PDU when the fourth LMP encapsulated header PDU is received by the second device.

8. The method of claim 7, further comprising:
transmitting a LMP host connection request to a third device;
receiving a fifth encapsulated header PDU that includes a QLMP actual address request opcode from the third device;
transmitting a fifth LMP accepted PDU when the fifth encapsulated header PDU is received by the third device;
transmitting a sixth encapsulated header PDU that includes a QLMP actual address response opcode to the third device;
receiving a sixth LMP accepted PDU when the sixth encapsulated header PDU is received by the third device;
transmitting a fourth LMP encapsulated payload PDU including a QLMP actual address payload to the third device; and
establishing a connection with the third device.

9. The method of claim 6, wherein when the first set of QLMP features associated with the first device includes a split asynchronous connectionless (ACL) link, the method further comprises:
receiving a third LMP encapsulated header PDU that includes a QLMP split ACL opcode from the second device;
transmitting a third LMP accepted PDU when the third LMP encapsulated header PDU is received by the first device;
enabling split ACL at the first device; and
transmitting a fourth LMP encapsulated header PDU that includes a QLMP accepted opcode when split ACL is enabled at the first device.

10. A method of wireless communication performed by a first device, the method comprising:

receiving information from a second device that includes a virtual address associated with the second device and a third device;

disconnecting from the second device;

transmitting a first non-proprietary link manager protocol (LMP) encapsulated header protocol data unit (PDU) including a proprietary link manager protocol (QLMP) virtual paging opcode to the third device that is paired with the second device;

receiving a first LMP accepted PDU when the first LMP encapsulated header PDU is received by the third device;

receiving a second LMP encapsulated header PDU including a QLMP accepted opcode from the third device;

transmitting a second LMP accepted PDU to the third device when the second LMP encapsulated header PDU is received;

receiving a LMP host connection request PDU from the third device; and establishing a connection with the third device.

11. An apparatus for wireless communication for a first device, comprising:

a memory; and at least one processor coupled to the memory and configured to:

transmit a non-proprietary link manager protocol (LMP) version request protocol data unit (PDU) to a second device;

receive a LMP version response PDU from the second device, the LMP version response PDU including at least one of a link layer identification, a version number, or a sub-version number associated with the second device;

determine if one or more of the link layer identification, the version number, or the sub-version number included in the LMP version response PDU are associated with a recognized proprietary link manager (QLM); and transmit a first LMP encapsulated header PDU that includes a first QLM protocol (QLMP) feature request opcode to the second device when it is determined that one or more of the link layer identification, the version number, or the sub-version number included in the LMP version response PDU are associated with the recognized QLM.

12. The apparatus of claim 11, wherein the at least one processor is further configured to:

receive a first LMP accepted PDU when the QLMP feature request opcode is recognized by the second device;

receive a LMP not accepted PDU when the QLMP feature request opcode is not recognized by the second device;

transmit a first LMP encapsulated payload PDU including a QLMP feature request payload to the second device, the QLMP feature request payload including a first bit mask that indicates a first set of QLMP features associated with the first device;

receive a second LMP accepted PDU when the first LMP encapsulated payload PDU is received by the second device;

receive a second LMP encapsulated header PDU that includes a second QLMP opcode;

receive a second LMP encapsulated payload PDU including a QLMP feature response payload from the second device, the QLMP feature response payload including a second bit mask that indicates a second set of QLMP features associated with the second device; and determine the second set of QLMP features associated with the second device based on the second bit mask.

13. The apparatus of claim 12, wherein the second set of QLMP features associated with the second device includes virtual addressing, and wherein the at least one processor is further configured to:

transmit a third LMP encapsulated header PDU to the second device, the third LMP encapsulated header PDU including at least in part a QLMP virtual address opcode;

receive a third LMP accepted PDU when the third LMP encapsulated header PDU is received by the second device;

transmit a third encapsulated payload PDU that includes a virtual address payload to the second device, the virtual address payload indicating a virtual address that is associated with both the first device and the second device;

receive a fourth LMP encapsulated header PDU that includes a QLMP accepted opcode when the virtual address is accepted by the second device; and transmit a fourth LMP accepted PDU when the fourth LMP encapsulated header PDU is received by the first device.

14. The apparatus of claim 12, wherein the second set of QLMP features associated with the second device includes a split asynchronous connectionless (ACL) link, and wherein the at least one processor is further configured to:

transmit a third LMP encapsulated header PDU that includes a QLMP split ACL opcode to the second device;

receive a third LMP accepted PDU when the third LMP encapsulated header PDU is received by the second device;

transmit a third LMP encapsulated payload PDU that includes a QLMP split ACL payload to the second device;

receive a fourth LMP encapsulated header PDU that includes a QLMP accepted opcode when split ACL is enabled at the second device; and enable split ACL at the first device.

* * * * *